(12) United States Patent
Gillam et al.

(10) Patent No.: US 8,855,998 B2
(45) Date of Patent: Oct. 7, 2014

(54) PARSING CULTURALLY DIVERSE NAMES

(75) Inventors: Richard T. Gillam, Chantilly, VA (US);
Frankie E. Patman Maguire, Washington, DC (US); Leonard A. Shaefer, Jr., Leesburg, VA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/240,939

(22) Filed: Sep. 22, 2011

(65) Prior Publication Data

US 2012/0016660 A1    Jan. 19, 2012

Related U.S. Application Data

(63) Continuation-in-part of application No. 12/197,119, filed on Aug. 22, 2008, now Pat. No. 8,041,560, which is a continuation of application No. 10/055,178, filed on Jan. 25, 2002, now abandoned, which is a continuation of application No. 09/275,766, filed on Mar. 25, 1999, now Pat. No. 6,963,871.

(60) Provisional application No. 60/079,233, filed on Mar. 25, 1998.

(51) Int. Cl.
*G06F 17/27* (2006.01)
*G06F 17/28* (2006.01)
*G06F 17/21* (2006.01)
*G10L 21/00* (2013.01)

(52) U.S. Cl.
USPC .......... 704/9; 704/4; 704/8; 704/10; 704/270; 704/270.1; 704/275

(58) Field of Classification Search
USPC ............. 704/1–10, 240, 257, 270, 270.1, 275
See application file for complete search history.

(56) References Cited

U.S. PATENT DOCUMENTS 5,040,218 A    8/1991    Vitale et al.
5,062,143 A    10/1991   Schmitt
(Continued)

FOREIGN PATENT DOCUMENTS

WO    2005081869    9/2005

OTHER PUBLICATIONS

Lait, A. J., & Randell, B. (1996). An assessment of name matching algorithms. Technical Report Series13 University of Newcastle Upon Tyne Computing Science.*

(Continued)

*Primary Examiner* — Edgar Guerra-Erazo
(74) *Attorney, Agent, or Firm* — Janaki K. Davda; Konrad, Raynes, Davda & Victor LLP

(57) ABSTRACT

Provided are techniques for parsing a name. A name to be parsed is received. A culture of the name is identified. One or more name phrases from the name are identified. Statistics for the one or more name phrases are identified. It is determined whether to perform a first parsing technique that parses different types of name elements within at least one field of the name. In response to determining that the first parsing technique is to be performed, the name is parsed using the statistics and the first parsing technique. In response to determining that the first parsing technique is not to be performed, the name is parsed using the statistics and a second parsing technique.

15 Claims, 25 Drawing Sheets

(56) References Cited

U.S. PATENT DOCUMENTS

| | | | |
|---|---|---|---|
| 5,212,730 A | 5/1993 | Wheatley et al. | |
| 5,258,909 A | 11/1993 | Damerau et al. | |
| 5,323,316 A | 6/1994 | Kadashevich et al. | |
| 5,333,317 A | 7/1994 | Dann | |
| 5,337,232 A | 8/1994 | Sakai et al. | |
| 5,369,726 A | 11/1994 | Kroeker et al. | |
| 5,369,727 A | 11/1994 | Nomura et al. | |
| 5,371,676 A | 12/1994 | Heemels et al. | |
| 5,375,176 A | 12/1994 | Spitz | |
| 5,377,280 A | 12/1994 | Nakayama | |
| D359,480 S | 6/1995 | Levine | |
| 5,425,110 A | 6/1995 | Spitz | |
| 5,432,948 A | 7/1995 | Davis et al. | |
| 5,434,777 A | 7/1995 | Luciw | |
| 5,440,663 A | 8/1995 | Moese et al. | |
| 5,457,770 A | 10/1995 | Miyazawa | |
| 5,477,451 A | 12/1995 | Brown et al. | |
| 5,485,373 A | 1/1996 | Davis et al. | |
| 5,490,061 A | 2/1996 | Tolin et al. | |
| 5,515,475 A | 5/1996 | Gupta et al. | |
| 5,526,463 A | 6/1996 | Gillick et al. | |
| 5,548,507 A | 8/1996 | Martino et al. | |
| 5,644,740 A | 7/1997 | Kiuchi | |
| 5,680,511 A | 10/1997 | Baker et al. | |
| 5,682,524 A | 10/1997 | Freund et al. | |
| 5,687,366 A | 11/1997 | Harvey, III et al. | |
| 5,724,481 A | 3/1998 | Garberg et al. | |
| 5,758,314 A | 5/1998 | McKenna | |
| 5,819,265 A | 10/1998 | Ravin et al. | |
| 5,832,480 A | 11/1998 | Byrd, Jr. et al. | |
| 5,835,912 A | 11/1998 | Pet | |
| 5,870,700 A | 2/1999 | Parra | |
| 5,873,111 A | 2/1999 | Edberg | |
| 5,920,852 A | 7/1999 | Graupe | |
| 5,963,940 A | 10/1999 | Liddy et al. | |
| 6,038,566 A | 3/2000 | Tsai | |
| 6,067,520 A | 5/2000 | Lee | |
| 6,073,090 A | 6/2000 | Fortune et al. | |
| 6,243,669 B1 | 6/2001 | Horiguchi et al. | |
| 6,266,642 B1 | 7/2001 | Franz et al. | |
| 6,272,464 B1 | 8/2001 | Kiraz et al. | |
| 6,298,343 B1 | 10/2001 | Chang et al. | |
| 6,311,152 B1 | 10/2001 | Bai et al. | |
| 6,314,469 B1 | 11/2001 | Tan et al. | |
| 6,496,793 B1 | 12/2002 | Veditz et al. | |
| 6,618,697 B1 | 9/2003 | Kantrowitz et al. | |
| 6,651,070 B1 | 11/2003 | Hirashima et al. | |
| 6,735,593 B1 | 5/2004 | Williams | |
| 6,757,688 B1 | 6/2004 | Leapaldt et al. | |
| 6,963,871 B1* | 11/2005 | Hermansen et al. | 1/1 |
| 7,039,172 B2* | 5/2006 | Wrobel | 379/142.04 |
| 7,107,206 B1 | 9/2006 | Uchida et al. | |
| 7,134,084 B1 | 11/2006 | Rashid et al. | |
| 7,249,012 B2 | 7/2007 | Al-Onaizan et al. | |
| 7,996,403 B2* | 8/2011 | Khasin et al. | 707/737 |
| 8,041,560 B2 | 10/2011 | Hermansen et al. | |
| 2002/0083029 A1* | 6/2002 | Chun et al. | 706/45 |
| 2002/0156902 A1 | 10/2002 | Crandall | |
| 2003/0074185 A1* | 4/2003 | Kang | 704/2 |
| 2004/0002850 A1 | 1/2004 | Shaefer, Jr. et al. | |
| 2004/0024760 A1* | 2/2004 | Toner et al. | 707/6 |
| 2004/0111475 A1 | 6/2004 | Schultz | |
| 2004/0210763 A1* | 10/2004 | Jonas | 713/193 |
| 2005/0049852 A1 | 3/2005 | Chao | |
| 2005/0084152 A1* | 4/2005 | McPeake et al. | 382/173 |
| 2005/0119875 A1* | 6/2005 | Shaefer et al. | 704/7 |
| 2005/0147947 A1 | 7/2005 | Cookson, Jr. et al. | |
| 2005/0273468 A1 | 12/2005 | Hermansen et al. | |
| 2006/0031239 A1* | 2/2006 | Koenig | 707/100 |
| 2007/0005567 A1 | 1/2007 | Hermansen et al. | |
| 2007/0005578 A1 | 1/2007 | Patman et al. | |
| 2007/0005586 A1 | 1/2007 | Shaefer, Jr. et al. | |
| 2007/0027672 A1* | 2/2007 | Decary et al. | 704/7 |
| 2007/0239705 A1* | 10/2007 | Hunt et al. | 707/5 |
| 2009/0276416 A1* | 11/2009 | Ball et al. | 707/5 |
| 2009/0326914 A1* | 12/2009 | Joy et al. | 704/3 |
| 2010/0153396 A1* | 6/2010 | Margulies et al. | 707/737 |
| 2011/0137635 A1* | 6/2011 | Chalabi et al. | 704/2 |
| 2011/0137636 A1* | 6/2011 | Srihari et al. | 704/2 |
| 2012/0016663 A1 | 1/2012 | Gillam et al. | |

OTHER PUBLICATIONS

"Sounding Off on Soundex" retrievable at http://cdn.information-management.com/infodirect/20031010/7525-1.html (dated Oct. 1, 2003 @ 1:00am ET and authored by John C. Hermansen).*

"Identity Management Begins with Better Systems for Handling People's Names" retrievable at http://cdn.information-management.com/specialreports/20051215/1043325-1.html (dated Dec. 15, 2005 @ 1:00am ET and authored by John C. Hermansen).*

DATAFLUX, "dfPower Studio", [online], [Retrieved Mar. 2005], retrieved from the Internet at <URL: http://www.dataflux.com/Product-Services/Products/dfpower-studio.asp>, Total 2 pp.

DataLever Corp, "DataLever Cleansing", [online], 2004, [Retrieved Mar. 2005], retrieved from the Internet at <URL: http://www.datalever.com/cleansing.html>, Total 8 pp.

French, J.C, A.L. Powell, & E. Schulman, "Applications of Approximate Word Matching in Information Retrieval", Proceedings of the Sixth International Conference on Information and Knowledge Management, 1997, Total 8 pp.

Global-Z Tech, "International Data Processing Services", [online], [Retrieved Mar. 2005], retrieved from the Internet at <URL: http://www.globalz.com/services/merge_purge.asp>, Total 9 pp.

Guy Software, "ParseRat", [online], [Retrieved Mar. 2005], retrieved from the Internet at <URL: http://www.guysoftware.com/parserat.htm>, Total 5 pp.

Hermansen, J.C., "Automatic Name Searching in Large Data Bases of International Names", Doctor of Philosophy Dissertation, Nov. 27, 1985, Total 152 pp.

Horng-Jyh, P.W., N. Jin-Chean, C.K. Soo-Guan, "A Hybrid Approach to Fuzzy Name Search Incorporating Language-Based and Text-Based Principles", Journal of Information Sciences, Revised Mar. 8, 2006, Total 26 pp.

Human Inference, "HIquality Name—Name Cleansing and Validation", [online], [Retrieved Mar. 2005], retrieved from the Internet at <URL: http://www.humaninference.com/products/hiquality-name>, Total 3 pp.

Identity Systems, "Identity Systems Products", [online], [Retrieved Mar. 2005], retrieved from the Internet at <URL: http://www.identitysystems.com>, Total 7 pp.

Infoplan, "Name Parser", [online], [Retrieved Mar. 2005], retrieved from the Internet at <URL: http://www.infoplan.com.au/nameparser/>, Total 4 pp.

Inforoute Inc., "NamePro Version 2.0 Name Parsing Software", [online], [Retrieved on Mar. 28, 2005], retrieved from the Internet at <URL: http://www.inforouteinc.com/prodB-1.html>, Total 2 pp.

Innovative Systems, Inc., "I/Lytics-Data Quality", [online], [retrieved Mar. 2005], retrieved from the Internet at <URL: http://www.innovativesystems.com/iLytics/quality.htm>, Total 5 pp.

Intelligent Search Technology, Ltd., "Name Search", [online], Archived Aug. 8, 2003, [retrieved on Sep. 28, 2005], retrieved from the Internet at <URL: http://www.intelligentsearch.com> and pages linked thereto, Total 6 pp.

Intelligent Search Technology, Ltd., "Intelligent Search Technology, Ltd.—Products ", [online], Archived Jun. 9, 2004, [retrieved on Sep. 28, 2005], retrieved from the Internet at <URL: http://www.name-searching.com> and pages linked thereto, Total 81 pp.

Intelligent Search Technology, Ltd., "ISTwatch—OFAC Searching, Patriot Act Compliance Software", [online], 2004, [retrieved on Sep. 27, 2005], retrieved from the Internet at <URL: http://www.intelligentsearch.com/ofac_software/index.html>, Total 15 pp.

Intelligent Search Technology, Ltd., "Name Search—Searching and Matching Software for Enterprise Systems", [online], 2004, [retrieved on Sep. 27, 2005], retrieved from the Internet at <URL: http://www.intelligentsearch.com/name_searching/index.html>, Total 33 pp.

(56) References Cited

OTHER PUBLICATIONS

Las Inc., "Engineering Change Proposal #1—Name Search Technology Demonstration System Project", Contract 97-F131000-000, Jun. 9, 1998, Total 8 pp.

Las Inc., "Engineering Change Proposal to the Statement of Work for the Name Search Research Project", Contract 95-F143100-000, Revision 1, Apr. 12, 1996, Total 8 pp.

Las Inc., "Final Report—Name Search Research Project: Phase 2", Contract No. 95-F143100-000, May 31, 1997, Total 69 pp.

Las Inc., "Name Search Research Project", RFP 77-95FS, Technical Volume, Jun. 19, 1995, Total 12 pp.

Las Inc., "Project Plan—Name Search Research Project: Phase 2", Contract No. 95-F143100-000, May 28, 1996, Revisions: Jun. 14, 1996, Total 19 pp.

Las Inc., "Proposed Phase 3—Name Search Research Project", Recommendations for ECP of Contract No. 95-F143100-000, Mar. 24, 1997, Total 8 pp.

Las Inc., "Recommendations for Automatic Name Search Research: Follow-up to the Name Search Technology Demonstration System", Feb. 9, 1998, Total 7 pp.

Las Inc., "Report on Effectiveness: Task 5.7- Name Search Research Project", Mar. 1, 1996, Total 72 pp.

Notice of Allowance 1, Jun. 10, 2011, for U.S. Appl. No. 12/197,119, filed Aug. 22, 2008 by J.C. Hermanson, Jr., et al., Total 35 pp. [57.93C1].

Las Inc., "Statement of Work—Name Search Research Project", Apr. 25, 1995, Total 9 pp.

Las Inc., "Statement of Work—Name Search: Technology Demonstration System", Apr. 24, 1997, Total 8 pp.

Supplemental European Search Report, Oct. 20, 2008, for EP Application No. 04784228.1, Total 2 pp.

Marx, M., and C. Schmandt, "Putting People First: Specifying Proper Names in Speech Interfaces", Proceedings of the 7th Annual ACM Symposium on User Interface Software and Technology, Nov. 1994, Total 11 pp.

Melissa Data, "Name Object for Windows", [online], [Retrieved on Mar. 28, 2005], retrieved from the Internet at <URL: http://www.melisadata.com/NameObject.htm>, Total 24 pp.

Millar, J.B., J.P. Wonwiller, J.M. Harrington, and P.J. Dermody, "The Australian National Database of Spoken Language", Proccedings of the IEEE International Conference on Acoustics, Speech, and Signal Processing, Apr. 1994, Total 4 pp.

MSI, Inc., "NADIS ScrubMaster/SearchMaster", Data Sheet, [online], [Retrieved Mar. 2005], retrieved from the Interent at <URL: http://www.msi.com.au/resources/documents/NScrub.pdf>, Total 3 pp.

Office of Research and Development, "Contract No. 95-F143100-000", Aug. 1, 1995, Total 79 pp.

Office of Research and Development, "Contract No. 97-F131000-000", Jul. 7, 1997, Total 54 pp.

Office of Research and Development, "Solicitation No. RFP 77-95FS", May 24, 1995, Total 72 pp.

Oshika, B.T., B. Evans, F. Machi, & J. Tom, "Improved Retrieval of Foreign Names from Large Databases", Proceedings of the Fourth International Conference on Data Engineering, Feb. 1988, Total 8 pp.

OTS Group, "Data Cleaning & Conversion: Putting Your Data in Experienced Hands", [online], [retrieved Mar. 2005], retrieved from the Internet at <URL: http://www.otsgroup.nl/>, Total 3 pp.

Peoplesmith Software, "Personator 3 for Windows", [online], [retrieved Mar. 2005], retrieved from the Internet at <URL: http://www.peoplesmith.com/>, Total 5 pp.

Pitney Bowes, "FineTune Data: Data Quality Solution—The Next Step for Unparalleled Data Quality", [online], [retrieved Mar. 2008], retrieved from the Internet at <URL: http://www.pbdmt.com/solutions/ftdfeat.htm>, Total 3 pp.

Red Pepper, LLC, "Name Parsing Software Review", Mar. 2005, Total 192 pp.

Roochnik, P., "Computer-Based Solutions to Certain Linguistic Problems Arising from the Romanization of Arabic Names", Dissertation for Doctor of Philosophy in Arabic, Georgetown University, Feb. 19, 1993, Total 375 pp.

Runner Technologies, "Clean_Address( )", [online], [retrieved Mar. 2005], retrieved from the Internet at <URL: http://www.runnertechnologies.com/clean_addr_features.html>, Total 6 pp.

Sagent, "Lifecycle Cleanse", [online], [retrieved Mar. 2005], retrieved from the Internet at <URL: http://www.sagent.com/products/lifecycle_cleanse.asp>, Total 4 pp.

Search Software America, "Data Searching & Matching: Software and Products", [online], Archived Jun. 2, 2002, [retrieved on Sep. 28, 2005], retrieved from the Internet at <URL: http://www.identitysystems.com>and pages linked thereto, Total 70 pp.

Semaphore Corp., "Namechop", [online], [retrieved Mar. 2005], retrieved from the Internet at <URL: http:// www.semaphorecorp.com/nc/namechop.html>, Total 2 pp.

Service Objects, "DOTS Name Validation", [online], [retrieved Mar. 2005], retrieved from the Internet at <URL: http://www.serviceobjects.com/products/dots_namevalidation.asp>, Total 3 pp.

Strategic Applications, "ParseWare Library Overview", [online], [retrieved Mar. 2005], retrieved from the Internet at <URL: http://www.strategicapplications.com/parseware.cfm>, Total 3 pp.

Summit Technical Solutions, "Name and Address Validation", [online], [retrieved Mar. 2005], retrieved from the Internet at <URL: http://www.cms-summit.com/SoftwareSolutions/NameAddVal.htm>, Total 3 pp.

The Software Company, "Active Gender", [online], [retrieved Mar. 2005], retrieved from the Internet at <URL: http://www.softwarecompany.com/activex/activegender.htm>, Total 5 pp.

Valencia, E., and F. Yvon, "Identification de l'Origine Linguistique: le Cas des Noms Propres", Journees Scientifiques et Techniques du Reseau FRANCIL, Avignon, Apr. 1997, Total 22 pp. {English Translation Included}.

Preliminary Amendment 2, Jun. 23, 2004, for U.S. Appl. No. 10/055,178, filed Jan. 25, 2002 by J.C. Hermansen, Total 16 pp. [57.93].

Response to Restriction Requirement, Mar. 7, 2003, for U.S. Appl. No. 10/055,178, filed Jan. 25, 2002 by J.C. Hermansen, Total 2 pp. [57.93].

Preliminary Amendment 1, Aug. 22, 2008, for U.S. Appl. No. 12/197,119, filed Aug. 22, 2008 by J.C. Hermanson, Jr., et al., Total 14 pp. [57.93C1].

Notice of Allowance 1, Jun. 10, 2011, for U.S. Appl. No. 12/197,119, filed Aug. 22, 2008 by J.C. Hermanson, Jr., et al., Total 35 pp. [57.93C1].

Virga, P. and S. Khundanpur, "Transliteration of proper Names in Cross-Language Applications", Proceedings of the 26th Annual International ACM SIGIR Conference on Research and Development in Informaion Retrieval, 2003, Total 2 pp.

Zobel, J., and P. Dart, "Phonetic String matching: Lessons from Information Retrieval", Proceedings of the 19th Annual International ACM SIGIR Conference on Research and Development in Information Retrieval, 1996, Total 8 pp.

Final Office Action 1, Jan. 17, 2002, for U.S. Appl. No. 09/275,766, filed Mar. 25, 1999, by J.C. Hermansen, Total 12 pp. [57.92].

Final Office Action 1, Dec. 12, 2003, for U.S. Appl. No. 10/055,178, filed Jan. 25, 2002, by J.C. Hermansen, Total 9 pp. [57.93].

Final Office Action 1, Mar. 27, 2006, for U.S. Appl. No. 10/096,828, filed Mar. 14, 2002, by L.A. Shaefer et al., Total 11 pp. [57.87].

Final Office Action 1, Feb. 6, 2008, for U.S. Appl. No. 11/092,991, filed Mar. 30, 2005, by L.A. Shaefer et al., Total 18 pp. [57.89].

Final Office Action 2, Dec. 18, 2002, for U.S. Appl. No. 09/275,766, filed Mar. 25, 1999, by J.C. Hermansen, Total 10 pp. [57.92].

Final Office Action 2, Jun. 29, 2007, for U.S. Appl. No. 10/055,178, filed Jan. 25, 2002, by J.C. Hermansen, Total 36 pp. [57.93].

Final Office Action 2, Jun. 11, 2008, for U.S. Appl. No. 10/096,828, filed Mar. 14, 2002, by L.A. Shaefer et al., Total 13 pp. [57.87].

International Preliminary Examination Report, Dec. 15, 2004, for PCT/US2003/007786, Total 4 pp.

International Preliminary Report on Patentability, Mar. 30, 2006, for PCT/US2004/030293, Total 5 pp.

(56) References Cited

OTHER PUBLICATIONS

International Search Report, Jul. 2, 2003, for PCT/US2003/007786, Total 10 pp.
International Search Report and Written Opinion, Jan. 5, 2005, for PCT/US2004/030293, Total 4 pp.
Notice of Allowance 1, Feb. 15, 2005, for U.S. Appl. No. 09/275,766, filed Jan. 25, 2002 by J.C. Hermansen, Total 15 pp. [57.93].
Notice of Allowance 1, Sep. 21, 2005, for U.S. Appl. No. 10/055,178, filed Jan. 25, 2002 by J.C. Hermansen, Total 6 pp. [57.93].
Notice of Allowance 2, Jun. 9, 2008, for U.S. Appl. No. 10/055,178, filed Jan. 25, 2002 by J.C. Hermansen, Total 17 pp. [57.93].
Notice of Allowance 3, Oct. 14, 2008, for U.S. Appl. No. 10/055,178, filed Jan. 25, 2002 by J.C. Hermansen, Total 6 pp. [57.93].
Office Action 1, Dec. 7, 2007, for CN200480031553.8, Total 4 pp.
Office Action 1, Aug. 14, 2001, for U.S. Appl. No. 09/275,766, filed Mar. 25, 1999 by J.C. Hermansen, Total 11 pp. [57.92].
Office Action 1, Mar. 26, 2003, for U.S. Appl. No. 10/055,178, filed Jan. 25, 2002 by J.C. Hermansen, Total 8 pp. [57.93].
Office Action 1, Sep. 12, 2005, for U.S. Appl. No. 10/096,828, filed Mar. 14, 2002 by L.A. Shaefer et al., Total 13 pp. [57.87].
Office Action 1, Sep. 8, 2008, for U.S. Appl. No. 10/942,792, filed Sep. 17, 2004 by L. Shaefer et al., Total 58 pp. [57.88].
Office Action 1, Jul. 17, 2007, for U.S. Appl. No. 11/092,991, filed Mar. 30, 2005 by L.A. Shaefer et al., Total 18 pp. [57.89].
Office Action 1, Jun. 12, 2008, for U.S. Appl. No. 11/188,979, filed Jul. 26, 2005 by J.C. Hermansen et al., Total 16 pp. [57.86].
Office Action 3, Jul. 2, 2002, for U.S. Appl. No. 09/275,766, filed Mar. 25, 1999 by J.C. Hermansen, Total 10 pp. [57.92].
Office Action 3, Oct. 21, 2004, for U.S. Appl. No. 10/055,178, filed Jan. 25, 2002 by J.C. Hermansen, Total 24 pp. [57.93].
Office Action 3, Sep. 20, 2006, for U.S. Appl. No. 10/096,828, filed Mar. 14, 2002 by L.A. Shaefer et al., Total 10 pp. [57.87].
Office Action 3, Sep. 2, 2008, for U.S. Appl. No. 11/092,991, filed Mar. 30, 2005 by L.A. Shaefer et al., Total 33 pp. [57.89].
Office Action 4, May 27, 2005, for U.S. Appl. No. 10/055,178, filed Jan. 25, 2002 by J.C. Hermansen, Total 21 pp. [57.93].
Office Action 4, Apr. 10, 2007, for U.S. Appl. No. 10/096,828, filed Mar. 14, 2002 by L.A. Shaefer et al., Total 10 pp. [57.87].
Office Action 5, Sep. 15, 2003, for U.S. Appl. No. 09/275,766, filed Mar. 25, 1999 by J.C. Hermansen, Total 13 pp. [57.92].
Office Action 5, Apr. 7, 2006, for U.S. Appl. No. 10/055,178, filed Jan. 25, 2002 by J.C. Hermansen, Total 18 pp. [57.93].
Office Action 6, Oct. 19, 2006, for U.S. Appl. No. 10/055,178, filed Jan. 25, 2002 by J.C. Hermansen, Total 18 pp. [57.93].
Office Action 8, Jan. 22, 2008, for U.S. Appl. No. 10/055,178, filed Jan. 25, 2002 by J.C. Hermansen, Total 24 pp. [57.93].
Restriction Requirement, Jul. 26, 2004, for U.S. Appl. No. 09/275,766, filed Mar. 25, 1999 by J.C. Hermansen, Total 4 pp. [57.92].
Restriction Requirement, Feb. 10, 2003, for U.S. Appl. No. 10/055,178, filed Jan. 25, 2002 by J.C. Hermansen, Total 4 pp. [57.93].
Balakrishnan, R., "Country Wise Classification of Human Names", Proceedings of the 5th WSEAS International Conference on Artificial Intelligence, Knowledge Engineering and Data Bases, Feb. 2006, Total 6 pp.
Borgman, C.L., and S.L. Siegfried, "Getty's Synoname and Its Cousins: A Survey of Applications of Personal Name-Matching Algorithms", Journal of the American Society for Information Science, Aug. 1992, vol. 43, No. 7, Total 18 pp.
Branting, L.K., "Name Matching in Law Enforcement and Counter-Terrorism", ICAIL Workshop on Data Mining, Information Extraction, and Evidentiary Reasoning for Law Enforcement and Counter-Terrorism, Jun. 11, 2005, Total 4 pp.
Du, M., "Approximate Name Matching", Master's Degree Project Stockholm, Sweden 2005, Total 55 pp.
Feitelson, D.G., "On Identifying Name Equivalences in Digital Libraries", ACM, published on 2004, Total 17 pp.
Dr. Freeman, A.T., Dr. S.L. Condon, and C.M. Ackerman, "Cross Linguistic Name Matching in English and Arabic: A "One to Many Mapping" Extension of the Levenshtein Edit Distance Algorithm", Proceedings of the Human Language Technology Conference of the North American Chapter of the ACL, Total 8 pp., Jun. 2006.
Galvez, C. and F. Moya-Anegon, "Approximate Personal Name-Matching Through Finite-State Graphs", Journal of American Society for Information Science and Technology, 58(13), Jan. 2007, Total 17 pp.
MacFarlanea, G.J., M. Lunt, B. Palmer, C. Afzal, A.J. Silman, & A. Esmail, "Determining Aspects of Ethnicity Amongst Persons of South Asian Origin: The Use of a Surname-Classification Programme (Nam Pehchan)", Public Health Journal of the Royal Institute of Public Health, Jul. 2006, Total 6 pp.
Miller, K.J. & M.D. Arehart, "Improving Watchlist Screening by Combining Evidence from Multiple Search Algorithms", IEEE 2008, Total 5 pp.
Notice of Allowance 1, Aug. 18, 2009, for U.S. Appl. No. 11/092,991, filed Mar. 30, 2005 by L.A. Shaefer et al., Total 42 pp. [57.89].
Patman, F. and P. Thompson, "Names: A New Frontier in Text Mining", Lecture Notes in Computer Science, Springer-Verlag Berlin, 2003, Total 12 pp.
Pfeifer, U., T. Poersch, and N. Fuhr, "Retrieval Effectiveness of Proper Name Search Methods", Information Processing & Management, 1996, vol. 32, No. 6, Total 13 pp.
Piskorski, J., M. Pikula, K. Wieloch, and M. Sydow, "Towards Person Name Matching for Inflective Languages", ACM, NLPIX 2008, Apr. 22, 2008, Total 10 pp.
Reuther, P., "Personal Name Matching: New Test Collections and a Social Network Based Approach", Mar. 16, 2006, Total 24 pp.
Webster, B.M., "Surname Analysis", Research Evaluation, vol. 13, No. 1, Apr. 2004, Total 8 pp., Beech Tree Publishing, 10 Watford Close, Guildford, Surrey GU1 2EP, England.
Wolinski, F., F. Vichot, & B. Dillet, "Automatic Processing of Proper Names in Texts", European Chapter Meeting of the ACL Archive. Proceedings of the Seventh Conference on European Chapter of the Association for Computational Linguistics, 1995, Total 8 pp.
Final Office Action 1, Apr. 7, 2009, for U.S. Appl. No. 10/942,792, filed Sep. 17, 2004 by L. Shaefer et al., Total 48 pp. [57.88].
Final Office Action 2, Mar. 6, 2009, for U.S. Appl. No. 11/092,991, filed Mar. 30, 2005 by L.A. Shaefer et al., Total 29 pp. [57.89].
Notice of Allowance 1, Jul. 27, 2009, for U.S. Appl. No. 10/942,792, filed Sep. 17, 2004 by L. Shaefer et al., Total 36 pp. [57.88].
Notice of Allowance 1, Nov. 5, 2008, for U.S. Appl. No. 11/188,979, filed Jul. 26, 2005 by J.C. Hermansen et al., Total 36 pp. [57.86].
Notice of Allowance 2, Mar. 18, 2009, for U.S. Appl. No. 11/188,979, filed Jul. 26, 2005 by J.C. Hermansen et al., Total 37 pp. [57.86].
Notice of Allowance 3, Jul. 15, 2009, for U.S. Appl. No. 11/188,979, filed Jul. 26, 2005 by J.C. Hermansen et al., Total 6 pp. [57.86].
Notice of Allowance 4, Mar. 3, 2009, for U.S. Appl. No. 10/055,178, filed Jan. 25, 2002 by J.C. Hermansen, Total 10 pp. [57.93].
Notice of Allowance 5, Jul. 16, 2009, for U.S. Appl. No. 10/055,178, filed Jan. 25, 2002 by J.C. Hermansen, Total 7 pp. [57.93].
U.S. Appl. No. 13/240,891, filed Sep. 22, 2011, entitled "Identifying Related Names", invented by R.T. Gillam, F.E. Patman Maguire, and L.A. Shaefer, Jr., Total 105 pp. [57.93CIP1].
Amendment 1, Sep. 12, 2008, for U.S. Appl. No. 11/188,979, filed Jul. 26, 2005 by J.C. Hermansen et al., Total 16 pp. [57.86].
Amendment 2, Feb. 5, 2009, for U.S. Appl. No. 11/188,979, filed Jul. 26, 2005 by J.C. Hermansen et al., Total 14 pp. [57.86].
Notice of Non-Compliant Amendment, Jun. 9, 2006, for U.S. Appl. No. 11/188,979, filed Jul. 26, 2005 by J.C. Hermansen et al., Total 2 pp. [57.86].
Response to Notice of Non-Compliant Amendment, Jul. 6, 2006, for U.S. Appl. No. 11/188,979, filed Jul. 26, 2005 by J.C. Hermansen et al., Total 5 pp. [57.86].
Preliminary Amendment 1, Jul. 26, 2005, for U.S. Appl. No. 11/188,979, filed Jul. 26, 2005 by J.C. Hermansen et al., Total 14 pp. [57.86].
Preliminary Amendment 1, Sep. 16, 2004, for U.S. Appl. No. 10/096,828, filed Mar. 14, 2002 by L.A. Shaefer et al., Total 14 pp. [57.87].
Preliminary Amendment 1, Jan. 25, 2002, for U.S. Appl. No. 10/055,178, filed Jan. 25, 2002 by J.C. Hermansen, Total 44 pp. [57.93].

(56) References Cited

OTHER PUBLICATIONS

Amendment 1, Dec. 12, 2005, for U.S. Appl. No. 10/096,828, filed Mar. 14, 2002 by L.A. Shaefer et al., Total 19 pp. [57.87].
Amendment 2, May 26, 2006, for U.S. Appl. No. 10/096,828, filed Mar. 14, 2002 by L.A. Shaefer et al., Total 20 pp. [57.87].
Advisory Action 1, Jul. 10, 2006, for U.S. Appl. No. 10/096,828, filed Mar. 14, 2002 by L.A. Shaefer et al., Total 3 pp. [57.87].
Amendment 3, Mar. 20, 2007, for U.S. Appl. No. 10/096,828, filed Mar. 14, 2002 by L.A. Shaefer et al., Total 19 pp. [57.87].
Response to Notice of Non-Compliant Amendment, Feb. 19, 2008, for U.S. Appl. No. 10/096,828, filed Mar. 14, 2002 by L.A. Shaefer et al., Total 15 pp. [57.87].
Amendment 1, Jan. 8, 2009, for U.S. Appl. No. 10/942,792, filed Sep. 17, 2004 by L.Shaefer et al., Total 27 pp. [57.88].
Amendment 2, Jun. 29, 2009, for U.S. Appl. No. 10/942,792, filed Sep. 17, 2004 by L.Shaefer et al., Total 22 pp. [57.88].
Supplemental Notice of Allowance 1, Aug. 26, 2009, for U.S. Appl. No. 10/942,792, filed Sep. 17, 2004 by L. Shaefer et al., Total 1 p. [57.88].
Amendment 1, Nov. 19, 2007, for U.S. Appl. No. 11/092,991, filed Mar. 30, 2005 by L.A. Shaefer et al., Total 11 pp. [57.89].
Amendment 2, Apr. 29, 2008, for U.S. Appl. No. 11/092,991, filed Mar. 30, 2005 by L.A. Shaefer et al., Total 12 pp. [57.89].
Amendment 3, Dec. 2, 2008, for U.S. Appl. No. 11/092,991, filed Mar. 30, 2005 by L.A. Shaefer et al., Total 15 pp. [57.89].
Amendment 4, Jun. 8, 2009, for U.S. Appl. No. 11/092,991, filed Mar. 30, 2005 by L.A. Shaefer et al., Total 11 pp. [57.89].
Amendment 1, Oct. 23, 2001, for U.S. Appl. No. 09/275,766, filed Mar. 25, 1999 by J.C. Hermansen, Total 8 pp. [57.92].
Amendment 2, Apr. 17, 2002, for U.S. Appl. No. 09/275,766, filed Mar. 25, 1999 by J.C. Hermansen, Total 16 pp. [57.92].
Amendment 3, Oct. 2, 2002, for U.S. Appl. No. 09/275,766, filed Mar. 25, 1999 by J.C. Hermansen, Total 11 pp. [57.92].
Amendment 4, Jun. 18, 2003, for U.S. Appl. No. 09/275,766, filed Mar. 25, 1999 by J.C. Hermansen, Total 11 pp. [57.92].
Amendment 5, Mar. 15, 2004, for U.S. Appl. No. 09/275,766, filed Mar. 25, 1999 by J.C. Hermansen, Total 30 pp [57.92].
Response to Restriction Requirement, Aug. 5, 2004, for U.S. Appl. No. 09/275,766, filed Mar. 25, 1999 by J.C. Hermansen, Total 1 p. [57.92].
Supplemental Amendment 6, May 13, 2004, for U.S. Appl. No. 09/275,766, filed Mar. 25, 1999 by J.C. Hermansen, Total 17 pp. [57.92].
Advisory Action 1, Apr. 28, 2004, for U.S. Appl. No. 10/055,178, filed Jan. 25, 2002 by J.C. Hermansen, Total 2 pp. [57.93].
Amendment 1, Sep. 26, 2003, for U.S. Appl. No. 10/055,178, filed Jan. 25, 2002 by J.C. Hermansen, Total 8 pp. [57.93].
Amendment 2, Apr. 12, 2004, for U.S. Appl. No. 10/055,178, filed Jan. 25, 2002 by J.C. Hermansen, Total 12 pp. [57.93].
Amendment 3, Dec. 21, 2004, for U.S. Appl. No. 10/055,178, filed on Jan. 25, 2002 by J.C. Hermansen, Total 6 pp. [57.93].
Amendment 4, Apr. 28, 2005, for U.S. Appl. No. 10/055,178, filed Jan. 25, 2002 by J.C. Hermansen, Total 9 pp. [57.93].
Amendment 5, Aug. 18, 2005, for U.S. Appl. No. 10/055,178, filed Jan. 25, 2002 by J.C. Hermansen, Total 21 pp. [57.93].
Amendment 6, Aug. 7, 2006, for U.S. Appl. No. 10/055,178, filed Jan. 25, 2002 by J.C. Hermansen, Total 21 pp. [57.93].
Amendment 7, Apr. 17, 2007, for U.S. Appl. No. 10/055,178, filed Jan. 25, 2002 by J.C. Hermansen, Total 18 pp. [57.93].
Amendment 8, Oct. 29, 2007, for U.S. Appl. No. 10/055,178, filed Jan. 25, 2002 by J.C. Hermansen, Total 23 pp. [57.93].
Amendment 9, Apr. 22, 2008, for U.S. Appl. No. 10/055,178, filed Jan. 25, 2002 by J.C. Hermansen, Total 15 pp. [57.93].
Notice of Appeal, Apr. 12, 2004, for U.S. Appl. No. 10/055,178, filed Jan. 25, 2002 by J.C. Hermansen, Total 1 p. [57.93].
Notice of Non-Compliant Amendment, Jan. 18, 2008, for U.S. Appl. No. 10/096,828, filed Mar. 14, 2002 by L.A. Shaefer et al., Total 2 pp. [57.87].
Christian, P., "Soundex—Can it be Improved?", Computers in Genealogy, vol. 6, No. 5, Mar. 1998, 8 pp.
Hermansen, J.C., "Automatic Name Searching in Large Data Bases of International Names", ProQuest Dissertations and Theses, 1985, 156 pp.
Namerow, W., et al., "Phonetic Approximator System for Surname Searching", IP.com No. IPCOM000037328D, Dec. 1, 1989, 5 pp.
Weber, G.I., "Achieving a Patient Unit Record Within Electronic Record Systems", Proceedings: Toward an Electronic Patient Record, Mar. 1995, 9 pp.
Office Action 1, dated May 16, 2013, for U.S. Appl. No. 13/240,891, filed Sep. 22, 2011, by Gillam et al., 55 pp. [57.93CIP1].
Response to Office Action 1, dated Aug. 15, 2013, for U.S. Appl. No. 13/240,891, filed Sep. 22, 2011, by Gillam et al., 12 pp, [57.93CIP1].
Final Office Action 1, Jan. 2, 2014, for U.S. Appl. No. 13/240,891, filed Sep. 22, 2011 by R.T. Gillam et al., Total 9 pp. [(57.93CIP1)].
Amendment 2, Mar. 28, 2014, for U.S. Appl. No. 13/240,891, filed Sep. 22, 2011 by R.T. Gillam et al., Total 6 pp. [(57.93CIP1)].
Notice of Allowance, Apr. 9, 2014, for U.S. Appl. No. 13/240,891, filed on Sep. 22, 2011 by R.T. Gillam et al., Total 11 pp. [NOA (57.93CIP1)].

* cited by examiner

LIA Data Stores

| High Frequency | | | |
|---|---|---|---|
| H | S | Garcia | 3 |
| H | S | Salazar | 2 |
| H | S | Sambrano | 1 |
| A | B | Mahmoud | 4 |
| A | B | Jaffar | 2 |
| O | S | Silvestri | 1 |

| N-Grams | | | |
|---|---|---|---|
| H | S | S | ndez | 3 |
| H | S | G | for | 1 |
| H | S | P | bous | 1 |
| A | B | S | fig | 2 |
| O | S | E | agio | 1 |
| O | S | I | ahmo | 5 |

| Morphology | | | |
|---|---|---|---|
| A | B | S | addin | 3 |
| A | B | S | edin | 3 |
| A | B | S | uddin | 3 |
| O | S | P | etto | 1 |
| O | S | S | etti | 2 |
| O | S | S | ini | 1 |

| TAQ | | | |
|---|---|---|---|
| H | S | de | 1 |
| H | S | la | 1 |
| H | S | las | 1 |
| A | B | bin | 3 |
| O | B | el | 1 |
| O | B | lo | 1 |

Digraph Distribution Processor Data Stores

| Digraphs | | |
|---|---|---|
| A | ez | -1.0422 |
| A | nt | 22.8733 |
| A | bd | 38.7221 |
| H | bd | 1.0572 |
| H | ez | 42.5947 |
| H | ri | 16.1242 |

| Trigraphs | | |
|---|---|---|
| A | ez# | -10.0422 |
| A | #nt | -48.1743 |
| A | bd# | 48.4551 |
| H | bd# | -32.1742 |
| H | ez# | 47.5327 |
| H | #ri | 11.1242 |

| Digraph Processor Parameters | |
|---|---|
| A | 44.2331 |
| H | -32.8765 |

| LID Parameters | | | |
|---|---|---|---|
| HFNAME | S | 10 | 8 |
| HFNAME | G | 8 | 6 |
| TAO | S | 5 | 3 |
| TAO | G | 4 | 2 |
| MORPHOLOGY | S | 5 | 3 |
| MORPHOLOGY | G | 4 | 2 |
| NGRAM | S | 4 | 3 |
| NGRAM | G | 3 | 2 |

| Threshold Parameters | | | | |
|---|---|---|---|---|
| A | 50 | 1.4532 | 10 | 8 |
| H | 73 | 20.5000 | 5 | 6 |
| O | 38 | (null) | 100 | 3 |

FIG. 5

| | Name Phrase | Surname | Given Name | Countries |
|---|---|---|---|---|
| 1170a | James | 132884 | 908742 | United States (90%)<br>Germany (10%) |
| 1170b | Smith | 755630 | 3287 | England (95%)<br>Germany (5%) |
| 1170c | de | 1103461 | 34417 | Portugal (30%)<br>Spain (70%) |
| 1170d | la | 96899 | 3530 | France (30%)<br>Mexico (70%) |
| 1170e | Mr. | 0 | 0 | England (100%) |
| 1170f | Jr. | 0 | 50 | United States (95%)<br>Germany (5%) |
| 1170g | al | 50887 | 6697 | England (45%)<br>Iraq (55%) |
| 1170h | Van | 953025 | 43063 | United States (10%)<br>Holland (20%)<br>Vietnam (70%) |
| 1170i | Kim | 1486614 | 179090 | United States (12%)<br>Korea (88%) |
| 1170j | Jae | 1919 | 180806 | United States (5%)<br>Korea (95%) |
| 1170k | Dong | 17594 | 137376 | China (40%)<br>Korea (60%) |
| 1170l | de la Tour | 675 | 0 | Italy (30%)<br>Spain (70%) |
| 1170m | Stephenson | 66548 | 1234 | United States (100%) |
| 1170n | Peter | 486 | 784545 | United States (100%) |

FIG. 11

| | Name Phrase | Culture | Surname | Qualifier |
|---|---|---|---|---|
| 1270a | James | English | 119596 | 0 |
| 1270b | James | German | 13288 | 0 |
| 1270c | Smith | English | 717849 | 0 |
| 1270d | Smith | German | 37781 | 0 |
| 1270e | de | Portuguese | 331038 | 236820 |
| 1270f | de | Hispanic | 772423 | 552588 |
| 1270g | la | French | 29067 | 138333 |
| 1270h | la | Hispanic | 67832 | 322785 |
| 1270i | Mr. | English | 0 | 0 |
| 1270j | Jr. | English | 0 | 494 |
| 1270k | Jr. | German | 0 | 98281 |
| 1270l | al | English | 22899 | 47005 |
| 1270m | al | Arabic | 27988 | 57451 |
| 1270n | Van | English | 95302 | 9535 |
| 1270o | Van | Dutch | 190604 | 19070 |
| 1270p | Van | Vietnamese | 667119 | 66752 |
| 1270q | Kim | English | 29732 | 0 |
| 1270r | Kim | Korean | 1456882 | 0 |
| 1270s | Jae | English | 95 | 0 |
| 1270t | Jae | Korean | 1824 | 0 |
| 1270u | Dong | Chinese | 7037 | 0 |
| 1270v | Dong | Korean | 10557 | 0 |
| 1270w | de la Tour | Italian | 201 | 0 |
| 1270x | de la Tour | Hispanic | 474 | 0 |
| 1270y | Stephenson | English | 66548 | 0 |
| 1270z | Peter | English | 486 | 0 |

FIG. 12

| | Token | Type | Culture |
|---|---|---|---|
| 1390a | al | Prefix | Arabic |
| 1390b | la | Prefix | Hispanic |
| 1390c | de | Prefix | French, Hispanic |
| 1390d | van | Prefix | Dutch |
| 1390e | der | Prefix | Dutch |
| 1390f | din | Suffix | Arabic |
| 1390g | Mr. | Title | English |
| 1390h | Mrs. | Title | German |
| 1390i | Ms. | Title | English |
| 1390j | Miss | Title | German |
| 1390k | Sr. | Title | Hispanic |
| 1390l | Sra. | Title | Hispanic |
| 1390m | Srta. | Title | French |
| 1390n | Herr | Title | German |
| 1390o | Mlle. | Title | French |
| 1390p | Dr. | Title | English |
| 1390q | Jr. | Qualifier | English |
| 1390r | Sr. | Qualifier | English |
| 1390s | III | Qualifier | English |
| 1390t | Esq. | Qualifier | English |
| 1390u | Pere | Qualifier | French |
| 1390v | Fils | Qualifier | French |
| 1390w | Lalla | Qualifier | Arabic |

FIG. 13

| | Original Name |
|---|---|
| 1710a | Sra. Maria del Carmen Bustamante de la Fuente |
| 1710b | Hisham Abu Ali Quereshi Noor Eldin |
| 1710c | Chang Kai Shek |
| 1710d | Nadezhda Ivanova Ovtsyuk |
| 1710e | William Martin Smith-Bagby Jr. |
| 1710f | Kees Andries Van Der Merve |
| 1710g | Kim Jae Dong |
| 1710h | Smith James |
| 1710i | Mr. and Mrs. John Smith |
| 1710j | John Smith and Mary Jones |

1720

| Title | Given Name | Surname | Qualifier | Validity Score | |
|---|---|---|---|---|---|
| Sra. | Maria del Carmen | Bustamente de la Fuente | | 90% | 1780a |
| | Hisham Abu Ali | Quereshi Noor Eldin | | 80% | 1780b |
| | Kai Shek | Chang | | 68% | 1780c |
| | Nadezhda Ivanova | Ovtsyuk | | 95% | 1780d |
| | William Martin | Smith-Bagby | Jr. | 87% | 1780e |
| | Kees Andries | Van Der Merve | | 58% | 1780f |
| | Jae Dong | Kim | | 92% | 1780g |
| | James | Smith | | 93% | 1780h |
| Mr. | John | Smith | | 98% | 1780i |
| Mrs. | John | Smith | | 98% | 1780j |
| | John | Smith | | 98% | 1780k |
| | Mary | Jones | | 99% | 1780l |

FIG. 17

PARSING CULTURALLY DIVERSE NAMES

CROSS-REFERENCE TO RELATED APPLICATIONS

This application is a continuation-in-part application and claims the benefit of U.S. Pat. No. 8,041,560, having U.S. application Ser. No. 12/197,119, filed Aug. 22, 2008, which is a continuation of U.S. application SER. No. 10/055,178, filed Jan. 25, 2002, now abandoned which is a continuation of and claims the benefit of U.S. Pat. No. 6,963,871, having U.S. application Ser. No. 09/275,766, filed Mar. 25, 1999, which is a non-provisional of and claims the benefit of U.S. Provisional Patent Application No. 60/079,233, filed Mar. 25, 1998, and the entire contents of each of these applications is incorporated herein by reference.

COPYRIGHT

A portion of this disclosure contains material in which copyright is claimed by the applicant and/or others. The copyright owner has no objection to the copying of this material in the course of making copies of the application file or any patents that may issue on the application, but all other rights whatsoever in the copyrighted material are reserved.

BACKGROUND

Embodiments of the invention relate to processing names in general, including parsing personal names that are representative of multiple cultures.

Also, embodiments of the invention relate generally to automatic data processing systems that search and retrieve records from a database based on matching of personal names, and to improved systems and methods for intelligently processing name comparisons.

Information about individuals is often stored in a computer. Access to that information is most readily gained by using the name of the individual involved. The nature of names, however, their behavior and permutations, pose significant challenges to information retrieval. Names vary during one's life (e.g., through marriage or professional preparation); they take on different forms, depending on the formality of the situation (WILLIAM CARVER/BILLY CARVER); they may be spelled differently if recorded by someone other than the individual (PRICE PRIES). To amplify the difficulties even more, naming conventions vary across cultures. It may not be appropriate to assume that the typical American name structure of single given name (first name), single middle name or initial followed by a surname (last name) applies in a database that contains names from all over the world, a situation that is usual in today's world of global technology and communication. Names from other cultures may have compound surnames or may be composed of only one name. Names written in writing systems other than Roman may be transcribed in a variety ways into the Roman alphabet because there is no single way to represent sounds that occur in another language but do not occur in English, causing significant differences in the spelling (KIM/GHIM).

Adequate information retrieval that is based on the name must anticipate the range and kinds of variation that can occur in names, both generally and in specific cultures. Other name search or information retrieval systems are generally unable to recognize or address the full range of variation in names. Some systems assume that names are static and search only for an exact match on the name. These systems cannot accommodate even the slightest spelling variations, initials or abbreviations (JOS. Z. BROWN/JOSEPH ZACHARY BROWNE). Other systems may use techniques or keys (such as Soundex or Soundex-like keys) that permit some minor spelling differences between names (DORSHER/DOERSHER) but these techniques generally fail to cope with significant variation (DOERSHER/DOESHER) or problems posed by names from non-Anglo cultures (ABDEL RAHMAN/ABDURRAMAN). If cultural differences are recognized, it is typically through use of equivalency lists or tables. Some of the more common variants can be accommodated in this way, but retrieval is then limited to those items on the list and cannot accommodate new representations or random variation or keying errors (GOMEZ/BOMEZ).

For a system to reach a level of adequacy for automatic name searching, it must therefore address a diverse set of issues related to name variation. Although spelling variations can often be addressed through character-matching techniques (e.g., SMITH/SMYTH), false-positive matches can result from traditional string or character comparisons when common morphological endings, such as OVICH, occur at the end of otherwise dissimilar names (e.g., ZELENOVICH/JOVANOVICH). Transcription from foreign writing systems to the Roman writing system poses additional spelling concerns. Different character sets, dialectal variations and sounds that are not represented in Roman alphabetic form at all contribute to the possibility of multiple, and often inconsistent, representations of the same name. A single Chinese character (ideogram) can be transcribed to produce numerous roman forms that have little or no resemblance to one another due to dialectal variations. For example, the character CHANG, JANG and ZHANG are different roman representations of the exact same Chinese name, as are the names WU, MHO and ENG. Similarly, a single Arabic name can result in transcriptions as diverse as KHADHAFI, CODOFFI, QATHAFI.

Character-based systems may also be confronted with significant retrieval problems caused by names with the same pronunciation but with divergent spellings. WOOSTER, WORCHESTER, and WUSTER may all share at least one identical pronunciation and yet show very different spellings. When name data are shared orally, the speaker's pronunciation, the listener's hearing (or mishearing) of the name and the speaker's expectations about the spelling of the name will impact the final written representation of a name. For example, a telephone reservationist may record a caller's name with a variety of phonetically correct spellings, which may not correspond (and may therefore not be matched to) an existing database record for that caller.

Another common cause of name variation, which creates retrieval difficulty for name search systems, is the inclusion or exclusion of name data. Depending on the data source, names may be formal such as THOMAS EDWARD WINTHROP III, or informal such as TOM WINTHROP. An ideal name search system would be capable of correlating these two names, even though only a portion of the full name is available. To predict the relationship among variant formats of names, the system must also be able to recognize what rules govern which elements can be deleted or included or changed in different cultures. MARIA DEL CARMEN BUSTOS SAENZ will become MARIA DEL CARMEN BUSTOS DE LOPEZ, if she marries JUAN ANTONIO LOPEZ GARCIA. Predicting the relationship between these names is fundamental to retrieval success.

In many name search applications, it is important to identify variant forms of a name that are considered legitimate and to link and preserve the variations; in others, it may be appropriate to establish one form of a name and to treat all other forms as errors. Even if the data base is cleaned by linking variant forms and eliminating identifiable errors, users may search for names under yet more variations.

U.S. Pat. No. 5,040,218 to Vitale et al. discloses a voice synthesis system which attempts to identify the origin of a name to enhance pronunciation. The system first searches a dictionary for a name, and if the name is not found, uses grapheme and n-gram analysis to identify the name's likely origin. Similarly, U.S. Pat. No. 5,062,143 to Schmitt shows a system that identifies name origin using n-gram analysis.

U.S. Pat. No. 5,724,481 to Garberg et al. shows a method of matching proper names in a database using a phonemic representation.

U.S. Pat. No. 5,758,314 to McKenna shows an international database processing system. However, this system uses Soundex algorithms to process Unicode input for all cases, rather than providing a name searching system with culture-specific algorithms.

Design Pat. D359,480 shows an IPA-based computer keyboard, but does not disclose any use of IPA for identifying data records.

The article "Identifying Source Languages: the Case of Proper Names" by Valencia and Yvon (1997) discloses statistical models for name searching based on n-gram comparisons. The article also discloses determination of the source language and the use of different statistical models for comparisons, based on the source language.

John Hermansen, a named inventor, authored a doctoral dissertation, "Automatic Name Searching in Large Data Bases of International Names" (1985) which explores the concept of cultural differences in names. The document suggests searching using different culturally specific algorithms, but discloses only a simple n-gram based algorithm.

The assignee has developed a software program known as PC-NAS. An early version of this program was incorporated into a government computer system more than one year before the priority date of this application. This early version performed name searching using a combination of n-gram distribution and positional properties, and included a limited name regularization algorithm as part of an Arabic processing algorithm. Its architecture included sets of algorithms applicable to different cultures, but no automatic classification of the cultural origin of a name.

U.S. Pat. No. 5,485,373 to Davis et al. discloses a text searching system which relies on a Unicode representation (not a phonetic alphabet). The Davis system may vary algorithms based on the language being searched, but has no name classifier. This system is not designed to search for proper names; comparisons are performed based on a Unicode representation, which is not a phonetic alphabet.

Other patents relating generally to computerized language analysis and processing include: U.S. Pat. No. 5,323,316 to Kadashevich et al.; U.S. Pat. No. 5,337,232 to Sakai et al.; U.S. Pat. No. 5,369,726 to Kroeker et al.; U.S. Pat. No. 5,369,727 to Nomura et al.; U.S. Pat. No. 5,371,676 to Heemels et al.; U.S. Pat. Nos. 5,375,176 and 5,425,110 to Spitz; U.S. Pat. No. 5,377,280 to Nakayama; U.S. Pat. No. 5,432,948 to Davis et al.; U.S. Pat. No. 5,434,777 to Luciw; U.S. Pat. No. 5,440,663 to Moese et al.; U.S. Pat. No. 5,457,770 to Miyazawa; U.S. Pat. No. 5,490,061 to Tolin et al.; U.S. Pat. No. 5,515,475 to Gupta et al.; U.S. Pat. No. 5,526,463 to Gillick et al.; and U.S. Pat. No. 5,548,507 to Martino et al.

None of these earlier systems provide a satisfactory system and method for multicultural name searching. Thus, the inventors believe there is a need for an improved system and method for searching name-based records and for determining the degree of similarity between two name representations.

Culturally diverse names may be parsed differently, despite having similar syntactic characteristics. For example, in an English name that includes three tokens, the first two tokens typically represent given names, and the last token typically represents a surname. However, in names of other ethnicities, the middle token may represent a qualifier for the last token, so the first token may represent a given name, and the last two tokens may collectively represent a single surname. As another example, a given name typically precedes a surname in an English name, while a surname typically precedes a given name in an Asian name. For these and other reasons, parsing a group of names correctly and consistently can be difficult, particularly when names within the group represent multiple cultures.

SUMMARY

Provided are a method, computer program product, and system for parsing a name. A name to be parsed is received. A culture of the name is identified. One or more name phrases from the name are identified. Statistics for the one or more name phrases are identified. It is determined whether to perform a first parsing technique that parses different types of name elements within at least one field of the name. In response to determining that the first parsing technique is to be performed, the name is parsed using the statistics and the first parsing technique. In response to determining that the first parsing technique is not to be performed, the name is parsed using the statistics and a second parsing technique.

BRIEF DESCRIPTION OF THE SEVERAL VIEWS OF THE DRAWINGS

Referring now to the drawings in which like reference numbers represent corresponding parts throughout:

FIG. 5 shows a sample structure for data tables used in the linguistically informed decision processor of FIG. 4 in accordance with certain embodiments.

FIG. 11 shows a first example of records in a database used in classifying name phrases of a name in accordance with certain embodiments.

FIG. 12 shows a second example of records in a database used in classifying name phrases of a name in accordance with certain embodiments.

FIG. 13 shows an example of a list used in classifying tokens of a name in accordance with certain embodiments.

FIG. 17 is an illustration of examples of names before and after parsing in accordance with certain embodiments.

DETAILED DESCRIPTION

Figure 1A:
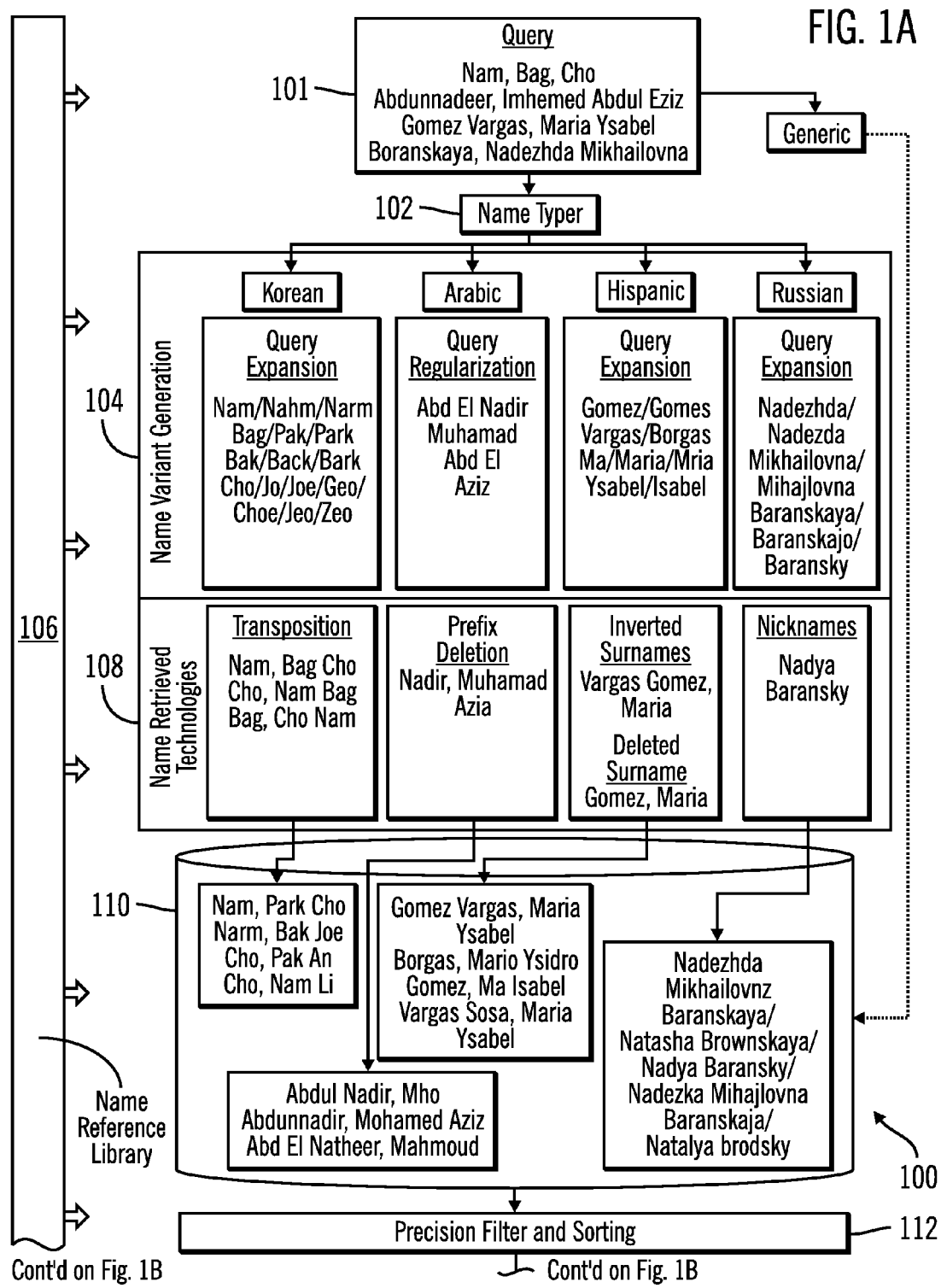
FIGS. 1A and 1B are a block diagram of the structure of an improved name searching and comparison system in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

It is a general object of the present invention to provide a name searching system architecture with multiple processing options, which automatically selects and uses an appropriate cultural-specific set of algorithms to search for database names and evaluate their proximity to a query name.

Another broad object of the invention is to provide a system and method implementing multi-algorithm name searching strategies, where search processing differs based on one or more of: culture, ethnicity, distribution, and language.

Another more specific object of the invention is to provide an improved system and method for conducting searches using a combination of n-gram distribution and positional properties to identify matches.

A further object of the invention is to provide an improved cultural name classifier which leads to application of an appropriate set of name-regularizing linguistic rules that generate a standardized name based on stored cultural intelligence.

Yet another object of the invention is to provide an improved name classifier, incorporating a multi-step process, including preemptive lists, linguistic rules, n-gram analysis, and additional algorithms.

A further object of the invention is to provide an improved name searching system, incorporating segment-level pre-processing. Segmentation rules and syllabic stress rules contribute to a determination of where "white space" should appear in the name. Algorithms determine which graphemes are mapped to which phonemes (based on phonological, historical, and morphological principles).

Another significant object of the invention is to provide a name searching system and method incorporating an innovative key-searching system based on the International Phonetic Alphabet (IPA). This technique converts the query name to a plurality of IPA representations, which are then used to select matching keys in a first pass through the database.

A further object of the invention is to provide a name searching system and method that selectively uses sets of generic and language-specific spelling rules to infer possible phonological manifestations for personal names. A unique aspect of the comparison algorithm derives a scored match based on atomic phonological features.

Additional objects and advantages of the invention will be apparent upon review of the specification, including its drawings and appendices A-N.

The present invention provides an improved automatic data processing system for searching names and an improved process for effectively searching and retrieving personal names in a database. It also provides a mechanism for a user to determine the distance between two names, i.e., how closely two personal names match.

In one aspect of the invention, "fuzzy logic" name searching and matching technology is provided to locate a target database record despite a lack of absolute identity between a query name and a record name.

In one embodiment, a complete automated name searching system is provided, incorporating various advantageous features of the present invention. The automated search system incorporates an automatic name classifier, a multi-path architecture in which different algorithms are applied based on cultural identity of the name, name variant generation, query regularization and expansion, compensation for transpositions, affixes, and inversions, and sorting and filtering of output. The name classifier incorporates a preemptive list, analysis of morphological elements, length, and linguistic rules. The name regularizer produces a computer recognized form (character based computational representation) rather than a human recognizable form of the name. The software design uses a pronunciation equivalent (e.g. IPA) representation and language specific rules to generate name searching keys, which are used in a first pass to eliminate database entries which are obviously not matches for the name of interest.

In another embodiment, the inventive search methodologies are implemented as Application Program Interfaces (APIs) that can be integrated into an existing program application or can be used to provide the foundation for a new program application that requires name matching capabilities. In API form, the features of the present invention may be selectively used in various combinations is depending on the requirements of the particular application. A callable set of library routines include an intelligent preprocessor and a name evaluator that produces a score comparing a query name and database name, based on a variety of user-adjustable parameters. The user-controlled parameters permit tuning of the search methodologies for specific custom applications, so as to achieve desired levels of precision and recall for name searching in widely varying operational settings.

Figure 1B:
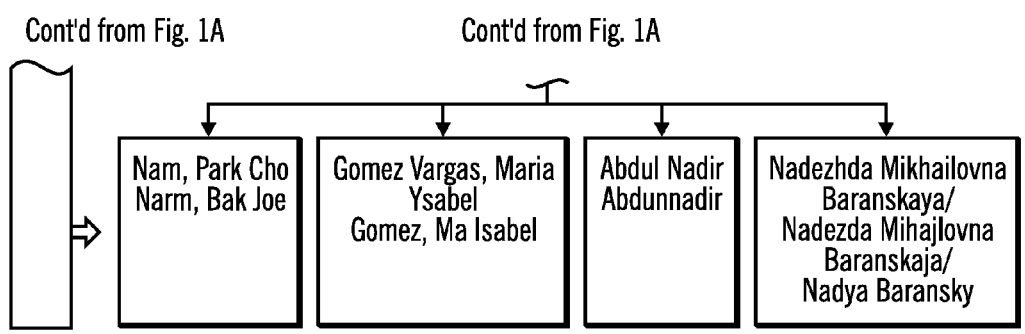

FIGS. 1A and 1B show a multi-algorithmic name search system 100 in accordance with certain embodiments, in block schematic form. In this embodiment, system 100 sequentially performs three basic processes. First, system 100 selects a search strategy based on the cultural origin, distribution, language or ethnicity of the name in question and pre-processes the name to break it into its component parts for processing. Second, a subset of the available database records is selected, based on a culture-relevant key-indexing strategy. The objective of this subsetting process is to select a set of keys that are likely matches for the name in question. Finally, the records selected in the second process are subjected to a similarity measurement, using a complex algorithm tailored according to the selected search strategy, to evaluate and rank-order potential matches. Thus, system 100 adopts a search strategy that is specific to the ethnicity or cultural origin of the name to be matched and implements that strategy by performing a two-pass search with algorithms particularly adapted for searching those names.

Referring now to FIGS. 1A and 1B, system 100 comprises name classifier module 102, variant generation module 104, name reference library 106, name retrieval technology processing module 108, retrieval module 110, and precision filter and sorting module 112. System 100 has an input query 101 and an output 114.

Processing of a query begins with evaluation of the searched name by name classifier module 102. Name classifier module 102 evaluates spelling, word segmentation, titles, prefixes and suffixes, and other identifiable features of the name to determine whether it falls into one of a predetermined set of identified cultural origins, including, for example, Chinese, Arabic, Hispanic, or Russian. Anglo names and names which do not fall into one of the predetermined set of special-case cultures are classified as "other" and processed according to a generic cultural algorithm. Appropriate pre-processing is also performed to segment the name appropriately (standardize the handling of spacing between name segments and the order of the segments) and identify apparent surnames, given names, honorifics, etc., that are part of the input name. The operation of the name classifier in this regard is unique and inventive. To determine the type of name, name classifier module 102 may use one or more of the following, depending on the observed characteristics of the name in question: a list of names which occur with high frequency in various cultures (used to preemptively type common names without extensive algorithmic processing), culture-specific linguistic rules in the form of a Titles, Affixes, and Qualifiers (TAQ) lookup table, n-gram based name typing, and name length. N-gram name typing according to the present invention may be performed as a digraph, trigraph or other n-gram analysis where both positional and distributional properties of the n-grams (e.g., digraphs and trigraphs) are used in the algorithm for making the type determination. Name classifier module 102 preferably operates according to the software design description in Appendix A, which forms a part of this specification.

Figure 3:
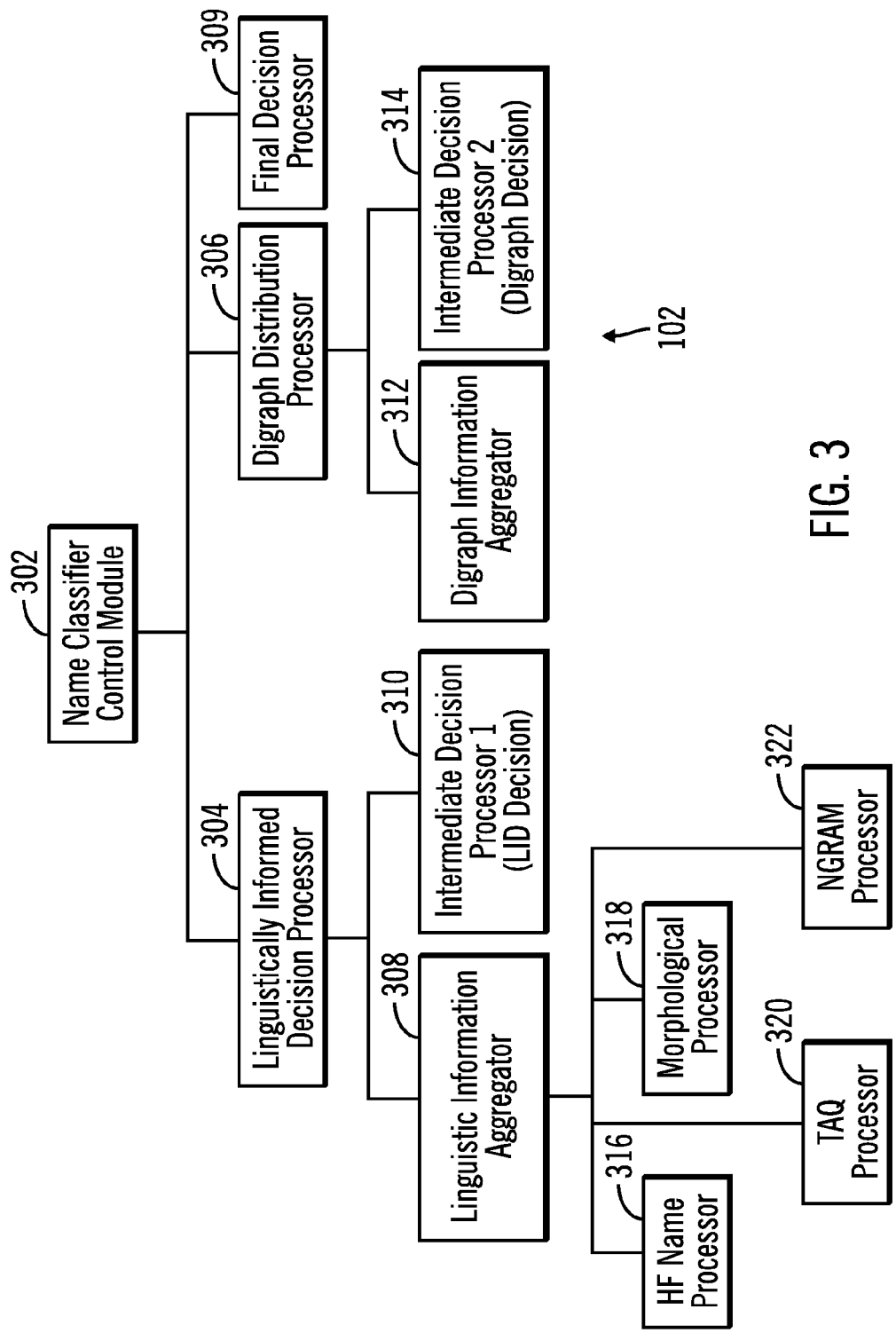
FIG. 3 is a block diagram showing the structure of a name ethnicity classifier in accordance with certain embodiments.

FIG. 3 shows the software modules incorporated in name classifier module 102 in more detail in accordance with certain embodiments. Name classifier module 102 incorporates a name classifier control module 302, a linguistically informed decision (LID) processor 304, a digraph distribution processor 306, and a final decision processor 309. Digraph distribution processor 306 incorporates digraph information processor 312 and digraph intermediate decision processor 314.

LID processor 304 incorporates linguistic information aggregator 308 and LID intermediate decision processor 310. LID aggregator 308 includes high frequency name processor 316, morphological processor 318, title/affix/qualifier (TAQ) processor 320, and ngram processor 322.

LID processor 304 accumulates and weighs factors from multiple knowledge sources to determine whether there is sufficient evidence to identify the input name as belonging to a particular ethnicity, e.g. Hispanic, Arabic, etc. Linguistic information aggregator 308 performs linguistic analysis, gathering information and scoring for the input name. In embodiments, linguistic information aggregator 308 generates scores from four data sources. High frequency name processor 316 accesses a high frequency name data store of names that occur frequently in particular cultures. A match with one of these names causes aggregator 308 to retrieve and record the culture associated with the name and a confidence score associated with that name. TAQ processor 320 breaks the name into particles and makes use of the information contained in those particles to match a list of titles, affixes, and qualifiers commonly used in names of various cultures, to help determine cultural affinity. The input name is segmented based on spaces in the name, and for each segment present in the input name, TAQ processor 320 determines whether that segment is a particle present in a TAQ data store. If so, TAQ processor 320 retrieves and records the culture, name field, and confidence score associated with that TAQ particle.

Morphological processor 318 processes morphological elements such as "-ovich" which suggest a particular cultural affinity. Morphological processor 318 determines whether morphemes in a morpheme data store are present in the input name by searching for matching substrings of the name segments in the input name. For each morpheme found in the input name, morphological processor 318 records the morpheme found, the culture, name field, and confidence level associated with that morpheme.

N-gram processor 322 searches the input name for strings of letters that occur with statistical significance in names with a given cultural affinity. For each n-gram present in an associated n-gram data store, n-gram processor 322 determines whether that n-gram is present in the input name. When a match is found, the processor records the n-gram found, the culture, name field, and score associated with that n-gram.

To avoid conflict between treatment of name segments and particles by the various processing modules operating on the input name, an order of precedence is established for processing. The order of precedence is preferably TAQ particle, morpheme, and then n-gram. That is, if a string of letters is identified as a TAQ particle, that string or any substring cannot also be identified as a morpheme or n-gram for that culture. If a string is identified as a morpheme, that string and its substrings cannot be considered as part of an n-gram for that culture. Locating the name among the high frequency names for a culture does not preclude morpheme or n-grams processing of the high frequency name, but if the confidence level in the high frequency match is high, further processing may not be necessary.

Figure 4:
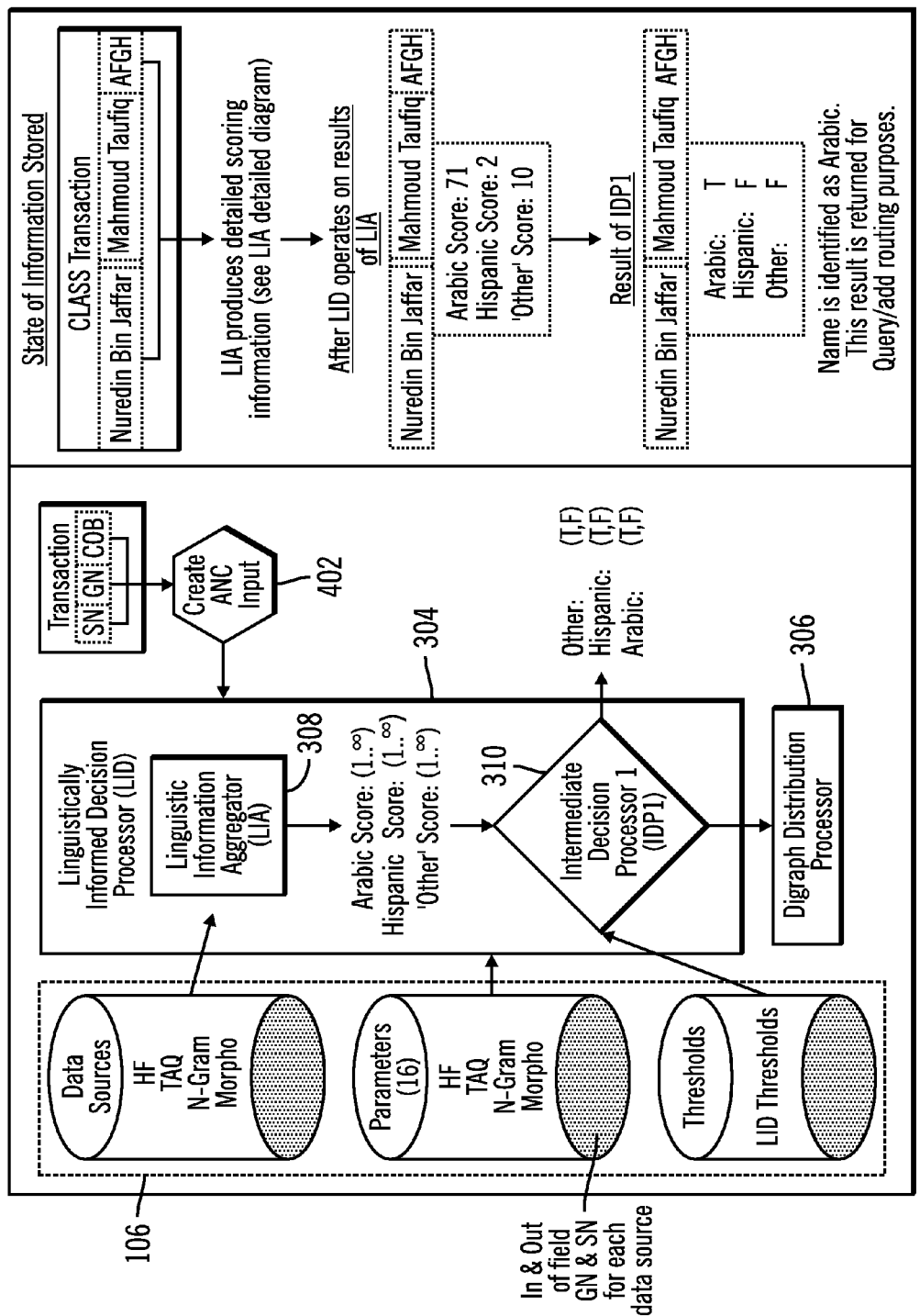
FIG. 4 is a schematic diagram showing the structure and operation of a linguistically informed decision processor used in the classifier of FIG. 3 in accordance with certain embodiments.

FIG. 4 is a schematic diagram showing the structure and operation of linguistically informed decision processor 304 in more detail in accordance with certain embodiments. Linguistic information aggregator 308 collects necessary information from the input name 402 and name reference library 106, which includes the tables and other data used by linguistic information aggregator 308 (including high frequency name processor 316, morphological processor 318, title/affix/qualifier (TAQ) processor 320, and ngram processor 322, all shown in FIG. 3). A sample structure for these tables is shown in FIG. 5 in accordance with certain embodiments.

As shown in FIG. 4, processed information from linguistic information aggregator 308 passes to LID intermediate decision processor 310, where it is processed and the results passed to digraph distribution processor 306 or to final decision processor 309 (shown in FIG. 3).

LID intermediate decision processor 310 makes a preliminary decision about the cultural affinity of the name, based on the scoring information gathered by linguistic information aggregator 308. Processor 310 determines whether enough linguistic information has been gathered by LIA 308 to confidently determine that the input name belongs to one of the cultures identified by the system. Processor 310 accepts as input one aggregate LID score for each culture, as well as an aggregate LID score for "other." For each score, processor 310 compares the score to a LID threshold for the appropriate culture. If the LID score for a culture exceeds the threshold for that culture, processor 310 returns a value of "true" for the indicated culture. A "true" value for a culture indicates that enough evidence has been gathered to confidently identify the name as belonging to that culture. A "false" value for a culture indicates that not enough evidence has been accumulated to suggest that the name belongs to that culture. Alternatively, processor 310 may return a value for each culture equal to the LID score minus the LID threshold for that culture; in this case, negative values correspond to "false" and positive values correspond to a "true" indication.

Names which are strongly associated with one culture based on the output of LID intermediate decision processor 310 will not be processed further to identify their cultural origin, i.e. digraph and other analysis will be skipped.

Assuming the name has not been definitely identified, the surname portion is processed by digraph distribution processor 306. Based on a statistical model derived from digraph distribution statistics for names within various cultures, processor 306 computes a likelihood that the input name has a particular cultural origin. The information gathered from LID and digraph processing is combined, along with any other available information on the person (such as country of birth), in final decision processor 309. The available factors are weighted according to their confidence level to maximize the likelihood of an accurate ethnic origin evaluation. The result is an output indicating the likely classification of the name.

Following name typing, the system executes name variant generation module 104, which pre-processes the names according to culture-specific rules to generate query regularizations, based on algorithms adapted specifically for the cultural origin of the name in question, as determined by the name classifier. Variant generation module 104 also generates query expansions, i.e., identifies expected variants of the name to enhance matching capability.

Figure 6:
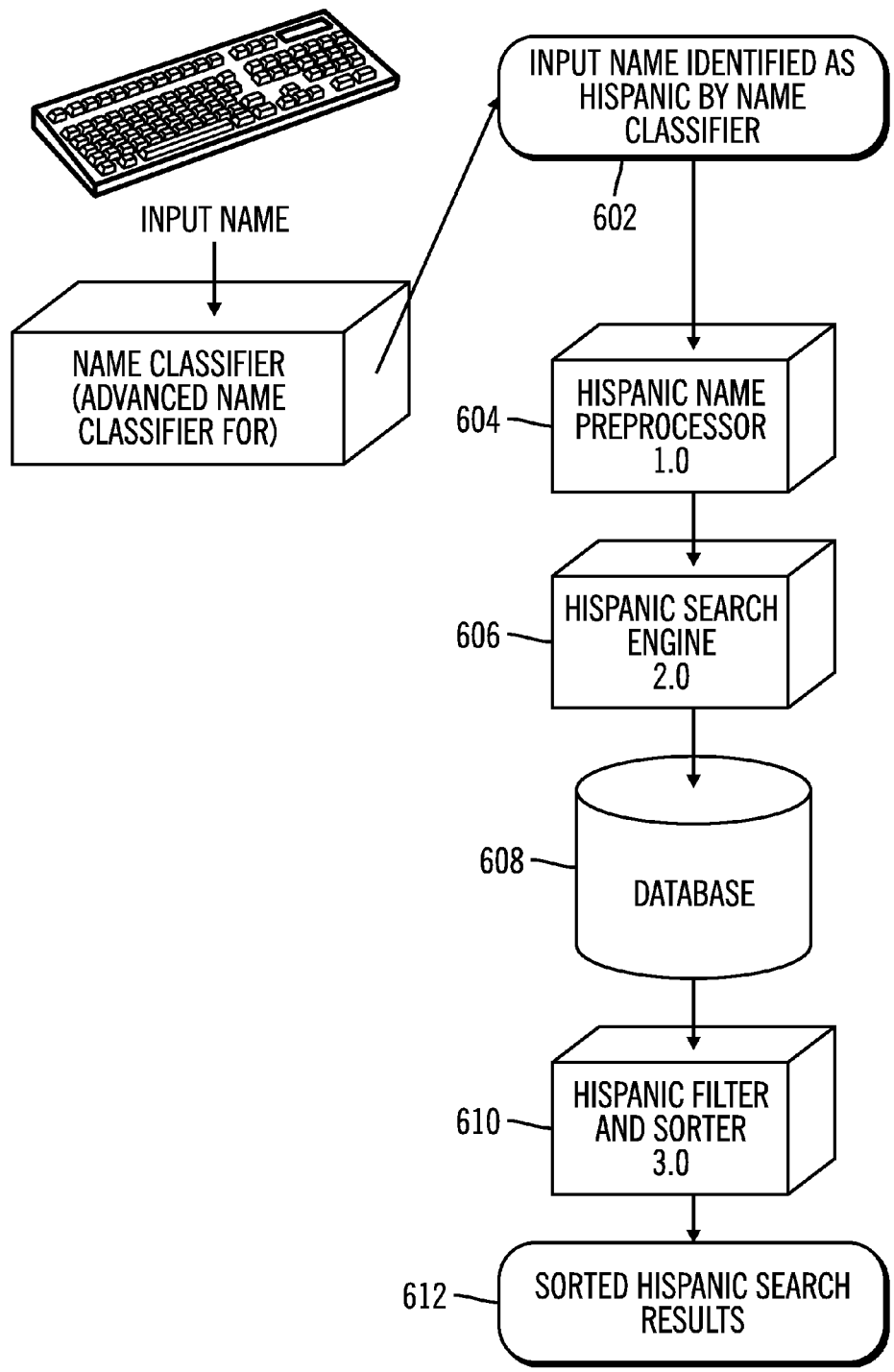
FIG. 6 is a flowchart showing an Hispanic name searching process used in accordance with certain embodiments.

As noted above, preferably, specialized processing is provided for each of a variety of ethnic name origins. Appendices B and C, which form a part of this specification, are software design descriptions for preprocessing and search algorithms for Arabic and Hispanic type names, respectively. As an example of such processing, the Hispanic processing algorithm referenced in Appendix C will now be discussed in some detail. FIG. 6 is a flowchart showing Hispanic name processing used in accordance with certain embodiments. The process begins in name classification in block 602 when the input name is identified as an Hispanic name. The name is then fed to Hispanic name preprocessor in block 604, and to the Hispanic search engine in block 606, which searches database 608. Then, an Hispanic sorter and filter are applied in block 610. The process produces sorted Hispanic search results as an output in block 612.

Figure 7:
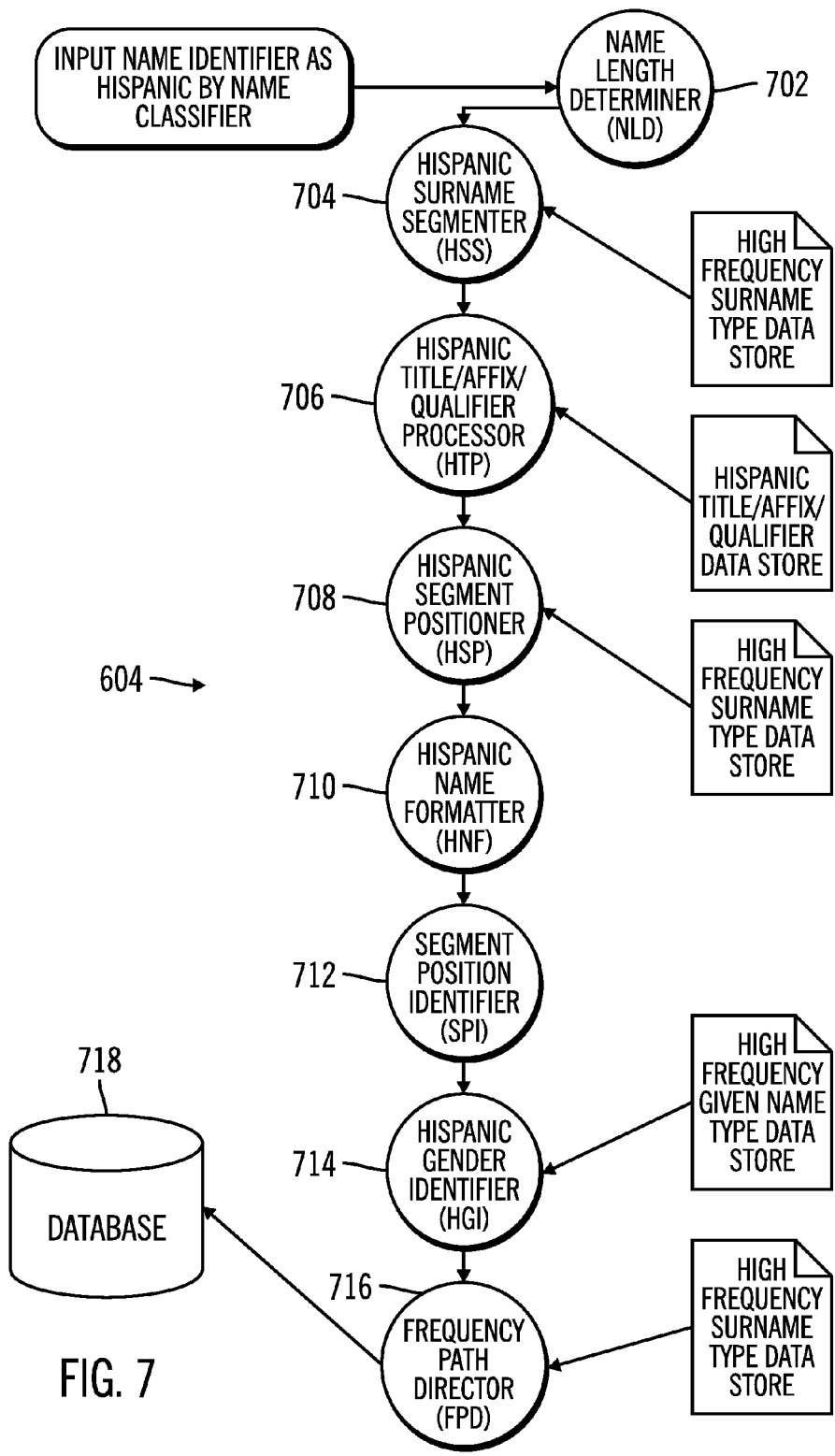
FIG. 7 is a flowchart showing an Hispanic name preprocessor in the process of FIG. 6 in accordance with certain embodiments.

FIG. 7 is an expanded flowchart showing an operational process of the Hispanic name preprocessor, referenced in Block 604 of FIG. 6 in accordance with certain embodiments. The Hispanic name processor prepares a name which has been identified as Hispanic for processing by the Hispanic search engine by identifying name segments and determining their disposition, manipulating the name segments to generate additional query formats, determining name length and record gender, specifying the frequency character of each name segment, and generating search keys.

The process begins with a name length determiner operation on Block 702, which determines the length of the surname. Next, the name is processed by a Hispanic surname segmenter in block 704. This operation divides surnames exceeding a predetermined length (e.g. nine characters) into component segments to compensate for the fact that fixed size data fields often do not accommodate an entire Hispanic surname, leading data entry operators to conjoin name segments in a single field. Then, additional query records are generated for the separated segments and alias records are added for the separated surname segments. This process accesses a high frequency surname type data store to identify surname portions that should be separated. For example, this operation would separate "RAMIREZDELAPAZ" in the surname field into RAMIREZ DELA PAZ and "PEREZDELOPEZ" into PEREZ DE LOPEZ by finding the known surname components DE and DELA.

An Hispanic TAQ processor operates in Block 706 to scan the given name and surname for known titles, affixes, and qualifiers which do not have useful search value. TAQ elements such as DEL, DELA, DE, and SAN are then flagged to be either deleted, disregarded during matching operations, or removed. Delete means that the segment is disregarded for the remainder of the name search process and contributes marginal information to the filter process, but is not actually removed from the record. Disregard means the segment is disregarded in the remainder of the name search process but contributes to evaluation in the filter process. Remove means that a segment conjoined to the name stem is removed from the stem, and then flagged to be either deleted or disregarded as appropriate.

The Hispanic segment positioner in Block 708 operates to move any high frequency surname found in the given name field into the surname field. The name is then formatted by a Hispanic name formatter in Block 710 to generate additional name formats in case the record has more than two surname stems. Next, the name is processed by a segment position identifier in Block 712 to identify the relative position of each of the surname and given name stems. Hispanic names generally contain more than one stem in the given name and surname. In a given name, the leftmost name stem generally indicates gender; in a surname, the leftmost stem is the family name and the other stems are differentiators. Therefore, it is important to identify names that are out of position so that this may be corrected and their relevance appropriately evaluated during the search.

Next, the likely gender of the name is identified by a Hispanic gender identifier in Block 714. The gender identifier attempts to predict gender based on the gender marker of the leftmost given name segment, but may also rely on (or override the apparent gender) based on additional information such as a gender indicated as associated with the search name.

The name is processed by a frequency path director in Block 716 which directs a record for high frequency processing or low frequency processing depending on the presence or absence of high frequency surnames in the input name string.

Figure 8:
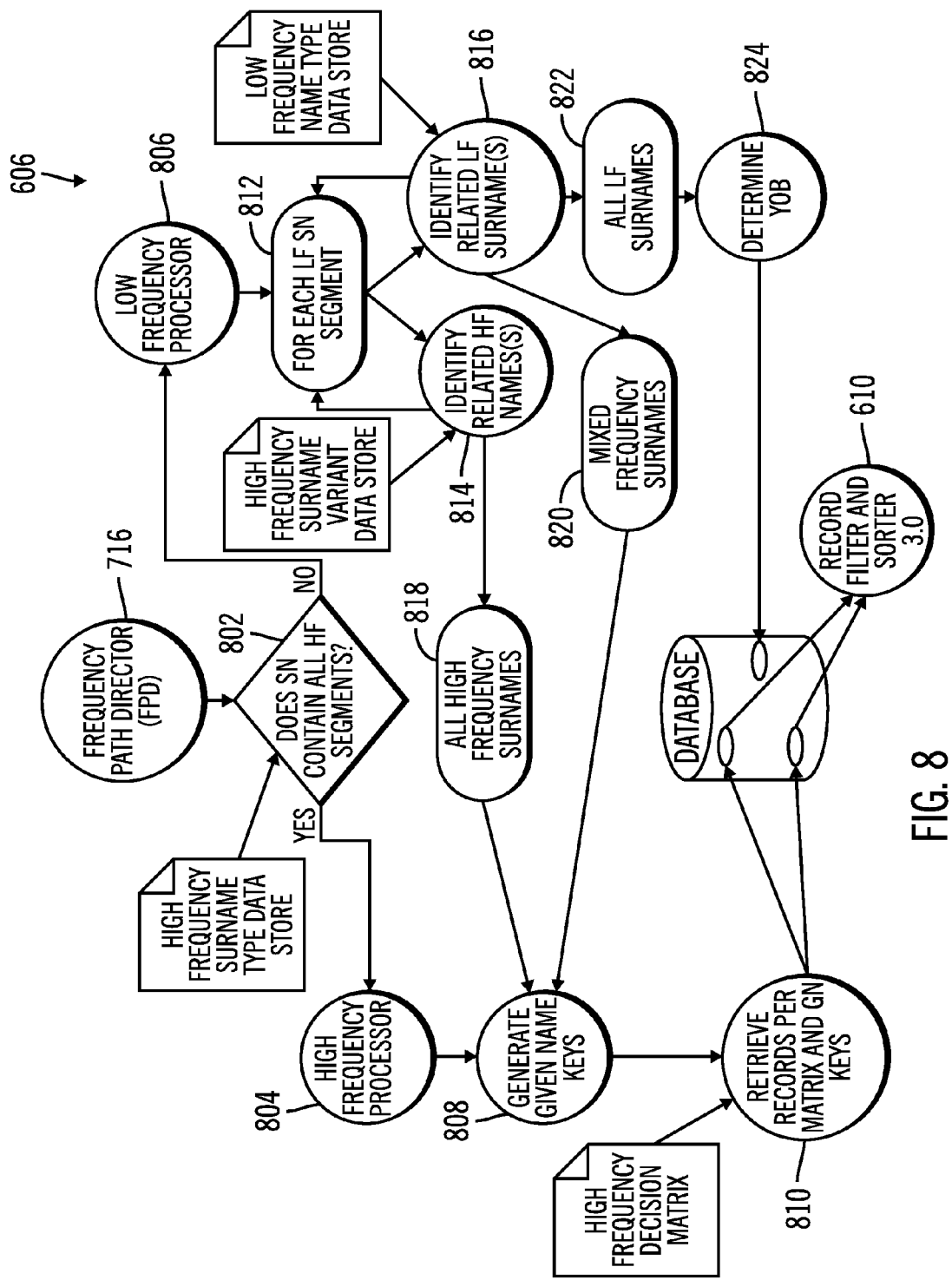
FIG. 8 is a flowchart showing an Hispanic search engine in the process of FIG. 6 in accordance with certain embodiments.

In FIG. 8, the flow of operation of the Hispanic search engine 606 is shown in more detail in accordance with certain embodiments. As described above, the frequency path director operates in block 716 and then determines in block 802 whether the surname contains all high frequency segments. If so, control passes to the high frequency processor in block 804. If not, control passes to the low frequency processor in block 806.

The high frequency processor operation begins in Block 808 with generation of keys for the given names. Then, in block 810, records are retrieved according to a high frequency surname matrix and the given name keys. Control then passes to filter and sorter 610 (shown in FIG. 5).

Low frequency processor operation begins in Block 812 where each low frequency surname segment is examined to identify related high frequency and low frequency surnames, in blocks 814 and 816. This processing loop continues until names related to the segments have been identified. A "relationship" to a high frequency surname is determined by digraph comparison. If the number of identical digraphs exceeds a specified threshold, the surname is deemed to be a mere spelling variant of the similar high frequency surname. If the surnames all relate to known high frequency names, control passes through block 818 to block 808 in the high frequency processor. If the surnames have mixed high and low frequency relationships, control passes through block 820 to block 808. If all surnames have low frequency, control passes through block 822 to block 824. In block 824, a year of birth range is determined for the name. Records are then retrieved based on name content (same or different), position of the name segments, the year of birth range, the record gender, and possibly additional restrictions based on the given name.

Referring again to FIGS. 1A and 1B, the typing and processing of names within the system is preferably informed by cultural information encoded in a name reference library 106. The factors included in name reference library 106 are identified in the database structures shown in Appendix D, which forms a part of this specification. Appendix E, which also forms a part of this specification, provides additional flowcharts and software descriptions for a preferred embodiment of name classifier module 102 and the Hispanic name search algorithms.

Significantly, as part of name regularization for the purpose of generating an index key for a first pass through the database, the present invention applies the International Phonetic Alphabet to generate index keys, rather than using a Soundex or another conventional key. The IPA algorithm, according to the present invention, generates keys by segmenting (e.g. syllabifying) the name in question and converting it to IPA representation. In this manner, the system generates a key or set of keys which identify a set of pronounced equivalents, rather than generating a key by letter similarity, as in the traditional Soundex method. Significantly, the system generates multiple keys in IPA representation for most names, since most names have multiple possible pronunciations. The system determines multiple possible pronunciations of the name, where applicable, and associates an IPA key with each possible pronunciation. Then, records matching any of the IPA keys for a name are then selected for further consideration and comparison.

To program the IPA conversion, a rule set is generated that relates spelling to sounds. A different rule set is preferably generated for each ethnic origin of name, since pronunciations of apparently similar names may vary significantly based on origin. To generate a rule set, preferably a database of single name elements is obtained, such as a census list. The names in the list may are then manually tagged for their ethnic origin A variety of sources may then be used to determine possible pronunciations. These sources include native speaker knowledge and textual information. The rules are written broadly so that the most plausible pronunciations will be captured with some certainty. Rules for languages not written in roman characters will necessarily take into account transcription variations. The rules are written in a predetermined notation which can be processed effectively by the system. A typical rule format is:

sc/anything_le.fwdarw.[sk?]

which is interpreted to mean that the letters sc preceded by anything and followed by the letters le can be pronounced as [s] or [sk], e.g. Muscle and Mosclin. The rules should also be written to account for predictable articulatory processes such as movement of the soft palate, which might lead to a slightly different pronunciation.

As an example of the advantages of matching on IPA, consider a query on the name Lee. Converted to the IPA string [li], exact matches with numerous spelling variants are automatic, including Leigh and Li. Typical prior-art character based matches will fail to retrieve Leigh or Li, since the percentage of character overlap is minimal. Conversely, a standard index matching system such as Soundex will categorize Lee and Li identically, but will still miss Leigh, given the presence of a salient letter (g), and will retrieve a large number of names of low relevance, including Lu, Liao, Low, Louie, Lahoya, and Lehew. The IPA analysis process is further described in Appendix F, which forms a part of this specification.

While the IPA key generation, according to the present invention, provides a significant functional advantage in many cases, it should be noted that it may not be desirable to apply IPA processing to all classes of names. For example, the inventors have found that names of Arabic and Chinese origin are better processed using custom regularization algorithms rather than by the generalized IPA approach, since names acknowledged as similar in these cultures are often quite distinct phonologically.

Following regularization and expansion, name retrieval technology processing module 108 is applied. These algorithms facilitate more complete retrieval, by compensating for transpositions; deleting affixes, where appropriate; and compensating for inverted surnames, deleted surnames and nicknames. Each of these algorithms uses stored information defining naming conventions for a particular culture in the manner described herein.

Next, retrieval module 110 is applied to the results of the preprocessing performed by name classifier 102, variant generation module 104, and retrieval technology module 108. Retrieval module 110 retrieves records matching the keys (IPA or other culture-specific keys) generated by the operation of the first three modules. These records are then provided to precision filter and sorting module 112, which compares each record to the query name to determine a similarity/equivalence measurement defining the "distance" between the query name and the record name. Precision filter and sorting module 112 may perform segment position comparisons, character comparisons, phonological similarity comparisons, structural similarity comparisons, phono-feature-distance comparisons, and/or n-gram comparisons.

The output 114 of precision filter and sorting module 112 is then provided to the user. The output preferably consists of a rank-ordered list of records in descending order of likelihood of matching the query name.

One embodiment implementing many desirable features of the system shown in FIGS. 1A and 1B is a standalone database search and retrieval program. In addition to including the features described above (and in further detail in the Appendices), this embodiment of the invention may preferably be implemented according to the disclosure in Appendices G, H, I, and J, which form a part of this specification and are: a narrative description, technical plan, acceptance test, and source code listing respectively for a system demonstrating numerous features of the present invention.

Figure 2:
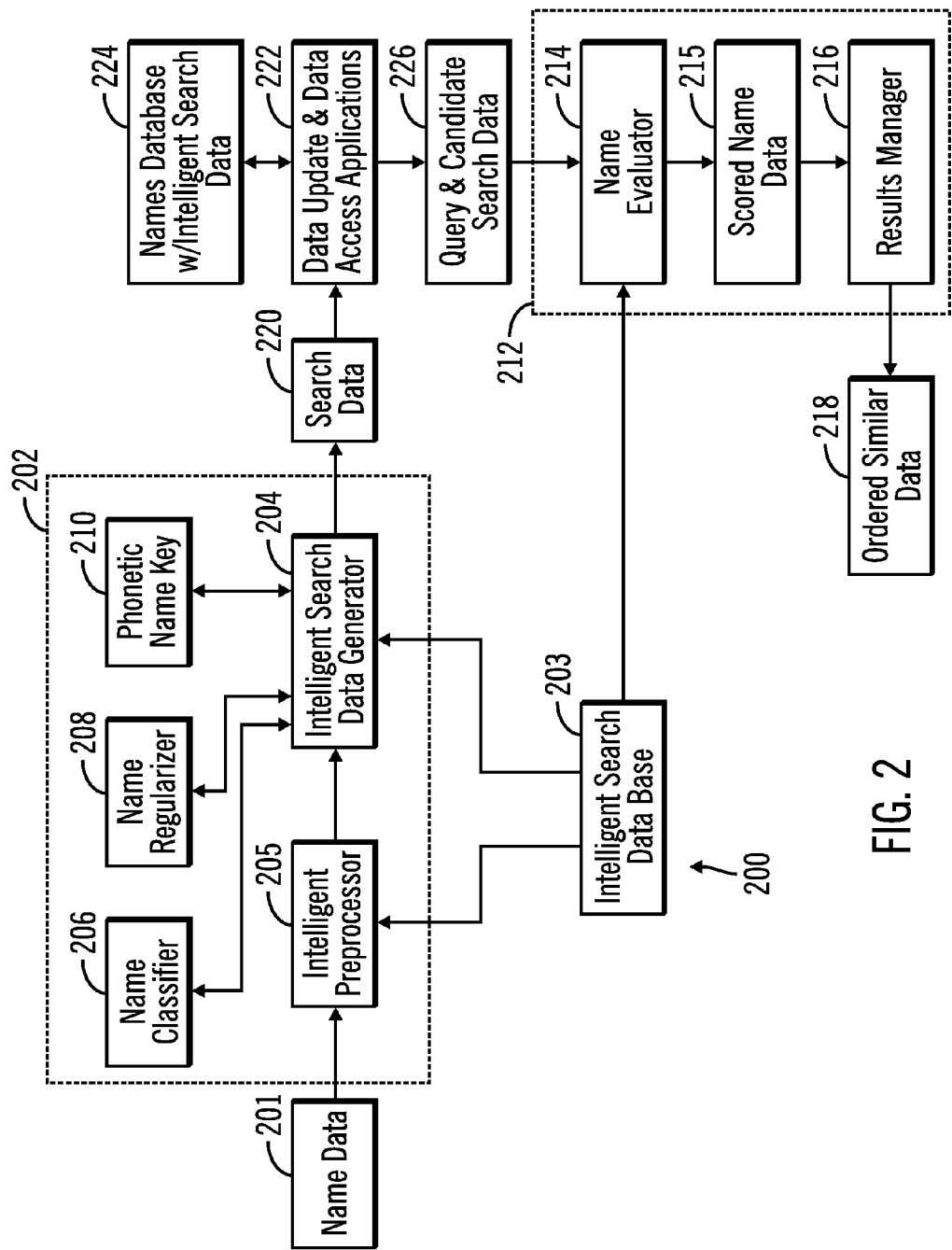
FIG. 2 is a block diagram of the structure of a set of name searching tools which may be provided as one or more Application Programming Interfaces (APIs) for use in developing custom applications in accordance with certain embodiments.

Another desirable embodiment of the invention is as a set of name searching tools which may be provided as one or more Application Programming Interfaces (APIs) for use in developing custom database management and searching applications. A flowchart for one embodiment of an API embodiment is shown in FIG. 2 in accordance with certain embodiments. Further detail of the embodiment of this embodiment is provided in Appendices K (software design description), L (default parameters), M (developer's documentation) and N (source code listing), each of which forms a part of this specification. Operation of elements in the embodiment of FIG. 2 are generally similar to like operational features described with reference to FIGS. 1A and 1B.

As shown in FIG. 2, an API-based name searching system 200 comprises name extraction tools 202 and name comparison tools 212. Name extraction tools 202 comprise Intelligent Search Data Generator (ISDG) 204 and associated intelligent search database 203, intelligent pre-processor 205, name classifier 206, name regularizer 208, and phonetic key generator 210. Name comparison tools 212 comprise name evaluator 214 and results manager 216, with scored name data 215 as an intermediate step. The system receives as an input name data 201, and provides ordered similar data 218 as an output from name comparison tools 212.

The output of ISDG 204 is search data 220, which is provided to data update and data access applications 222 and from there to the name comparison tools 212 as query and candidate search data 226. A names database with intelligent search data 224 is provided in association with data update and data access applications 222.

The embodiment of FIG. 2, like that described previously with reference to FIGS. 1A and 1B, implements a multifaceted approach to multicultural name searching. For example, in the Hispanic culture, an individual typically has a compound family name (e.g., —Arantxa SANCHEZ VICARIO), the first of which (SANCHEZ) provides the more valuable identifying information. In contrast, although Portuguese names also typically have compound family names and look very similar to Hispanic names (e.g., Maria FERREIRA DOS SANTOS), the second family name (DOS SANTOS) provides the more valuable identifying information. If a single solution were proposed where, for example, the Last Name is considered the most important name, as in American names, Hispanic names would not be adequately accommodated.

The disclosed embodiment automatically applies whatever resources will adequately address the problem at hand, whether the variation is cross-cultural or arises from spelling variation, from transcription from other writing systems, from sound similarity, or from missing or additional information.

In operation, the user system supplies both a query name and a database name to the system. The system employs linguistic intelligence to separate the name into its integral components in intelligent preprocessor 205. Further linguistic intelligence is employed to compare the two names in name evaluator 214. The result of the comparison is a scored database name, scored name data 215. The scored name is passed to results manager 216, which collects and orders the names that are scored against a single query name. The final output is an ordered set of scored database names, ordered similar data 218.

The cornerstone of this embodiment is a programming library (functions and classes) that enables a developer to add fuzzy logic personal name searching to an application. For example, the developer may perform operations such as "Give me the 10 closest names to 'James Slesinger' from my database", or "Give me all the names from my database that match 'John Wong' with a degree of confidence of 0.9" or "Tell me the degree of similarity between 'Paul Vanesann' and 'P Vanlesann'". The system incorporates and uses a variety of linguistic techniques to achieve these results, in the manner described previously with respect to a standalone name searching system.

Users can enhance the functionality of the APIs by incorporating their business rules and data into the name comparison process. This embodiment provides fine granularity when comparing names. That is, names are scored and ranked more precisely, which is important when dealing with large volumes of data. The technology incorporates numerous parameters (to customize the user's search comparison).

From the user/developer perspective, the name search system is quite simple to utilize. A typical name search requires the use of just four classes (SNQueryParms, SNQueryNameData, SNEvalNameData, and SNResultsList). In addition, it is important to note that the extra code required to integrate this name search technology is minimal.

The API name search interface is simplified by the fact that it makes no assumptions about the data and how it is stored. The user provides the API with the query name as well as the names from the database as input 201. The library routine then presents names which are likely matches, and qualifies their degree of similarity. From the perspective of the developer, the tool is straightforward and easy to integrate.

Searches via the API embodiment are configurable by adjusting any of 43 parameters (see Appendix L for defaults). Each parameter controls some aspect of how two names are evaluated when determining if they are similar. Some of the more basic parameters set thresholds for determining how close two names must be to be considered a match. Other parameters control more complex processing, such as how to handle multi-segment names. In general, only a small set of parameters need to be adjusted by the developer, because reasonable defaults exist for each one.

The API embodiment also provides pre-defined packages of parameters, each tailored to a particular culture or ethnicity. For example, Hispanic names have certain characteristics such as compound surnames (e.g., TORRES DE LA CRUZ) that can cause problems when searching for Hispanic names using conventional, Anglo-centric methods. The Hispanic parameters package contains settings that address Hispanic-specific name issues. New cultural/ethnic parameter packages can be established and existing packages can be modified as desired.

Embodiments use a C++ object framework, so that users/developers can extend the existing product functionality to incorporate additional data elements in the scoring algorithm or create evaluation methods specific to their business or application needs. For example, a database might contain a Social Security number, in addition to given name and surname. Although the name search technology only compares name data, a developer can take advantage of class inheritance (a feature of C++), and easily subclass the program's SNEvalNameData and SNQueryNameData objects to include Social Security numbers or any other desired data element(s). These data elements can then be used in the methods that score evaluation names and determine which evaluation names are matches. In other words, record matching can be performed using name data in conjunction with other available data element information.

Users/Developers can also provide custom methods for determining if an evaluation name matches a query name or not. The default method compares the average of the given name score and surname score to a user/developer supplied threshold value. However, a more complex method may be desired. For example, the business rules of an application might dictate that a name cannot be considered a match unless either the surname or given name is an exact match. By overriding the default method, the developer can easily implement this logic in just a few lines of code.

The functions provided in the API embodiment will now be described in more detail. The available functions include comparing a query name with one or more candidate names to produce an ordered list of candidate names with the highest probability of representing the same named person. This functionality is referenced as the name comparison tools 212. The basic name checking tool employs multiple evaluation techniques to evaluate and score two names. The name checking tool incorporates information regarding variations in spelling, discrepancy in the number of name segments (amount of information included), exclusion of expected information, and positional information to establish a name score, which indicates the probability that the two names represent the same individual. The tool is controlled by a set of configurable parameters. The tool also manages and produces an ordered or unordered list of candidate names with the highest probability of representing the same named person, based on the developer defined criteria for establishing a set of results. Various culture specific callable modules are available as extensions to the name check tool, including a name classifier that culturally classifies name data, a name regularizer that levels variations in name data to a single representation, and a phonetic name key that represents name data based on phonetic similarity. Again, each of these tools and modules incorporates the methods and technology described above with reference to FIGS. 1 and 3-8.

The program also generates and stores intelligent search data for use in extracting relevant subsets of data from large data bases for further evaluation. These mechanisms will facilitate more efficient name searching while ensuring complete and accurate results. This functionality is referenced as the Name Extraction Tool(s). The disclosed embodiment provides users/developers with the capability to compare two names to determine the probability that they both represent the same named individual or to compare a single query name with a set of candidate names to determine which candidate names are most likely to represent the same named individual.

When a set of candidate names is evaluated, the APIs enable the user/developer to define the criteria for producing their own ordered list of results. The criteria for defining an ordered list of results include the following: the top X candidate names (i.e., the X candidate names scoring the highest probability that they represent the same named individual; e.g., the top ten candidate names); all candidate names whose name score exceeds a predefined name threshold (e.g., if the threshold=0, all candidate names will be returned in an ordered list); or the top X candidate names whose name score exceeds a pre-defined name threshold.

Name comparison tools 212 include a name evaluator 214, which employs multiple evaluation techniques to evaluate and score two names. Name evaluator 214 incorporates information regarding variations in spelling, inclusion of additional information, exclusion of expected information, and positional information in order to establish a name score, which indicates the probability that the two names represent the same individual. Name evaluator 214 is controlled by a set of configurable parameters. Results manager 216 uses the intermediate scoring information provided by name evaluator 214 to manage and produce an ordered list of candidate names with the highest probability of representing the same named person, based on the developer-defined criteria for establishing the results.

Name extraction tools 202 include an Intelligent Search Data Generator (ISDG) 204 which generates one or more search data values that facilitate extraction of relevant information from a data base for further comparative analysis. This tool is an important component of any search system that must search large volumes of data to locate similar name data, to the extent that it is not feasible to retrieve and evaluate every name record in a data base to determine its relevance to a query name. ISDG 204 provides a motivated method for retrieving all relevant information from a data base while reducing the amount of non-relevant information retrieved. This tool can provide significant performance improvements while also ensuring an accurate and complete name search. Various culture-specific tools are available as extensions to ISDG 204 to address specific issues such as the cultural classification of name data, performed by name classifier 206; leveling of variations in name data to a single representation, performed by name regularizer 208; and the representation of name data based on phonetic similarity, performed by phonetic key generator 210.

Thus, there has been disclosed an improved system and method, in multiple embodiments, for searching personal name databases, with maximum simplicity and ease of integration, maximum flexibility, and maximum extensibility.

Parsing Culturally Diverse Names

A disclosed parsing system automatically parses culturally diverse names using culture-specific parsing techniques. A culture of a name to be parsed is identified, and statistical information describing constituent name phrases is identified. A parsing technique that is specific to the identified culture (i.e., that is culture-specific) classifies each of the name phrases based on the statistical information. The parsing system determines whether the classification of the name phrases represents a valid parse of the name. If the parse is not valid, then the name is parsed again to produce a different parse.

In one general aspect, parsing names includes enabling access to multiple parsing techniques for parsing name elements into one or more types of elements. The multiple parsing techniques include separate parsing techniques that respectively correspond to at least one of multiple known cultures. A name that includes one or more elements is received, and an indication of at least one culture from among the multiple known cultures is accessed for the name. One of the multiple parsing techniques is selected based on the indication of the culture of the name. The one or more elements of the name are parsed into element types using the selected parsing technique, and an indication of the element types of the one or more elements is provided.

Embodiments may include one or more of the following features. For example, accessing the indication of the culture of the name may include detecting a characteristic of at least one of the elements of the name. The indication of the culture of the name may be determined based on the characteristics detected.

A database providing a statistical indication of a type of an element may be accessed. Parsing also may be based on the statistical indication.

A validity score for the parsing of the elements may be determined. The validity score may be compared to a threshold. Whether to reorder the one or more elements may be determined based on a result from the comparing. For example, a determination to reorder the one or more elements may be made based on the validity score. A database providing statistical indications of the types of the one or more elements may be accessed, and the one or more elements may be reordered using the statistical indications. The reordered elements of the name may be parsed into element types using the selected parsing technique. An indication of the validity score may be provided.

Parsing the one or more elements of the name into element types may include classifying each of the one or more elements as a title, a given name, a surname, or a qualifier. Statistics describing at least one of the one or more elements of the name may be provided. Receiving the name may include receiving a personal name.

In certain embodiments, the name elements into which a name is parsed are defined as title, given name, surname, or qualifier. These are the name elements used in an actual search embodiment, where names are fielded into a title field, a given name field, a surname field, and a qualifier field. In certain other embodiments, a more fine-grained parse is performed that parses different types of name elements within at least one field of the name. In certain embodiments, the fields are: title, given name, surname, and qualifier. As an example, for some cultures, such as Arabic, such a fine-grained parse is performed. For instance, an Arabic name might consist of several identifiable parts or name elements within a field, and the fine-grained parsing parses the Arabic name into more name elements (than title, given name, surname, and qualifier). This kind of analysis depends upon cultural classification, with different cultures lending themselves to different parsing techniques that differently parse different types of name elements within at least one field of the name based on the culture.

In another general aspect, identifying a valid parse of a name includes receiving a name that includes one or more elements. The one or more elements of the name are parsed into element types. Whether the element types of the one or more elements represent a valid parse of the name is determined, and an indication of whether the element types of the one or more elements represent a valid parse of the name is provided.

Embodiments may include one or more of the following features. For example, determining whether the element types represent a valid parse of the name may include determining a validity score for the element types. The validity score may be compared to a threshold. Whether to reorder the one or more elements may be determined based on a result from the comparing. For example, a determination to reorder the one or more elements may be made based on the validity score. A database providing statistical indications of the types of the one or more elements may be accessed, and the one or more elements may be reordered using the statistical indications. The reordered elements of the name may be parsed into element types using the selected parsing technique.

In another general aspect, processing a name includes receiving an indication of a name that includes multiple tokens. An indication of a culture of the name is accessed. One or more name phrases included in the name are identified based on the culture of the name. At least one of the identified name phrases has more than one token. The identified name phrases is designated as an input to a subsequent name processing operation, and the name is processed using the identified name phrases as an input to the subsequent name processing operation.

Embodiments may include one or more of the following features. For example, processing the name may include parsing the name. Identifying the one or more name phrases may include classifying each of the multiple tokens in the name as a prefix, suffix, or stem based on the culture of the name. The classified tokens may be grouped into name phrases based on the classification of the tokens and the culture of the name.

In another general aspect, parsing a conjoined name includes receiving a conjoined name construct that includes multiple elements. Multiple names indicated by the conjoined name construct are identified. Each of the multiple names includes one or more elements. At least one of the multiple elements of the conjoined name construct is included as an element in each of the multiple names. The one or more elements of at least one name of the multiple names are parsed into element types, and an indication of the element types of the one or more elements of the at least one name is provided.

Embodiments may include one or more of the following features. For example, access to multiple parsing techniques for parsing name elements into one or more types of elements may be enabled. The multiple parsing techniques may include separate parsing techniques that respectively correspond to at least one of multiple known cultures. An indication of at least one culture from among the multiple known cultures may be accessed for the at least one name. The indication may reflect at least one culture selected from among the multiple known cultures. One of the multiple parsing techniques may be selected based on the indication of the culture of the at least one name. Parsing the one or more elements of the at least one name may include parsing the one or more elements using the selected parsing technique.

A database providing a statistical indication of a type of an element of the at least one name may be accessed. Parsing also may be based on the statistical indication.

Various disclosed embodiments include a parser that parses names that are representative of multiple cultures. The parser provides multiple culture-specific parsing techniques from among which a technique is selected based on the culture of an input name to be parsed. Upon receipt of an input name, the parser accesses a name database, referred to as Name Data Object (NDO), that indicates the probability that a particular name phrase of the name is a given name, a surname, a qualifier, or a title. Using culture-specific rules, the parser applies the selected parsing technique to parse the name into a title, a given name, a surname, and a qualifier. Then, based on the probabilities from the NDO, the parser calculates a validity score for the name parse, and compares the calculated validity score against a threshold. If the validity score fails to meet the threshold, the parse is deemed invalid, the name phrases of the name are reordered, and the name is parsed and verified again.

Figure 9:
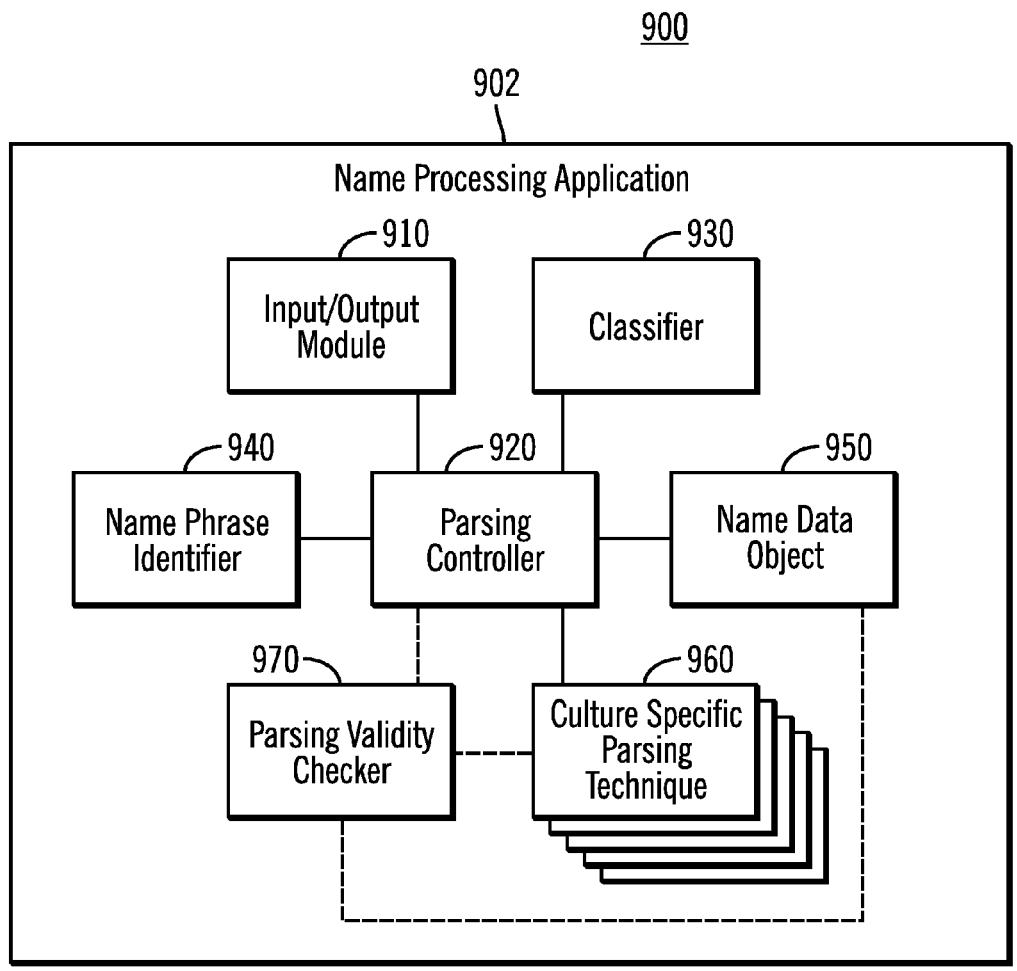
FIG. 9 is a block diagram of a system for parsing culturally diverse names in accordance with certain embodiments.

Referring to FIG. 9, a name processing system 900 includes a name processing application 902 that is used to parse personal names that are representative of multiple cultures. The name processing application 902 includes an input/output module 910 that receives names to be parsed and provides parsed versions of the names. A parsing controller 920 that controls parsing of the names uses a classifier 930, a name phrase identifier 940, a Name Data Object (NDO) 950, and multiple culture-specific parsing techniques 960. A parsing validity checker 970 determines whether valid parses of the names have been produced.

The name processing application 902 may be used for multiple purposes. For example, the name processing application may be used to verify that names included in one or more databases have been parsed accurately and/or consistently. The name processing application may be used to correct inaccurately parsed names in the databases and to identify a single parsed version of a name for which multiple parsed versions exist in the databases. Parsing a name consistently may reduce recall errors stemming from using different parses of a name and may help to reduce duplicative records from the database. The name processing application 902 also may be used to generate alerts of inaccurately parsed names within the database.

The input/output module 910 receives personal names to be parsed and provides parsed versions of the personal names. The input/output module 910 also may receive a specification of one or more parameters that indicate how the personal names are parsed. For example, the input/output module 910 may receive an indication of whether a name is to be reparsed automatically when a previous parse is invalid, or an indication of criteria under which a parse is invalid. In one embodiment, the input/output module 910 is a user interface (UI), such as a command line interface or a graphical user interface (GUI), with which the personal names may be specified, and with which the parsed version of the personal names may be presented. Values for the parameters also may be specified with the UI.

In another embodiment, the input/output module 910 implements an application programming interface (API) to the name processing application 902. In other words, functions or methods provided by the input/output module 910 may be used by an external application to provide personal names, to receive parsed names, and to provide parameter values. The input/output module 910 may receive the name as text that has been formatted with, for example, the American Standard Code for Information Interchange (ASCII) encoding scheme, the Unicode encoding scheme, or the International Standards Organization (ISO) 8859-1 encoding scheme. A list providing examples of encoding schemes with which the personal names may be formatted may be found at http://www.iana.org/assignments/character-sets.

The parsing controller 920 controls parsing of personal names. More particularly, the parsing controller 920 receives a personal name to be parsed from the input/output module 910. The parsing controller 920 passes the personal name, and information describing the personal name, to the classifier 930, the name phrase identifier 940, the NDO 950, one of the culture-specific parsing techniques 960, and the parsing validity checker 970, and receives information from these components in the process of parsing the name. The parsing controller 920 then provides the parsed name to the input/output module 910.

The classifier 930 identifies a culture to which a personal name corresponds. More particularly, the classifier 930 receives a personal name to be parsed from the parsing controller 920. The classifier 930 processes the received personal name to identify a culture of the name, and provides an indication of the culture to the parsing controller 920. For example, the classifier 930 may identify the culture based on one or more characteristics of the personal name, or on one or more characteristics of an element of the personal name.

In one embodiment, the classifier 930 includes multiple culture-specific classifying techniques. Each of the techniques takes a name as an input and produces a score indicating the likelihood that the name is representative of a corresponding culture. An input name is provided to each of the classifying techniques, and is determined to be representative of the culture corresponding to the technique that identifies the greatest likelihood of representation.

Each of the techniques examines characteristics of the input name, or of elements of the input name, to determine whether the name is representative of the corresponding culture. More particularly, the technique identifies characteristics of the input name that are representative of names in the corresponding culture. If such characteristics are identified within the input name, then the technique indicates that the name has a high likelihood of being representative of the corresponding culture.

Some of the classifying techniques identify orthographic characteristics of the input name. For example, such a technique may consider the type, position, and order of characters within the input name, or a length of the name, when classifying the input name. Alternatively or additionally, such techniques may perform an n-gram analysis of the name. In an n-gram analysis of a name, a database that maintains an indication of the likelihood of any sequence of n consecutive characters appearing in a name that is representative of a particular culture is used. The probabilities that sequences of n consecutive characters from the input name are included in the particular culture are accessed from the database and used to determine whether the name is representative of the particular culture.

Other classifying techniques perform a semantic analysis of the input name. Such a technique may identify the meaning of one or more parts of the name. For example, a part of the name may be a word in a language of a particular culture, so the technique may determine that the name is representative of the particular culture. As another example, the technique may determine that the name is representative of the particular culture when the name includes an affix that is typical of words of a language of the particular culture. Other techniques may use syllabic, syntactic, or phonological characteristics of the name when determining the likelihoods that the name is representative of corresponding cultures.

In another embodiment, the classifier 930 may identify the culture to which the input name corresponds by a process of elimination. For example, one or more of the culture-specific classifying techniques may indicate that the name is not representative of the corresponding cultures. As a result, the set of cultures to which the input name may correspond is reduced. If a sufficient number of the culture-specific classifying techniques indicate that the input name is not representative of the corresponding cultures, then a culture to which the name corresponds may thereby be uniquely identified.

An input name may correspond to multiple cultures. For example, a first token of the input name may correspond to a first culture, and a second token of the input name may correspond to a second culture. In one embodiment, the classifier 930 may identify, for example, the first culture as a culture of the name if the first token has a stronger correspondence to the first culture than the second token has to the second culture. In such an embodiment, the name may be parsed based on a culture to which a portion of the name does not correspond. In another embodiment, the classifier 930 may identify both of the first and second cultures as the culture of the name. In such an embodiment, the name may be parsed individually based on each of the first and second cultures. One of the resulting parses may be selected as the parsed version of the name, or the resulting parses may be combined into the parsed version of the name. Alternatively or additionally, the name may be parsed simultaneously based on both the first and second cultures.

Various embodiments for classifying a name are described in U.S. application Ser. No. 09/275,766, titled "System and Method for Adaptive Multi-Cultural Searching and Matching of Personal Names," and filed on Mar. 25, 1999. U.S. application Ser. No. 09/275,766 is hereby incorporated by reference in its entirety for all purposes.

The name phrase identifier 940 identifies one or more name phrases included in a personal name. Each of the name phrases may include one or more tokens. For example, the name phrase includes a stem to which zero or more prefixes or suffixes have been added. The stem of the name phrase is the portion of the name phrase that is not a prefix or a suffix of the name phrase. The name phrase identifier 940 may consult a culture-specific list of possible prefixes and suffixes, such as is maintained by the NDO 950, when identifying the name phrases. For example, using the NDO 950, the name phrase identifier 940 may classify each token of the name as a prefix, a suffix, or a stem in names of a particular culture of the name. A token may be classified as a stem as a result of not being included in the list of prefixes and suffixes for the particular culture, or as a result of being included in a list of name phrases included in names of the particular culture, such as is maintained by the NDO 950. Consequently, the classification of the tokens may depend on the particular culture of the name.

Figure 10:
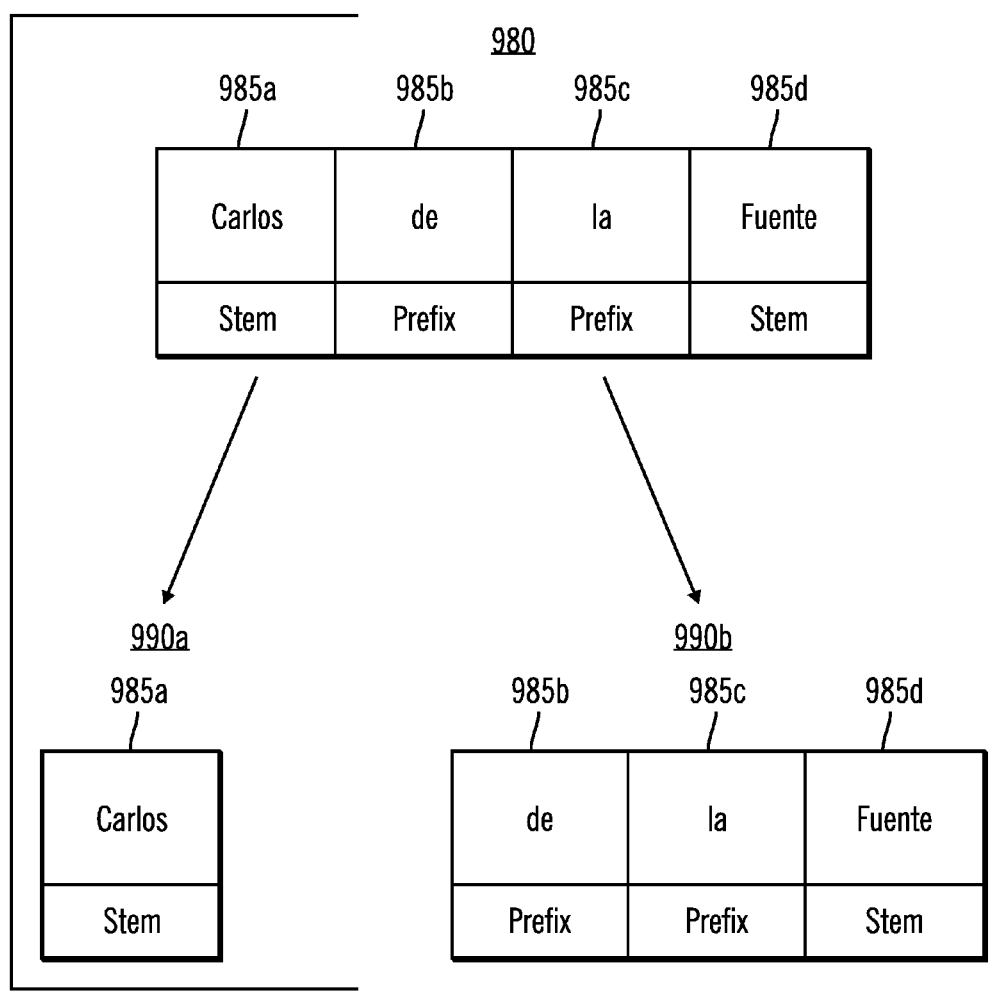
FIG. 10 is an illustration of a name before and after name phrases of the name are identified in accordance with certain embodiments.

The classification and the order of the tokens may indicate the name phrases of the name. In general, a name phrase includes a stem, the tokens that immediately precede the stem that are prefixes, and the tokens that immediately follow the stem that are suffixes. For example, referring to FIG. 10, a name 980, "Carlos de la Fuente" includes four tokens 985a-985d. The tokens 985a and 985d may be classified as stems, and the tokens 985b and 985c may be classified as prefixes. Because the name 980 includes two stem tokens 985a and 985d, the name 980 includes two name phrases 990a and 990b. The name phrase 990a includes the token 985a, which is not preceded by any prefix tokens or followed by any suffix tokens. The name phrase 990b includes the token 985d, which is preceded by the prefix tokens 985b and 985c. In some embodiments, a prefix that follows the stem may be part of the name phrase as long as a suffix appears between the prefix and the next stem.

Therefore, the grouping of the tokens of the name into name phrases may depend on lexical and syntactic characteristics of the name. The lexical characteristics include the classifications of the tokens as prefixes, suffixes, and stems, and the syntactic characteristics include the order in which the tokens appear in the name. Furthermore, the grouping may depend on the culture of the tokens. For example, a prefix may be grouped with a subsequent stem only if the prefix and the stem correspond to the same culture, or only if name phrases of names of a culture of the stem typically include prefixes.

Alternatively, or additionally, the name phrase identifier 940 may consult the list of name phrases when identifying the name phrases. For example, the name phrase identifier 940 may look up a group of one or more consecutive tokens from the name in the list to determine whether the group represents a name phrase. After the group has been identified as a name phrase, name phrases that include the remaining tokens in the name are identified. In this manner, the set of possible name phrases may be reduced with each name phrase that is identified, until a complete set of valid name phrases included in the name have been identified.

In one embodiment, the name phrase identifier 940 identifies the name phrases without reference to a culture of the name that was identified by the classifier 930. In another embodiment, the name phrase identifier 940 may use culture-specific information when identifying the name phrases. The name phrase identifier 940 may identify the name phrases such that statistics describing the name phrases may be identified from the NDO 950.

Identifying name phrases of names and processing the names based on the name phrases may be advantageous over processing the names based on tokens of the names. For example, processing names based on name phrases may be particularly useful when processing non-English names that have been transliterated from a non-Roman alphabet. Multiple transliteration schemes may be available to transliterate the names from the non-Roman alphabet to the Roman alphabet. When transliterating a name, the transliteration schemes may use different numbers of tokens to represent a particular continuous portion of the name, such as, for example, a surname. Therefore, different transliterations of the name may include different numbers of tokens. However, the different transliterations typically include the same number of name phrases for the name. More particularly, the different transliterations typically include a single name phrase for the particular portion (for example, the surname) of the name. Therefore, processing of the name based on the name phrases may reduce the effect of inconsistent separation of portions of the name into tokens. In other words, using the name phrases enables the processing of the name to withstand incorrectly, or inconsistently, placed boundaries between tokens (for example, "de la Tour" versus "Delatour"). As another example, particular tokens of the names may have more meaning or significance to the name when they are combined with one or more adjacent tokens. For example, in Arabic names, the prefix "al" may be more meaningful when combined with an adjacent stem token, as many Arabic surnames include the prefix "al."

The NDO 950 is a database of name phrases and relative frequencies with which the name phrases appear in personal names from a variety of cultures. More particularly, the NDO 950 includes the name phrases that are included in a large set of culturally-diverse personal names. For each name phrase (see, for example, FIGS. 11 and 12), the NDO 950 indicates the number of times the name phrase is included in the set as a given name or as a surname. In addition, the NDO 950 includes a list of name phrases that are titles, and a list of name phrases that are qualifiers. Therefore, the NDO 950 indicates the probability that a name phrase is included in a given name, a surname, a qualifier, or a title of a name.

The given name, the surname, the qualifier, and the title represent four possible types of a name phrase. A surname typically indicates an association (e.g., family, clan, tribe, ethnic group, religion, profession, location, or lineage.). A given name designates an individual. A title typically identifies a position, a social status, or a gender. Examples of titles include "Mr.," "Mrs.," "Ms.," "Dr.," "Sr.," "Sra.," "Mlle.," and "Herr.," Qualifiers modify portions of a given name or a surname, or further describe or identify the individual corresponding to the personal name. Examples of qualifiers include "Jr.," "Sr.," "III," and "Esq."

In addition, the NDO 950 includes, for each name phrase, an indication of at least one country or culture having names that include the name phrase, particularly those name phrases that are included in the set as a given name or as a surname. For each indicated country or culture, the NDO 950 also includes an indication of the number of names, from among the set of names, that include the name phrase and that are representative of the country or culture. In one embodiment, the NDO 950 includes information describing name phrases from approximately one billion culturally-diverse personal names.

Referring to FIGS. 11 and 12, part of the NDO 950 may be organized as a table. For example, the NDO 950 includes a statistics table 1100 having columns 1110-1160 and rows 1170a-1170n. A name phrase column 1110 contains one name phrase per row. A surname column 1120 includes counts of the names from the set (described earlier) that include the name phrases as surnames. For example, 132,884 names from the set include the name phrase "James" as a surname, as is indicated by the number at the intersection of row 1170a and the surname column 1120. Similarly, a given name column 1130 includes counts of the names from the set that include the name phrases as given names. For example, 179,090 names from the set include the name phrase "Kim" as a given name, as is indicated by the number at the intersection of row 1170i and the given name column 1130.

For each of the rows 1170a-1170n, the country column 1160 indicates one or more countries or cultures with names that include the corresponding name phrase. For example, names from the United States, Holland, and Vietnam include the name phrase "Van," as is indicated by the information at the intersection of row 1170h and the country column 1160. The country column 1160 also includes an indication of a relative proportion of the names that include the name phrase among the one or more countries or cultures. For example, 70% of the names that include the name phrase "Van" are from Vietnam, 20% are from Holland, and 10% are from the United States, as is indicated by the information at the intersection of row 1170h and the country column 1160.

FIG. 12 includes a statistics table 1200 that is similar to the statistics table 1100 and includes columns 1210-1260 and rows 1270a-1270z. A name phrase column 1210 and a surname column 1230 are similar to corresponding columns 1110 and 1120 of the statistics table 1100. In addition, the statistics table 1200 indicates the number of times a name phrase appears in names from each of one or more countries or cultures as each of the possible types.

A culture column 1220 indicates at least one culture with names that include the name phrases. For example, Arabic names include the name phrase "al," as is indicated by the culture listed at the intersection of row 1270m and the culture column 1220. A name phrase may be represented in multiple rows of the statistics table 1200. For example, the name phrase "Jae" is represented by rows 1270s and 1270t in the statistics table 1200. A name phrase corresponds to multiple rows when the name phrase is included in names from multiple cultures, and the statistics table 1200 includes a separate row for the name phrase for each of the multiple cultures. For any such row, column 1230 indicates the number of names, from the set of names, that correspond to the particular culture and that include the particular name phrase as a surname. In certain embodiments, statistics table 1200 may include a column for a given name that indicates the number of names, from the set of names, that correspond to the particular culture and that include the particular name phrase as a given name. For example, the row 1170i and the column 1160 of the statistics table 1100 indicate that the name phrase "Kim" may appear in English and Korean names. Consequently, the statistics table 1200 includes the row 1270q to describe English names that include "Kim" and the row 1270r to describe Korean names that include "Kim." For example, the row 1270q indicates that 175,508 English names from the set of names include "Kim" as a given name, while the row 1270r indicates that 1,456,882 Korean names from the set of names include "Kim" as a surname. Therefore, most of the names in which "Kim" appears as a given name are English names, even though most of the names in which "Kim" appears are Korean names.

Referring also to FIG. 13, the NDO 950 also includes a token table 1380 that identifies tokens that are prefixes to stems of name phrases, tokens that are suffixes to stems of name phrases, tokens that are stems of title name phrases, and tokens that are stems of qualifier name phrases. The tokens included in the tokens table 1380 may be included in names from the set of names. The token table 1380 includes columns 1382-1386 and rows 1390a-1390w. A token column 1382 contains one token per row. A type column 1384 indicates the types of the tokens. For example, the token "de" is a prefix, as indicated row 1390c and the type column 1384. Similarly, a culture column 1386 indicates one or more cultures of names from the set of names that include the tokens. For example, the token "Herr" typically is included in German names, as indicated by the row 1390n and the column 1386.

The token table 1380 enables the classification of tokens of a name as, for example, a prefix, a suffix, or a stem of a name phrase of a name, based on a culture of the name. For example, the row 1390f, the column 1384, and the column 1386 indicate that the token "din" is a suffix in Arabic names. As another example a token that is not included the token table 1380 as a prefix or a suffix in the culture of the name may be assumed to be a stem of a name phrase, by a process of elimination.

The token table 1380 also enables the classification of tokens as stem tokens of either a title or a qualifier in names of a particular culture. For example, the row 1390q, the column 1384, and the column 1386 indicate that the token "Jr." is a stem token of a qualifier in English names. As another example, a token that is not included in the token table 1380 as a stem of either a title or a qualifier of names of the particular culture may be assumed to be a stem of either a given name or a surname, by a process of elimination. When a token is not included in the token table 1380 as a stem of a title or a qualifier, the token may be included in one of the statistics tables 1100 or 1200, which may indicate whether the token is a stem of a given name or a surname.

The token table 1380 may be used, for example, by the name phrase identifier 940 when identifying name phrases of a name. In addition, the token table 1380 may be used when identifying statistics for a name phrase from one of the statistics tables 1100 or 1200. For example, if a name phrase is not included in one of the statistics tables 1100 or 1200, then the token table 1380 may be used to identify a stem of the name phrase that may be included in one of the statistics tables 1100 or 1200. The statistics for the stem may be used as the statistics for the name phrase.

The numbers included in the statistics table 1100 and the statistics table 1200 enable the determination of the relative frequencies of appearance for different name phrases. For example, the rows 1170b and 1170k indicate that names (from the set of names) include the name phrase "Smith" more often than the name phrase "Dong." In addition, the statistics tables 1100 and 1200 enable the classification of a name phrase as a given name or a surname. For example, the row 1170c indicates that the name phrase "Van" most likely is a surname, because "Van" appears in the set of names more often as a surname than as a given name. Furthermore, the token table 1380 enables the classification of a name phrase a title or a qualifier. For example, the row 1390g, the column 1384, and the column 1386 of the token table 1380 indicate that the name phrase "Mr." is a title in English names.

A token may appear in both the token table 1380 and one of the statistics tables 1100 and 1200. For example, a token may represent a prefix or a suffix in names of a first culture, and a given name or a surname in a second culture. For example, the token table 1380 indicates that the token "van" is a prefix in Dutch names, and the statistics table 1200 indicates that the token "Van" is a surname in Vietnamese names. In such a case, the token may be uniquely classified based on the culture of a name that includes the token using one of the token table 1380 or the statistics tables 1100 and 1200. Alternatively, the token may represent a prefix or suffix in some names of a particular culture, and a given name or a surname in other names of the particular culture. In such a case, classification of the token is based on the token table 1380, and not one of the statistics tables 1100 or 1200.

Turning now to the techniques 960, the parsing controller 920 passes to one of the techniques 960 a name to be parsed. The technique 960 that receives the name is a technique that parses names from the culture that was determined by the classifier 930. The parsing controller 920 also may provide the technique 960 with an indication of the name phrases that are included in the name, and statistics describing the name phrases that have been retrieved from the NDO 950. Using the information received from the parsing controller 920, the technique 960 classifies the name phrases of the name as one of the possible types of name phrases. In other words, the technique 960 classifies each of the name phrases as being included in a title, a given name, a surname, and a qualifier of the name. Consequently, the technique 960 may indicate that multiple name phrases have the same type within the name. The multiple name phrases of the same type may be grouped together. For example, if the technique 960 indicates that two name phrases are given names, the two name phrases may be grouped to form a single given name for the parsed name. In one embodiment, the order in which the multiple name phrases are grouped is the order in which the multiple name phrases appear in the original name. Each of the techniques 960 may use conventional parsing techniques to parse names of corresponding cultures.

Each of the culture-specific parsing techniques 960 parses names that are representative of one or more cultures. For example, techniques 960 may include a technique for parsing Chinese names, a technique for parsing Korean names, a technique for parsing Japanese names, a technique for parsing Spanish names, a technique for parsing Arabic names, and a technique for parsing English names. Alternatively or additionally, the techniques 960 may include, for example, a technique that parses Asian names, instead of dedicated techniques for each type of Asian name. In some embodiments, the culture-specific parsing techniques 960 may include a generic parsing technique that is configured to parse names that are representative of any culture. The generic parsing technique may be used, for example, when a culture-specific parsing technique for a name is not identified.

The technique for parsing names of a particular culture uses characteristics of names of the particular culture to determine how to parse the name. For example, a technique for a particular culture may access indications of prefixes, suffixes, titles, and qualifiers that are specific to the particular culture from the NDO 950. The culture-specific prefixes, suffixes, titles, and qualifiers may be used to group tokens of the names into name phrases, and to identify which of the name phrases represent titles and qualifiers for the name.

As another example, a technique for parsing Asian names may use the convention that a surname precedes a given name to identify the leftmost name phrase as the surname and the rightmost name phrase as the given name. However, the technique might do so only when the statistics received from the NDO 950 indicate that the leftmost name phrase is a surname and that the rightmost name phrase is a given name. For example, if the statistics indicate that the leftmost name phrase is a given name and that the rightmost name phrase is a surname, then the technique may conclude the same, even though such a conclusion violates the conventional structure of Asian names. Additionally, when the culture-specific technique 960 examines the statistics for a name phrase, the technique 960 may consult the culture-specific statistics (for example, from the statistics table 1100) or the combined statistics (for example, from the statistics table 1200).

As another example, a technique for parsing Arabic names may use knowledge that many surnames are preceded by the prefix "al" to determine that, in a name that includes that prefix, the prefix forms a name phrase with a token that immediately follows the prefix. Furthermore, the technique may determine that the name phrase is likely to be a surname because the name phrase includes the prefix "al." However, the technique might only do so if the statistics received from the NDO 950 indicate that the token following the prefix typically is a surname.

For some cultures, such as Arabic, a parsing technique that parses different types of name elements within at least one field of the name is performed. For instance, an Arabic name might consist of several identifiable parts, and the parsing technique parses the Arabic name into more parts (than given name and surname). For example, an Arabic name may be: MOHAMMAD ABU IBRAHIM BIN MUSTAFA AL-SAUDI. A reasonable parse of this Arabic name into a given name and a surname for search purposes might be:

Given Name (GN): [MOHAMMAD ABU IBRAHIM BIN MUSTAFA]
Surname (SN): [AL-SAUDI]

With fine grained parsing, embodiments can also provide a more analytically useful parse that identifies, for a name that may be separated into fields (e.g., surname and given name fields), different types of name elements within a field, such as:

MOHAMMAD—an "ism" that may be described as a personal given name
ABU IBRAHIM—a "kunya" that may be described as a nickname derived from the name of one's first-born male child (e.g., 'father of Ibrahim')
BIN MUSTAFA—a "nasab" that may be described as a name that indicates one's patrilineal heritage (e.g., 'son of Mustafa')
AL-SAUDI—a "nisbah" that may be described as a name of geographical, occupational, tribal, etc., origin (i.e., somewhat equivalent to a Western family name (e.g., 'the Saudi')

This kind of analysis depends upon cultural classification, with different cultures lending themselves to different parsing techniques that parse different types of name elements within at least one field of the name. That is, different cultures may each be associated with a different parsing technique that parses different types of name elements within at least one field of the name based on that culture.

That is, instead of the output of the parsing process being a name broken down into a given name field and a surname field (along with any titles and qualifiers, if those were present), the classifier provides the user with more detailed information within a field. As another example, an Arabic name may be: HAJ MOHAMMAD BIN IBRAHIM AS SAUDI. A reasonable parse of this Arabic name into a title, a given name, and a surname for search purposes might be:

Title: [HAJ]
Given Name (GN): [MOHAMMAD BIN IBRAHIM]
Surname (SN): [AS SAUDI]

With fine grained parsing, embodiments can also provide a more analytically useful parse that identifies different types of name elements within a field, such as:

MOHAMMAD—an "ism"
BIN IBRAHIM—a "nasab"
AS SAUDI—a "nisbah"

The parsing validity checker 970 determines whether a parse of a name identified by one of the techniques 960 represents a valid parse of the name. In one embodiment, the parsing validity checker 970 receives the parsed name from the parsing controller 920 after the parsing controller 920 receives the parsed name from one of the techniques 960. In another embodiment, the parsing validity checker 970 receives the parsed name directly from the techniques 960. In one embodiment, each of the techniques 960 includes a parsing validity checker 970. In such an embodiment, the parsing validity checker 970 corresponding to one of the techniques 960 determines whether parsed names produced by the technique are valid.

Figure 14:
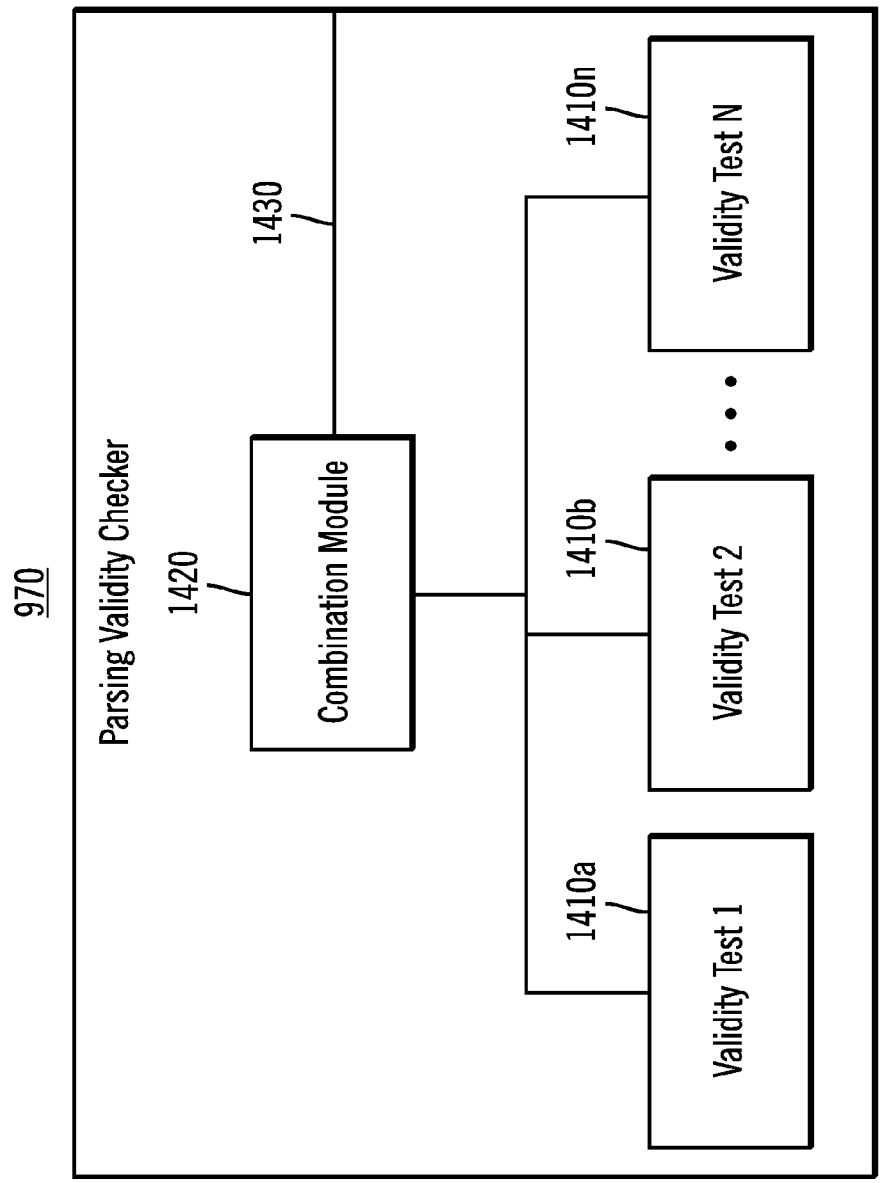
FIG. 14 is a block diagram of a system for checking the validity of a parsed personal name in accordance with certain embodiments.

Referring to FIG. 14, one embodiment of the parsing validity checker 970 includes multiple validity tests 1410a-1410n. Each of the validity tests 1410a-1410n examines characteristics of at least a portion of a parsed name to aid in a determination of whether the parsed name is valid. A combination module 1420 combines the results of the validity tests 1410a-1410n into an overall indication of the validity of the parsed name. The indication of the validity of the parsed name is sent from the parsing validity checker 970 over a communications interface 1430 to other components of the name processing application 902.

In one embodiment, the validity tests 1410a-1410n measure the conformity of the parsed name to a set of criteria. For example, the validity tests may measure the conformity of the parsed name to other names of the same culture as the parsed names, or to other names that include the same name phrases as the parsed name. Each of the validity tests 1410a-1410n assigns a score to at least a portion of the parsed name based on the characteristics of the parsed name.

For example, one or more of the tests 1410a-1410n may identify a dominance factor for one or more of the name phrases included in the parsed name. The dominance factor indicates the ratio of (i) the names in the set of names reflected in the NDO 950 that include the name phrase as a particular type to (ii) the names in the set that include the name phrase as any of the possible types. Dominance factors typically are calculated for name phrases that have been classified as given names or surnames in the parsed name, and the dominance factor of a name phrase depends on whether the name phrase has been classified as a given name or a surname. If the parsed name includes the name phrase as a given name, then the dominance factor for the name phrase indicates the likelihood that the name phrase is a given name. In such a case, the dominance factor is the ratio between (i) the number of names from the set of names that include the name phrase as a given name and (ii) the number of names from the set of names that include the name phrase as any of the possible types. Similarly, when the parsed name includes the name phrase as a surname, the dominance factor indicates the likelihood that the name phrase is a surname. Dominance factors may not be calculated for name phrases that have been classified as titles or qualifiers because such name phrases typically are not incorrectly classified. In other words, the only name phrases that are classified as titles are name phrases that the NDO 950 indicates are titles, and the only name phrases that are classified as qualifiers are name phrases that the NDO 950 indicates are qualifiers. However, name phrases that the NDO indicates are titles or qualifiers also may be classified as given names or surnames.

One or more of the validity tests 1410a-1410n may assign dominance factors to special name phrases. Special name phrases include name phrases that include an initial, name phrases that are not included in the NDO 950, and name phrases that include a title or a qualifier. For example, a name phrase that includes an initial may be passed to a particular one of the tests 1410a-1410n. Name phrases that include an initial typically are classified as given names. Consequently, the particular test may assign a dominance factor to the name phrase to indicate that the name phrase typically appears as a given name. In one embodiment, the test may assign the name phrase a high dominance factor when the name phrase has been classified as a given name in the parsed name, and the test may assign the name phrase a low dominance factor when the name phrase has been classified as a surname in the parsed name. In one embodiment, the high dominance factor is 0.8, or 80%, and the low dominance factor is 0.2, or 20%.

Another one of the tests 1410a-1410n may indicate that a name phrase that is not included in the NDO 950 is not to be assigned a dominance factor and is not to be considered when determining the overall validity score of the parsed name. Alternatively or additionally, the test may indicate that the name phrase is not to be considered when a portion of the name phrase is not included in the NDO 950. For example, the test may indicate that the name phrase is not to be considered when a stem of the name phrase is not included in the NDO 950.

Another one of the tests 1410a-1410n may indicate that a name phrase with a stem that typically is a title or a qualifier be assigned a dominance factor of 0.1, or 10%, regardless of whether the name phrase has been classified as a given name or as a surname in the parsed name. The NDO 950 may indicate whether the stem of the name phrase is a title or a qualifier.

Others of the tests 1410a-1410n may process the parsed name as a whole to identify a validity score for the parsed name. For example, one of the tests 1410a-1410n may determine whether or not the parsed name includes at least one given name and at least one a surname. If not, then the test may assign a validity score of 0.5, or 50%, to the parsed name, which typically indicates that the parsed name is invalid.

Another one of the tests 1410a-1410n may determine whether or not the name phrases included in the parsed name as given names or surnames are included in the NDO 950. If none of the name phrases are included in the NDO 950, then the test may assign a validity score of 0.5, or 50%, to the parsed name.

Another one of the tests 1410a-1410n may base the validity score on whether an order in which the name phrases appear in the parsed name is an order in which the name phrases typically appear, as indicated by information describing the name phrases from the NDO 950, and by characteristics of names of a culture of the parsed name. The test may assign a high validity score when the order of the name phrases in the parsed name is an order in which the name phrases typically appear, and the test may assign a low validity score otherwise.

Another one of the tests 1410a-1410n may determine whether the name phrases are spelled correctly. For example, the test may determine whether a misspelled name phrase was included as a given name when the name phrase, when spelled correctly, typically is included as a surname. If the misspelled name phrase is incorrectly classified within the parsed name, the test may assign a low validity score to the parsed name. In some embodiments, the test also may correct the spelling of the name phrase.

The combination module 1420 mediates the operation of the parsing validity checker 970. In one embodiment, the combination module 1420 provides at least a portion of the parsed name, such as a name phrase, to each of the validity tests 1410a-1410n and receives a score from each of the validity tests 1410a-1410n. The combination module 1420 combines the scores received from the tests 1410a-1410n into an overall validity score for the parsed name. For example, the combination module 1420 may normalize and average, or otherwise combine, the scores to identify the validity score. In one embodiment, the combination module 1420 may receive dominance factors for some of the name phrases of the parsed name from one or more of the tests 1410a-1410n, and the combination module 1420 may average the dominance factors to identify the validity score for the parsed name as a whole. Alternatively, for each dominance factor that is less than 0.5, the combination module may subtract a fixed amount from a maximum allowable overall validity score, and the remainder of the maximum allowable validity score may represent the validity score for the parsed name as a whole. Alternatively, the combination module may apply a logarithmic function to each of the dominance factors (e.g., raise 10 to the power of the difference of one and the dominance factor), and then may average the resulting values to identify the validity score for the parsed name.

In another embodiment, the combination module 1420 may receive a validity score for the parsed name from each of the tests 1410a-1410n and may average the received validity scores to identify the overall validity score for the parsed name. In one embodiment, the validity score is a number between 0 and 1, or a corresponding percentage between 0% and 100%. The validity score also may be referred to as a confidence in the parsed name.

The validity score is passed from the validity checker to the parsing controller 920 over the communications interface 1430. In addition, the parsed name, and information describing the parsed name, is received over the communications interface 1430. The parsing controller 920 may determine whether the parsed name is valid based on the validity score that is received from the parsing validity checker 970. In one embodiment, the parsing controller 920 may determine that the parsed name is valid when the validity score is greater than a threshold value. If the parsed name is invalid, then the parsing controller 920 may reorder (described later) the name phrases of the name and parse the name again.

Figure 15A:
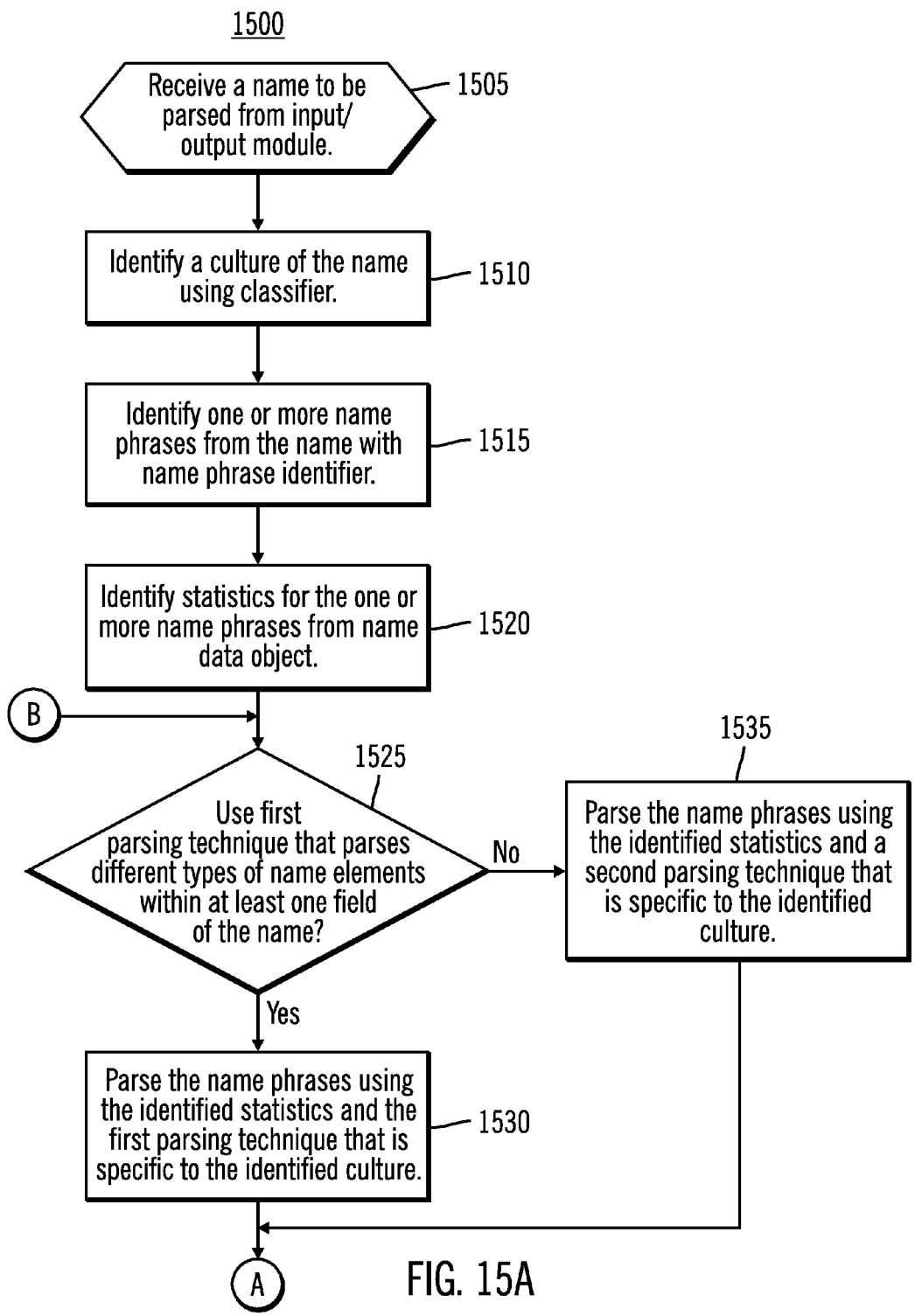
FIGS. 15A and 15B illustrate a flow chart of a first process for parsing culturally diverse names.
Figure 15B:
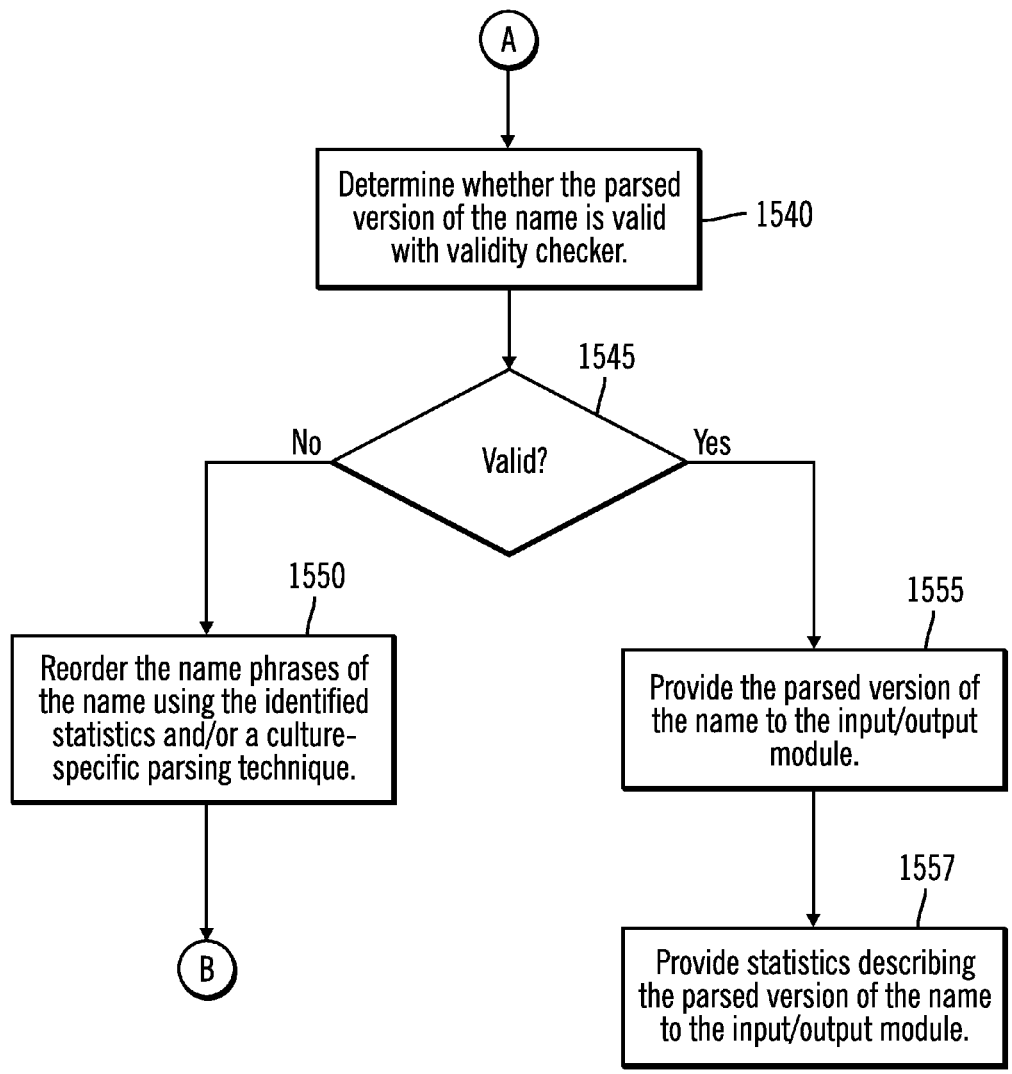

Referring to FIGS. 15A and 15B, a process 1500 is used to parse a name (e.g., a personal name) that is representative of one of multiple supported cultures. The process may be executed by a name processing application, such as the name processing application 902. More particularly, the process may be executed by a parsing controller of the name processing application, such as the parsing controller 920.

The controller receives a name to be parsed from an input/output module of the name processing application, such as the input/output module 910 (1505). In embodiments where the input/output module is a UI for the name processing application, the input/output module receives a specification of the name from a user of the UI. In embodiments where the input/output module implements an API to the name processing application, the input/output module receives the name through an invocation of a method or function provided by the API. For example, a "parse" method provided by the API may be called with the name as an argument to the method. The input/output module passes the received name to the controller for further processing.

The controller identifies a culture of the name using a classifier, such as the classifier 930 (1510). More particularly, the controller passes the name to the classifier, and the classifier identifies and returns an indication of a culture of the name. The classifier may determine one or more characteristics of the name, and may identify the culture based on the determined characteristics.

The controller then identifies one or more name phrases from the name with a name phrase identifier, such as the name phrase identifier 940 (1515). More particularly, the controller passes the name to the name phrase identifier, and the name phrase identifier identifies and returns the name phrases. In one embodiment, the name phrase identifier classifies each token of the name as a prefix, a suffix, or a stem, and uses the classification to identify the name phrases. In another embodiment, the name phrase identifier consults a list of name phrases, such as is maintained by the NDO 950, when identifying the name phrases. In addition to the name, the controller also may provide an indication of the culture of the name to the name phrase identifier, and the name phrase identifier may use the indication of the culture when identifying the name phrases.

The controller identifies statistics describing the name phrases of the name from an NDO of the name processing application, such as the NDO 950 (1520). More particularly, for each name phrase, the controller accesses indications of the number of names, from a set of culturally-diverse names, that include the name phrase as each of the possible types. The controller also may access indications of countries or cultures with names that include the name phrases, as well as numbers of names from each of the countries or cultures that include the name phrases, from the NDO. In embodiments where the name phrase identifier accesses the statistics from the NDO when identifying the name phrases, the name phrase identifier may provide the statistics to the controller.

The controller determines whether a first parsing technique that parses different types of name elements within at least one field of the name (e.g., a fine-grained parsing technique) is to be performed (1525). In certain embodiments, the determination of whether to perform the first parsing technique is based one on or more factors. Culture is one example of such a factor. For example, if a name is Hispanic, the controller may use a culture-specific parsing technique that identifies the patronymic surname and the matronymic surname; while, if the name is Russian, then the controller may use a culture-specific parsing technique that identifies the patronymic middle name. As another example, if the name is American, the controller may use a second parsing technique (e.g., a general parsing technique) that parses the name into one or more of: a title, a given name, a surname, and a qualifier.

The following table provides an example of the parsing technique that parses different types of name elements within at least one field of the name for the Hispanic culture. In particular, the parsing technique parses different types of name elements within the surname field.

| MARIA CARMEN | GARCIA | RODRIGUEZ | VDA | CABRERA | LOPEZ |
|---|---|---|---|---|---|
| | Patronymic Surname | Matronymic Surname | Particle indicating widowhood | Husband's patronymic surname | Husband's matronymic surname |
| Given Name Field | | | Surname Field | | |

If the first parsing technique is to be performed, the controller parses the name phrases using the identified statistics and the first parsing technique that is specific to the identified culture, such as one of the parsing techniques 960 (1530). In certain embodiments, the first parsing technique annotates name types within a field. The controller parses the name phrases using the identified statistics and a second parsing technique that is specific to the identified culture, such as one of the parsing techniques 960 (1535). More particularly, the parsing technique may be identified from among several potential parsing techniques based on non-equivalent matching. For example, if the identified culture of the name is the Korean culture, the parsing technique may be specific to multiple Asian cultures, including the Korean culture. The controller passes the name phrases and the identified statistics to the parsing technique. The controller also may provide, for example, an indication of the order in which the name phrases appear in the name, and other syntactic information describing the name, to the parsing technique. The parsing technique separates the name phrases into the possible types using the identified statistics and characteristics of names of the identified culture. The parsing technique provides a parsed version of the name to the controller, and the controller receives the parsed version of the name.

The controller determines whether the parsed version of the name is valid using a parsing validity checker, such as the parsing validity checker 970 of FIGS. 9 and 14 (1540). The controller passes the parsed version of the name to the validity checker. The controller also may provide other information describing the name, such as the statistics that were identified from the NDO, to the validity checker. The validity checker performs one or more tests that examine characteristics of the parsed version of the name. The results of the tests are combined into an overall indication of the validity of the parsed name, such as a validity score. The controller receives the indication of the validity of the parsed name from the validity checker.

The controller determines whether the parsed version of the name is valid (1545). More particularly, the controller determines whether the indication of the validity of the parsed name indicates that the parsed name is valid. For example, if the indication of the validity of the parsed name is a validity score, the controller may determine that the parsed version of the name is valid when the validity score exceeds a threshold value. The threshold value may be user-specified and may be received when the name is received. In one embodiment, the threshold value is 0.65, or 65%.

If the parsed version of the name is not valid, then the controller reorders the name phrases of the name using the identified statistics and/or the first or second parsing technique (1550). For example, the name phrases of the name may be reordered such that the name phrases that are titles appear first, followed in order by (i) the name phrases that are given names, (ii) the name phrases that are surnames, and (iii) the name phrases that are qualifiers. The name phrases may be classified as one of the possible types based on the identified statistics. For example, a name phrase may be classified as a given name when the identified statistics indicate that the name phrase typically appears as a given name either across all cultures or for a particular culture. The identified statistics may indicate that a name phrase typically appears as a given name when, for example, at least half of the names that include the name phrase include the name phrase as part of a given name.

A name may include multiple name phrases of the same type. In one embodiment, when multiple name phrases have the same type, the relative order of the multiple name phrases within the reordered name is not changed.

Figure 16:
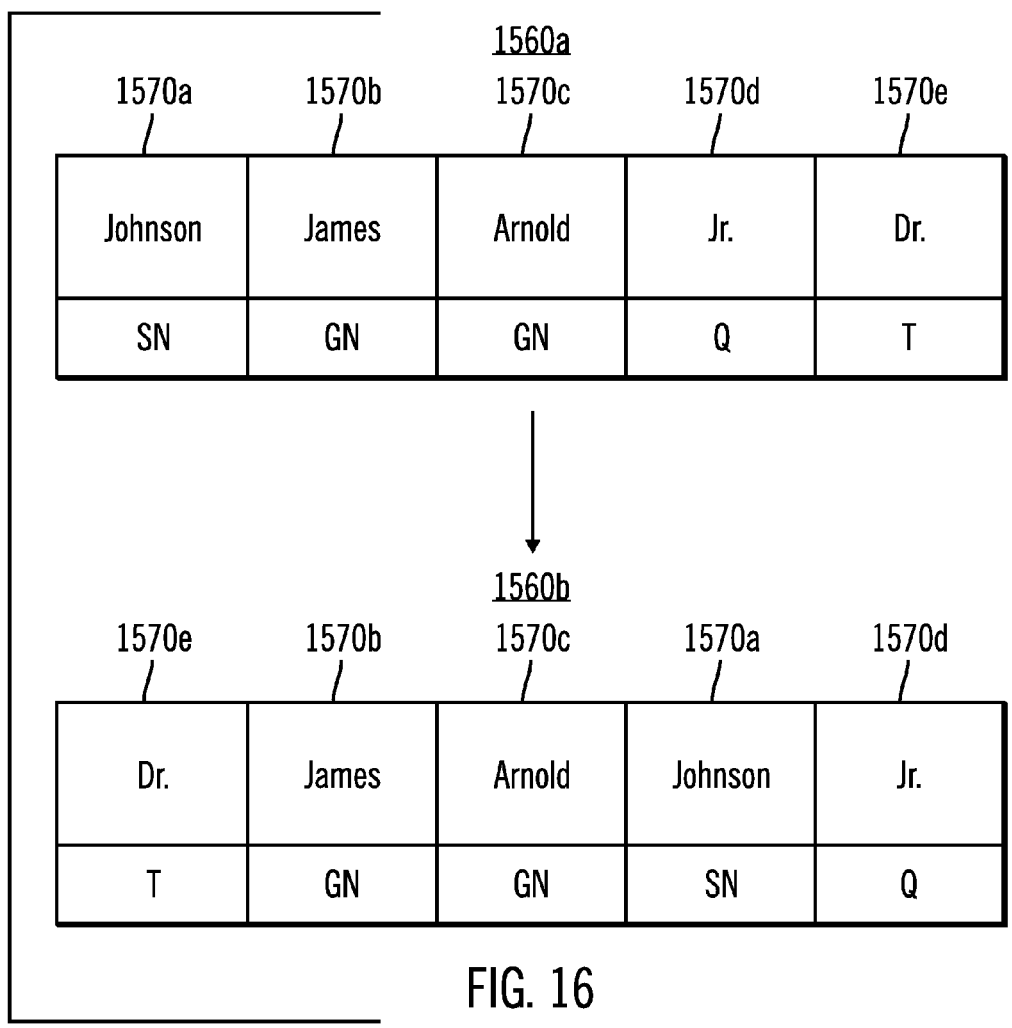
FIG. 16 is an illustration of a name before and after name phrases of the name are reordered in accordance with certain embodiments.

Referring to FIG. 16, parsing a name 1560a, "Johnson James Arnold Jr. Dr." with five name phrases 1570a-1570e initially may lead to an invalid parse. The statistics identified for the name phrases 1570a-1570e may indicate (as shown in FIG. 16, below each name phrase) that the name phrase 1570a is a surname (SN), the name phrase1 1570b is a given name (GN), the name phrase 1570c is a given name, the name phrase 1570d is a qualifier (Q), and the name phrase 1570e is a title (T). In such a case, the name phrases of the name 1560a, which originally appeared in the order "Johnson James Arnold Jr. Dr.," may be reordered to appear in the order "Dr. James Arnold Johnson Jr.," as indicated in the reordered name 1560b. In the reordered name 1560b, titles appear before given names, which appear before surnames, which occur before qualifiers. In addition, the relative order of name phrases of the same type is maintained. For example, the relative order in the name 1560b of the name phrases 1570b and 1570c, which are both given names, is unchanged from the name 1560a.

When a name includes multiple name phrases that are given names or surnames, but does not include both a given name and a surname, the name is assumed to be complete. In other words, it is assumed that the name should include at least one name phrase that is a given name and at least one name phrase that is a surname. Therefore, the name phrases may be reordered such that at least one name phrase is classified as a given name, and such that at least one name phrase is classified as a surname. Doing so may increase the likelihood that a valid parse of the name may be identified.

For example, when the identified statistics indicate that all of the multiple name phrases are surnames, one of the multiple name phrases is classified as a given name. Dominance factors are calculated for the multiple name phrases. The dominance factors indicate the likelihood that the multiple name phrases are surnames. The name phrase with the lowest dominance factor has the greatest likelihood of being a given name, and that name phrase is included in the reordered name as a given name. If more than one of the multiple name phrases share the lowest dominance factor, then the name phrase with the lowest dominance factor that appears first in the name is classified as a given name. Similar classifications are made when the identified statistics indicate that all of the multiple name phrases are given names.

For example, the statistics table 1100 indicates that the three name phrases of the name "Smith Kim Stephenson" are surnames. Moreover, the statistics table 1100 indicates that the dominance factor of "Smith" is 0.996, that the dominance factor of "Kim" is 0.892, and that the dominance factor of "Stephenson" is 0.982. Because "Kim" has the lowest dominance factor, to some extent because "Kim" appears as a given name more often than "Smith" or "Stephenson" appear as given names, "Kim" is classified as a given name. Because given names are placed before surnames in the reordered name, and because the relative order of the name phrases is otherwise maintained, the reordered name is "Kim Smith Stephenson." In another embodiment, the name phrases may be ordered based on corresponding dominance factors. For example, name phrases may be included in order of increasing dominance factors. In such a case, the reordered name becomes "Kim Stephenson Smith." Because "Kim" appears first in the reordered name, "Kim" is classified as a given name. As another example, a name may include three name phrases, and all three name phrases may be given names. In such a case, one of the given names is classified as a surname, similarly to how a surname was classified as a given name in the above example.

In another embodiment, the name phrases may be reordered arbitrarily. In other words, the name phrases may be placed in an order in which the name phrases have not previously been placed for parsing. Such reordering of the name phrases does not require classification of the name phrases as one of the possible types.

In another embodiment, only a subset of the name phrases may be reordered, based on a determined validity of a parsed version of the name, or on statistics gathered in the parsing process. For example, the statistics may indicate that two name phrases appear to be reversed. In such a case, the positions of the two name phrases may be reversed, and the other name phrases may remain in place.

After the name phrases of the name have been reordered, the name phrases and the identified statistics are parsed again (1525, 1530, 1535). A new parsed version of the name that is identified by the parsing technique typically classifies the name phrases of the name into the possible types that were indicated by the reordered name phrases. For example, the name phrases that appear first typically are classified as titles, the next name phrases as given names, the next name phrases as surnames, and the next name phrases as qualifiers. Rather than parsing the name phrases again to classify the name phrases, the name phrases may be classified directly into the possible types that were indicated by the reordered name phrases.

The controller may determine whether the new version is valid (1540, 1545). If the new version also is not valid, then the name phrases may be reordered again (1550), and the name may be parsed again with the culture-specific parsing technique (1525, 1530, 1535). In this manner, a name may be repeatedly parsed until a valid parse of the name is identified. However, in typical embodiments, parsing the name more than twice does not identify a parsed version of the name that is different from the parsed version of the name identified by the second parse of the name.

If a subsequent parsed version of the name does not differ from a previous parsed version of the name, then the name might not be parsed again, and a previously identified parsed version of the name that is the most valid may be identified as an appropriate parse of the name. Furthermore, if the validity of a subsequent parsed version does not improve over the validity of a previous parsed version, then the name might not be parsed again, and a previously identified parsed version of the name that is the most valid may be identified as an appropriate parse of the name. For example, if a validity score of the subsequent parsed version is not greater than the validity score of the previous parsed version, then the name might not be parsed again. In such a case, a technically invalid parsed version of the name may be produced. In typical embodiments, the previously identified parsed version of the name that is most valid is the first parsed version of the name.

If the parsed version of the name is valid (1550), then the controller provides the parsed version of the name to the input/output module (1555). More particularly, the controller provides the input/output module with indications of the name phrases of the name that are included in the title, the given name, the surname, and the qualifier in the parsed version of the name. In some embodiments, the controller may provide only a portion of the parsed version of the name to the input/output module. For example, the controller may provide only the given name and the surname of the parsed name to the input/output module. In some embodiments, the controller may provide the parsed version of the name to the input/output module when the parsed version of the name is not valid. The controller may do so, for example, if a name is not to be reparsed automatically in response to an invalid parse. If the name has been parsed multiple times, the controller may provide the multiple parsed versions of the name to the input/output module. A recipient of the multiple parsed versions from the input/output module may select one of the multiple parsed versions for use.

In addition, the controller may provide statistics describing the parsed version of the name to the input/output module (1557). For example, the controller may provide the statistics retrieved from the NDO for each of the name phrases included in the parsed version of the name. As another example, the controller may provide an indication of the validity of the parsed version of the name. In embodiments where the input/output module is a UI for the name processing application, the input/output module may present the parsed version of the name and the statistics with the UI. In embodiments where the input/output module implements an API to the name processing application, the input/output module may provide the parsed version of the name and the statistics as returned values from the method or function that was invoked to indicate that the name should be parsed.

As an example, the process 1500 may be used to parse the name "Kim Jae Dong." The controller receives the name from the input/output module (1505). The controller uses the classifier to identify a culture of the name, which is Korean in this case (1510). The controller uses the name phrase identifier to determine that the name includes three name phrases, "Kim," "Jae," and "Dong" (1515). The controller retrieves statistics for the three name phrases from the NDO (1520). The statistics may be culture-specific statistics (for example, from the statistics table 1100) or combined statistics (for example, from the statistics table 1200). For example, as indicated in row 1270r of the statistics table 1200, the name phrase "Kim" occurs as a title in 0 Korean names, as a given name in 161,181 Korean names, as a surname in 1,337,953 Korean names, and as a qualifier in 0 Korean names. Therefore, as a Korean name, "Kim" is typically a surname. As indicated in row 1270t, the name phrase "Jae" occurs as a title in 0 Korean names, as a given name in 171,766 Korean names, as a surname in 1824 Korean names, and as a qualifier in 0 Korean names. Therefore, as a Korean name, "Jae" is typically a given name. As indicated in row 1270v, the name phrase "Dong" occurs as a title in 0 Korean names, as a given name in 82,426 Korean names, as a surname in 10,557 Korean names, and as a qualifier in 0 Korean names. Therefore, as a Korean name, "Dong" is typically a given name.

The controller parses the name phrases using the identified statistics and a parsing technique that is specific to the Korean culture (1535). The technique may be a technique that parses only Korean names, or that parses all Asian names. However, such techniques may not be available to the controller, so the controller passes the name phrases and the identified statistics to a generic technique for parsing names from all cultures. The generic technique uses the statistics to generate a parsed version of the name. The parsed version may indicate that the given name is "Kim Jae" and that the surname is "Dong." The controller identifies a validity score for the parsed version of the name (1540). Because "Kim" is found in the given name and "Dong" is found in the surname, the parsed version of the name may be given a low validity score, as described earlier. As a result, the controller may determine that the parsed version of the name is invalid (1545).

In certain embodiments, a Korean given name, such as "EUN GYUNG", is broken down into single name tokens so that EUN would get a count of 1 and GYUNG would get a count of 1. Korean and Chinese given names, however, are almost always two-token names, and the two tokens go together as a unit. EUN or GYUNG may combine with other elements to create a completely different name. Thus, in certain embodiments, the parser parses certain names (e.g., Korean and Chinese names) to assign a count of one to a two-token name. For example, the name EUN GYUNG now gets a count of 1 (rather than counting the two tokens separately). The parser makes use of this new information by first checking to see if a multi-token name is possible before examining the given name-surname distribution of the individual tokens.

The controller then reorders the name phrases (1550). Because, "Jae" and "Dong" typically are found in given names, "Kim" typically is found in surnames, and given names typically appear before surnames (in the culture in which the controller is being used), the controller may reorder the name phrases such that "Jae" appears first, "Dong" appears second, and "Kim" appears third. The name is reparsed, and the new parsed version of the name may indicate that the given name is "Jae Dong" and that the surname is "Kim" (1535). The controller identifies a validity score for the new parsed version (1540). Because the three name phrases appear in fields of the new parsed version in which they typically appear, the new parsed version of the name may be given a high validity score. As a result, the controller may determine that the parsed version of the name is valid (1545). The controller provides the parsed version of the name to the input/output module (1555). The controller also may provide statistics describing the parsed version of the name to the input/output module (1557).

FIG. 17 provides examples that illustrate the application of process 1500 using the name processing application 902 through the illustration of the parsing of exemplary names 1710*a*-1710*j* from multiple cultures. The parsed versions of the names 1710*a*-1710*j* are listed in a table 1720 with columns 1730-1770. A title column 1730 includes titles of the parsed names, a given name column 1740 includes given names of the parsed names, a surname column 1750 includes surnames of the parsed names, a qualifier column 1760 includes qualifiers of the parsed names, and a validity score column 1770 includes validity scores for the parsed names. In some embodiments, the parsed names may be presented, for example, without the title column 1730 or the qualifier column 1760.

Each of the parsed names is represented by a row 1780*a*-1780*l* in the table 1720, and each of the names 1710*a*-1710*j* correspond to one or more of the rows 1780*a*-1780*l*. An arrow between one of the names 1710*a*-1710*j* and one of the rows 1780*a*-1780*l* indicates that the row represents a parsed version of the name.

An empty cell in one of the rows 1780*a*-1780*l* indicates that a corresponding one of the names 1710*a*-1710*j* does not include a name phrase of a type corresponding to the column of the empty cell. For example, the cell in the row 1780*b* and the column 1730 is empty because the corresponding name 1710*b* does not include a title.

Several of the names 1710*a*-1710*j* have been parsed into given names and surnames that include multiple name phrases. Furthermore, each of the multiple name phrases may include multiple tokens, such as a name stem and one or more prefixes or suffixes. For example, the name 1710*a*, "Sra. Maria del Carmen Bustamante de la Fuente" has been parsed into a given name that includes two name phrases and a surname that includes two name phrases. The given name "Maria del Carmen" includes the name phrases "Maria" and "del Carmen," and "del Carmen" includes the name stem "Carmen" and the prefix "del." Similarly, the surname "Bustamante de la Fuente" includes the name phrases "Bustamante" and "de la Fuente," and "de la Fuente" includes the name stem "Fuente" and the prefixes "de" and "la."

Most of the validity scores listed in the validity score column 1770 exceed a minimum allowable validity score for corresponding parsed names to be valid, which may be 65%. Several of the names 1710*a*-1710*j* may have been parsed multiple times to identify parsed versions of the names with sufficiently high validity scores. Consequently, name phrases of those names were reordered each time the name was to be reparsed. In an embodiment producing the results of the table 1720, the name 1710*h*, "Smith James" was parsed initially with "Smith" as the given name and "James" as the surname. Such a parse of the name 1710*h* may lead to a low validity score, because "Smith" typically is found in surnames and "James" typically is found in given names. In the embodiment, the name phrases of the name 1710*h* may be reordered and reparsed such that "James" becomes the given name and "Smith" becomes the surname, as indicated in the row 1780*h*. Such a parse of the name 1710*h* has a higher validity score of 93%.

However, all names in which a surname appears before a given name are not parsed multiple times. For example, the row 1780*c* indicates that the surname appears before the given name in the name 1710*c*, and the row 1780*g* indicates that the surname appears before the given name in the name 1710*g*. A parsing technique used to parse the Asian names, of which the names 1710*c* and 1710*g* are examples, may recognize this typical structure and may correctly parse the names 1710*c* and 1710*g* such that sufficiently high validity scores of 68% and 92% are initially achieved.

Furthermore, some of the validity scores listed in the validity score column 1770 do not exceed the minimum allowable validity score, even though the corresponding names were parsed multiple times. For example, the validity score for the parsed name in row 1780*f* is 58%, which is less than the minimum allowable validity score, even though the name 1710*f* was parsed multiple times. In an embodiment producing the results of the table 1720, an initial parse of the name 1710*f* indicated that "Kees Andries" is the given name and that "Van Der Merve" is the surname, and such a parse received a validity score of 58%. In the embodiment, reordering the name phrases of the name 1710*f* and reparsing the reordered name 1710*f* did not improve the validity score, so the initial order of the name phrases in the name is relied upon when identifying the initial parse as the better parse of the name 1710*f*.

The names 1710*i* and 1710*j* are examples of conjoined name constructs. A conjoined name construct is a string that indicates multiple names that are joined by conjunctions. A conjoined name is one of the multiple names that are indicated by the conjoined name construct. For example, each of the names 1710*i* and 1710*j* indicates two conjoined names. Other examples of conjoined name constructs include "John and Mary Smith," "Mr. and Mrs. John and Mary Smith," and "John and Mary Smith and Robert Jones." Typically, the number of surnames or given names in a conjoined name construct is less than the number indicated conjoined names. For example, the name 1710*i* indicates two conjoined names, but includes only one surname. When a conjoined name construct is parsed, a parsed version of each conjoined name indicated by the conjoined name construct is produced. For example, when the name 1710*i* is parsed, parsed names represented by the rows 1780*i* and 1780*j* are produced. Similarly, when the name 1710*j* is parsed, parsed names represented by the rows 1780*k* and 1780*l* are produced.

Figure 18:
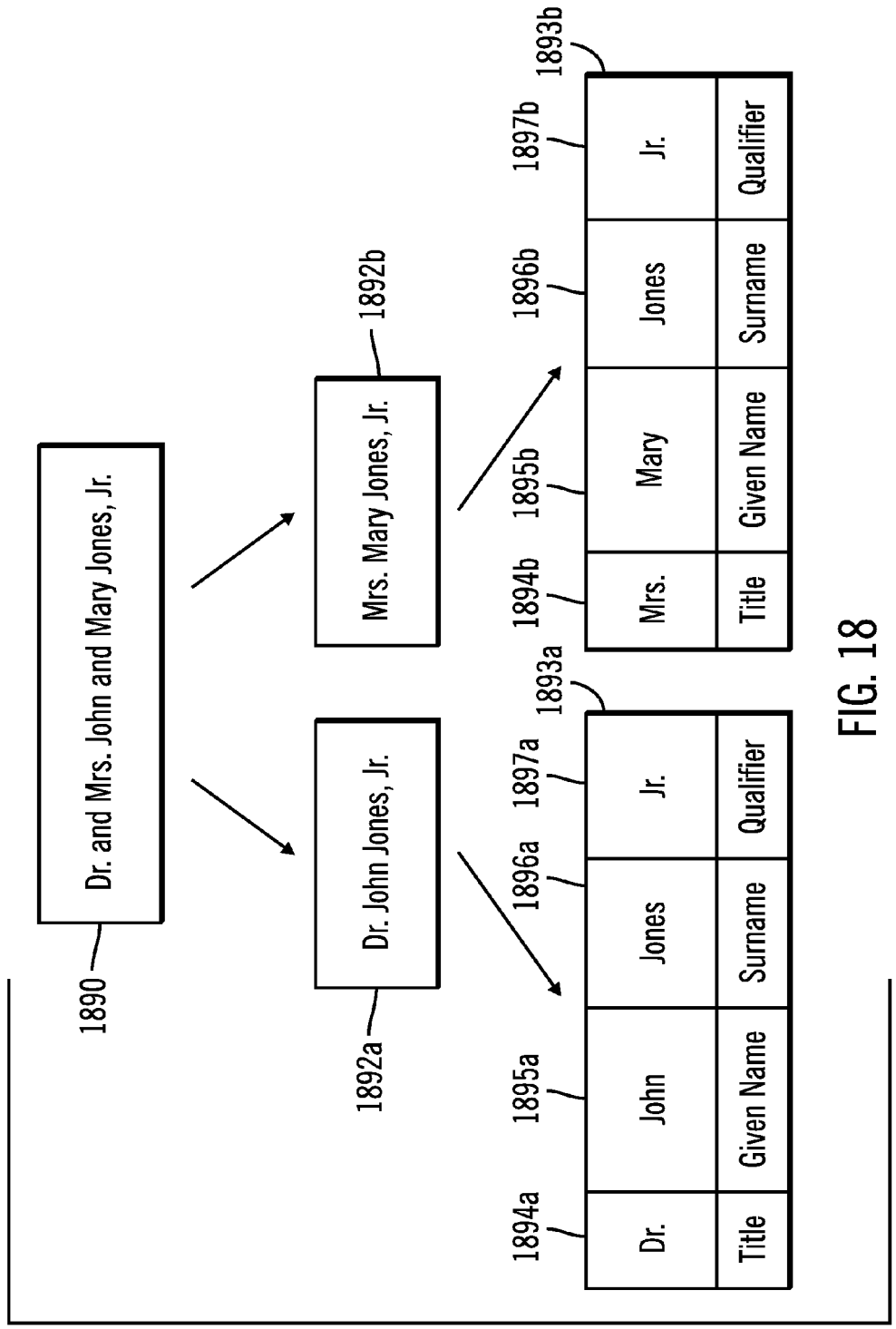
FIG. 18 is an illustration of a conjoined name construct before and after parsing in accordance with certain embodiments.

Referring to FIG. 18, a conjoined name construct 1890, "Dr. and Mrs. John and Mary Jones, Jr.," indicates a name 1892*a*, "Dr. John Jones, Jr.," includes one or more tokens or punctuation marks that indicate multiple conjoined names that may be extracted from the conjoined name construct. The tokens may be conjunctions, such as "and" or "or," and the punctuation marks may include, for example, an ampersand, a comma, or a semicolon. Such tokens may be referred to as separating elements of the conjoined name construct, because they may be used to separate the conjoined name construct into multiple indicated conjoined names.

The separating elements included in the conjoined name construct 1890 may be used to extract two conjoined names 1892*a* and 1892*b* from the conjoined name construct 1890. More particularly, the name phrases included in the conjoined name construct 1890 are identified, for example, with the name phrase identifier 940 of FIG. 9. The identified name phrases do not include any of the separating elements included in the conjoined name construct 1890. Each of the identified name phrases is classified as one of the possible types, for example, using statistics from the NDO 950 of FIG. 9. The classification of the name phrases and the locations of the separating elements indicate how the conjoined name construct is to be separated into the multiple conjoined names.

For example, if the name phrases on either side of a separating element are both titles (e.g., "Mrs. and Mrs. John Smith, Jr."), then each title is grouped with the other given names, surnames, and qualifiers of the conjoined name construct (e.g., "Mr. John Smith, Jr." and "Mrs. John Smith, Jr."). As another example, when a separating element is preceded by a surname or a qualifier, and the separating element is followed by title or a given name (e.g., "John Smith, Jr. and Mary Jones"), then the separating element is assumed to be separating two complete conjoined names (e.g., "John Smith, Jr." and "Mary Jones").

As yet another example, if the name phrases on either side of a separating element are given names, (e.g., "John and Mary Smith, Jr."), then each given name is grouped with the other surnames and qualifiers of the conjoined name construct (e.g., "John Smith, Jr." and "Mary Smith, Jr."). Conjoined names are identified similarly if multiple name phrases on either side of the separating element are given names (e.g., "John Peter and Mary Smith, Jr." yields "John Peter Smith, Jr." and "Mary Smith, Jr.").

Furthermore, if the one or more given names on one side of the separating element is preceded or followed by a title (e.g., "Mr. John and Mary Smith, Jr."), then the one or more given names and their associated title are grouped with the other surnames and qualifiers of the conjoined name construct (e.g., "Mr. John Smith, Jr." and "Mary Smith, Jr."). As another example, "Mr. John and Mrs. Mary Smith, Jr." yields "Mr. John Smith, Jr." and "Mrs. Mary Smith, Jr." Rules may be also applied to the examine the parsed names for common exceptions, such as, for example, changing "Mary Smith., Jr." to "Mary Smith".

The above rules for identifying conjoined names from a conjoined name construct may be extended to apply to conjoined name constructs that include multiple separating elements. For example, the rule for separating a conjoined name construct that includes given names on either side a separating element may be extended to apply to separating a conjoined name construct that includes three or more given names that are separated by two or more separating elements (e.g., "Tom, Dick and Harry Smith"). In such a case, each given name is grouped with the other surnames and qualifiers of the conjoined name construct (e.g., "Tom Smith," "Dick Smith," and "Harry Smith").

Other rules are specific only to conjoined name constructs that include multiple separating elements. For example, if name phrases on either side of a first separating element are titles, and if name phrases on either side of a second separating element are given names, as is the case in the conjoined name construct 1890, the conjoined name construct represents a parallel construction. In such a case, the first title is grouped with the first given name, as well as the other surnames and qualifiers of the conjoined name construct, and the second title is grouped with the second given name and the other surnames and qualifiers, as is indicated by the names 1892*a* and 1892*b*.

As another example, in conjoined name constructs with multiple separating elements, a determination of whether a particular one the separating elements is separating two complete conjoined names, each of which may represent a conjoined name construct themselves, is made. If that is the case, then the name is separated into the two conjoined names at the particular separating element. Each of the two conjoined names is processed recursively to determine whether the conjoined name represents a conjoined name construct, and, if so, to identify the conjoined names that are indicated by the conjoined name construct, using the rules described above. For example, in the name "John and Mary Smith and Bob and Linda Jones," the second "and" separates two conjoined names, "John and Mary Smith" and "Bob and Linda Jones." Both of the conjoined names include a separating element (e.g., "and"), so both of the conjoined names represent conjoined name constructs. Therefore, the two conjoined names are processed using the above rules to determine that the original conjoined name construct indicated four conjoined names, "John Smith," "Mary Smith," "Bob Jones" and "Linda Jones."

The above rules do not require that titles appear before given names in the conjoined name construct, that given names appear before surnames, or that surnames appear before qualifiers to identify the indicated conjoined names. However, when grouping the name phrases into the conjoined names, titles appear first, followed by given names, surnames, and qualifiers. Therefore, the conjoined name construct "Smith John Mr. and Mrs." yields the conjoined names "Mr. John Smith" and "Mrs. John Smith." Furthermore, when grouping name phrases of the conjoined name construct to form the conjoined names, the order of name phrases of the same type in the conjoined name construct is maintained in the conjoined names.

After the conjoined names have been identified, each of the conjoined names is parsed. For example, parsing techniques that are specific to cultures of each of the conjoined names may be used to parse the conjoined names. As a result, name phrases of the conjoined names are parsed into each of the possible element types. For example, the names 1892*a* and 1892*b* are parsed individually to produce parsed names 1893*a* and 1893*b*, respectively. The parsed names 1893*a* and 1893*b* include titles 1894*a* and 1894*b*, given names 1895*a* and 1895*b*, surnames 1896*a* and 1896*b*, and qualifiers 1897*a* and 1897*b*, respectively.

Figure 19:
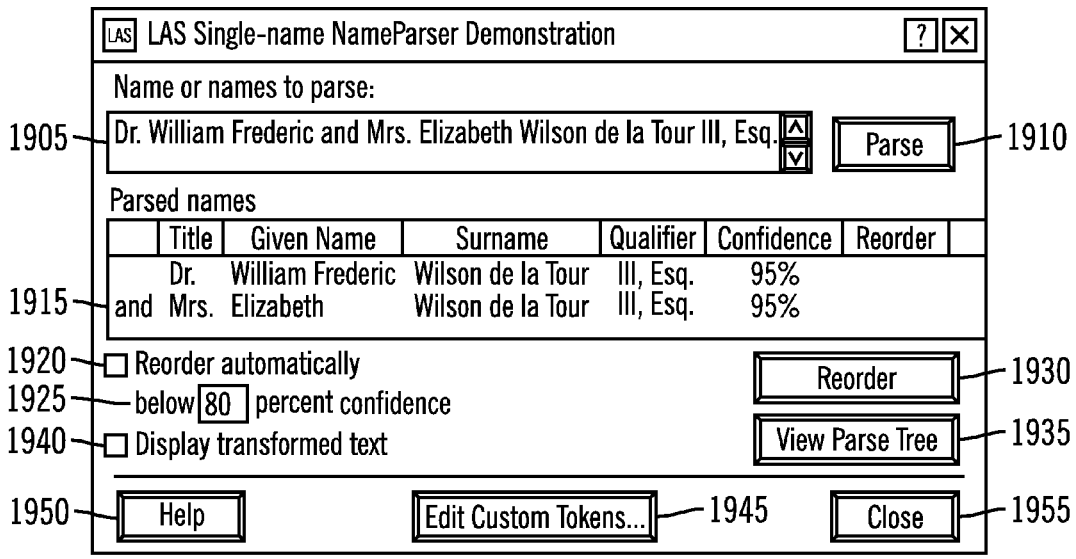
FIG. 19 is an illustration of an interface for parsing names in accordance with certain embodiments.

Referring to FIG. 19, a parsing interface 1900 enables a user to specify one or more personal names to be parsed and to view parsed versions of the personal names. The interface 1900 also enables the user to specify values for one or more parameters to control how the names are parsed. The parsing interface 1900 may represent an input/output module of a name processing application, such as the input/output module 10 of the name processing application 902.

The parsing interface includes an input field 1905 into which one or more names to be parsed are entered. Multiple individual names may be entered into the input field 1905 if they are separated by particular punctuation marks, such as a comma or a semicolon. In addition, one or more conjoined name constructs may be entered into the input field 1905. In the illustrated interface 1900, the conjoined name construct "Dr. William Frederic and Mrs. Elizabeth Wilson de la Tour III, Esq." has been entered into the input field 1905.

Selecting a parse button 1910 signals for the names included in the input field 1905 to be parsed. In other words, selecting the parse button 1910 passes the names to be parsed to a parsing controller of the name processing application, such as the parsing controller 920. The parsing controller uses other components of the name processing application to create parsed versions of the names. The parsed versions are passed to the input/output module and displayed in an output field 1915. The output field 1915 is a table that includes columns for titles, given names, surnames, and qualifiers of the parsed names. Each of the parsed names is given a row in the table, and the components of the parsed names are spread among the columns accordingly. For example, two conjoined names were indicated by the conjoined name construct that was entered into the input field 1905, so two parsed names are displayed in the output field 1915. The first parsed name has "Dr." as a title, "William Frederic" as a given name, "Wilson de la Tour" as a surname, and "III, Esq." as a qualifier, and the second parsed name has "Mrs." as a title, "Elizabeth" as a given name, "Wilson de la Tour" as a surname, and "III, Esq." as a qualifier. Each row also includes an indication of the validity score or confidence of the corresponding parsed name. In the illustrated interface 1900, both parsed names have validity scores of 95%, which indicates that the parsed names are considered to be valid.

A reorder checkbox 1920 enables the user to indicate that name phrases of a name that has been entered into the input field 1905 should be reordered and reparsed automatically when a previous parse of the name has a validity score below a threshold value. The threshold value may be specified in a text field 1925. In one embodiment, the user may specify the threshold value in the text field 1925 only after the checkbox 1920 has been selected. A reorder button 1930 enables a user to indicate manually that a name should be reparsed. For example, the user may view a parsed version of a name and an associated validity score in the results field 1915. After manually determining that the parse is invalid because the validity score is too low, the user may select the reorder button 1930 to reorder the name phrases of the name, to reparse the name, and to receive another parse of the name.

A parse tree button 1935 causes an interface displaying a parse tree for a parsed name that has been selected from the results field 1915 to be displayed. The parse tree indicates the types of name phrases in the parsed name, as well as components of the included name phrases. The parse tree also indicates numbers of names in which the name phrases appear as given names and surnames, as indicated by a corresponding NDO, such as the NDO 950.

Figure 20:
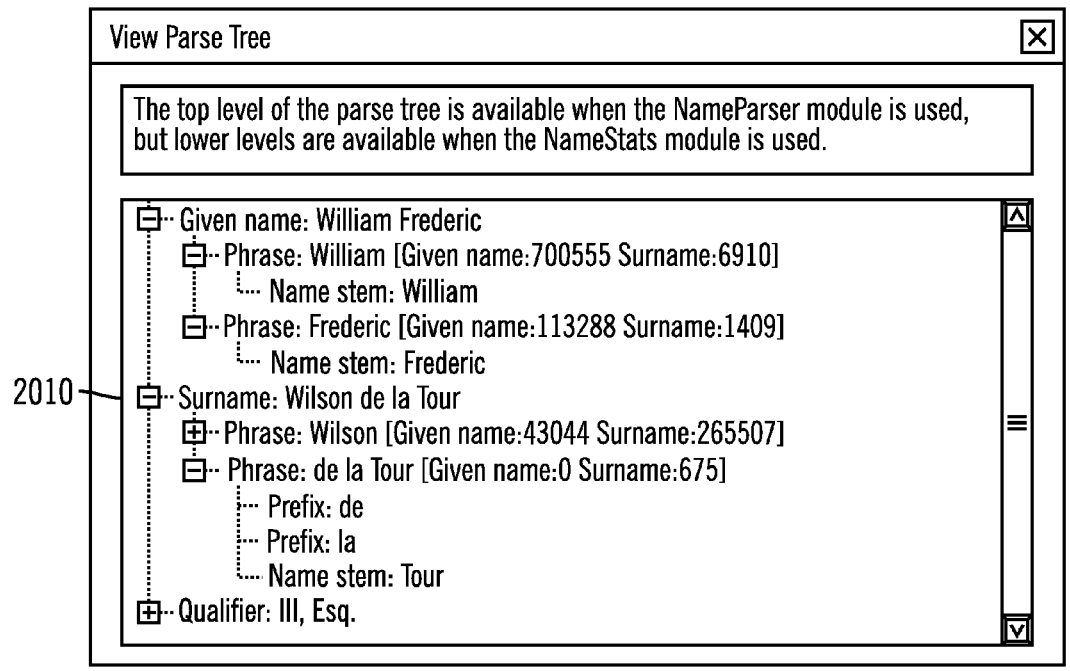
FIG. 20 is an illustration of an interface for presenting statistics describing a parsed name in accordance with certain embodiments.

Referring also to FIG. 20, an interface 2000 displays a parse tree 2010 for the first parsed name listed in the results field 1915. Only a portion of the parse tree 2010 is visible in the interface 2000. More particularly, the parse tree 2010 indicates the name phrases, and the components thereof, that are included in the given name and the surname of the parsed name.

The parse tree 2010 indicates that the given name "William Frederic" includes two name phrases. The name phrase "William" is included in 700,555 names as a given name, and in 6,910 names as a surname. The name phrase includes a single component, namely the name stem "William." Similarly, the parse tree 2010 indicates that the surname "Wilson de la Tour" includes two name phrases. The name phrase "Wilson" has only one component, and the name phrase "de la Tour" has three components. The parse tree 2010 indicates that "Tour" is the name stem for the second name phrase, and that "de" and "la" are prefixes to the name stem. Invisible portions of the parse tree 2010 indicate that the title includes a single name phrase that includes a single title (e.g., "Dr."). In addition, the invisible portions of the parse tree 2010 indicate that the qualifier includes two name phrases, each of which includes a single qualifier (e.g., "III" and "Esq.").

Referring again to FIG. 19, a transformed text checkbox 1940 enables a user to indicate that the parsed names should be presented in the results field 1915 without formatting. For example, when the checkbox 1940 is selected, the parsed names may be presented in the results field 1915 in uppercase letters without punctuation, accents, or noise characters, or characters that are not included in the parsed names. Presenting or providing the parsed names without formatting may enable the parsed name to be viewed or used by users or systems that are not configured to recognize the formatting.

A custom tokens button 1945 enables a user to specify additional tokens or name phrases to be added to the NDO used by the name processing application. When the custom tokens button 1945 is selected, an interface with which the user may specify the additional tokens or name phrases is displayed. The interface enables the user to specify a name phrase, numbers of names in which the name phrase is each of the possible types, as well as a comment for the name phrase. In addition, the interface also enables specification of one or more noise filters. A noise filter includes words that are ignored when included in names being parsed. A noise filter may indicate that words that typically are not included in names be ignored. For example, when parsing the name "Thomas P. "Tip" O'Neill, Jr.," a noise filter may indicate that words within quotation marks (e.g., "Tip"), which typically represent nicknames, are to be ignored.

A help button 1950 enables a user to receive help when using the interface 1900. Selecting the button 1950 causes a help interface that describes how to use the interface 1900 to be displayed to the user. A close button 1955 dismisses the interface 1900 when selected.

Figure 21:
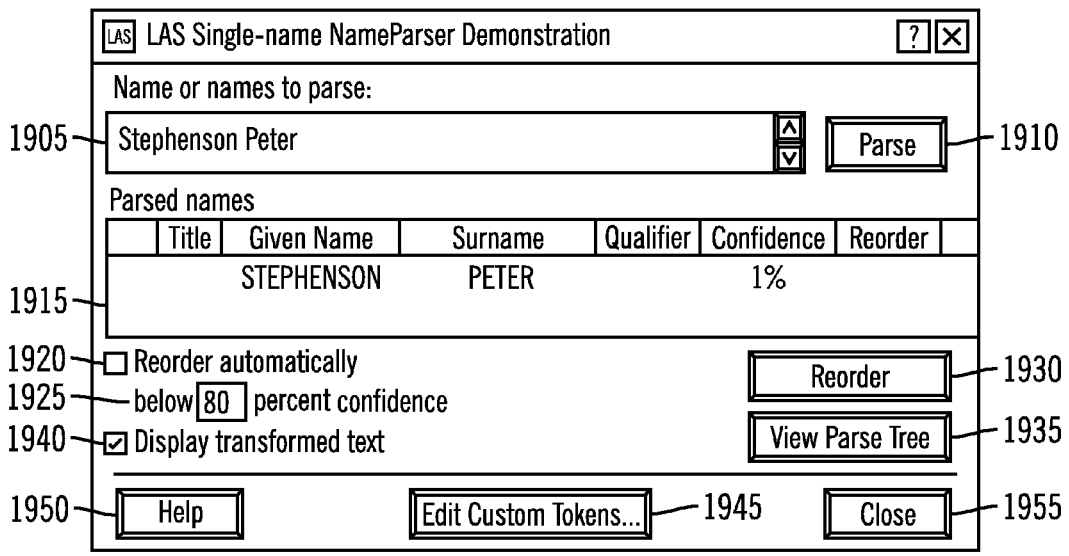
FIGS. 21 and 22 are further illustrations of interfaces for parsing names in accordance with certain embodiments.

Referring also to FIG. 21, name phrases of a name entered into the input field 1905 of the interface 1900 may be reordered to correctly parse the name. For example, the name "Stephenson Peter" has been entered into the input field 1905. That name includes two name phrases, namely "Stephenson" and "Peter," and each of the name phrases is typically found in English names. In English names with two name phrases, the first name phrase typically is a given name, and the second name phrase typically is a surname. Therefore, the name may be parsed such that "Stephenson" is the given name and "Peter" is the surname, as in indicated in the results field 1915.

However, row 1170*m* of the statistics table 1100 and row 1270*y* of the statistics table 1200 indicate that the name phrase "Stephenson" appears more frequently as a surname. In addition, row 1170*n* of the statistics table 1100 indicates that the name phrase "Peter" appears more frequently as a given name. Therefore, the initial parse of the name that is listed in the results field 1915 may be invalid, as is indicated by the relatively low confidence or validity score (1%) assigned to the initial parse.

Figure 22:
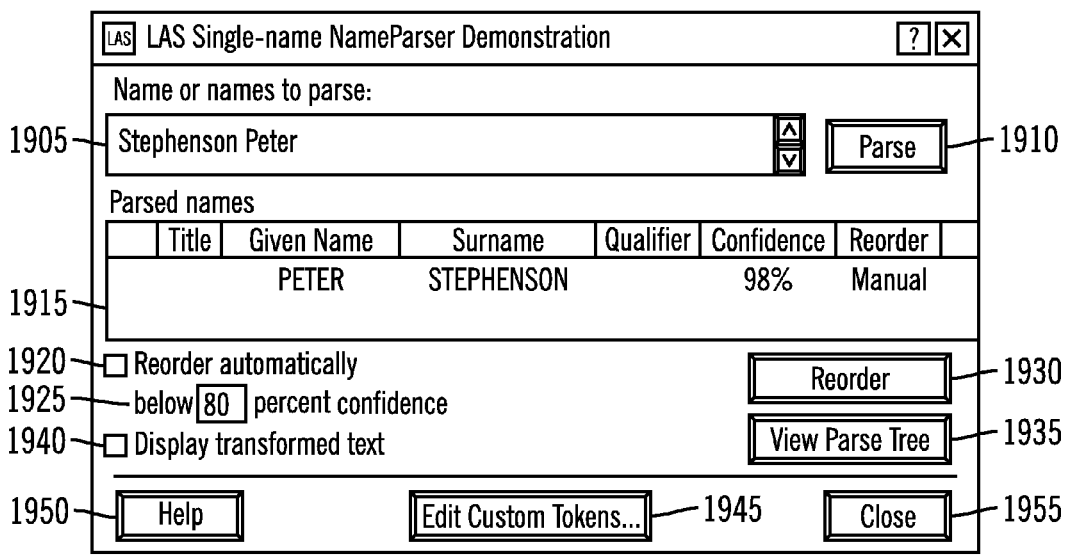

Referring to FIG. 22, selecting the reorder button 1930 rearranges the two name phrases of the name "Stephenson Peter." Because the name includes only two name phrases, the name may be reordered in only one manner, and the name is parsed as if entered originally as "Peter Stephenson." Using the conventional rules for English names, "Peter" is identified as the given name, and "Stephenson" is identified as the surname, as is indicated in the results field 1915. This is corroborated by the information included in the statistics tables 1100 and 1200, which results in the high validity score of 98% assigned to the parsed name.

Figure 23:
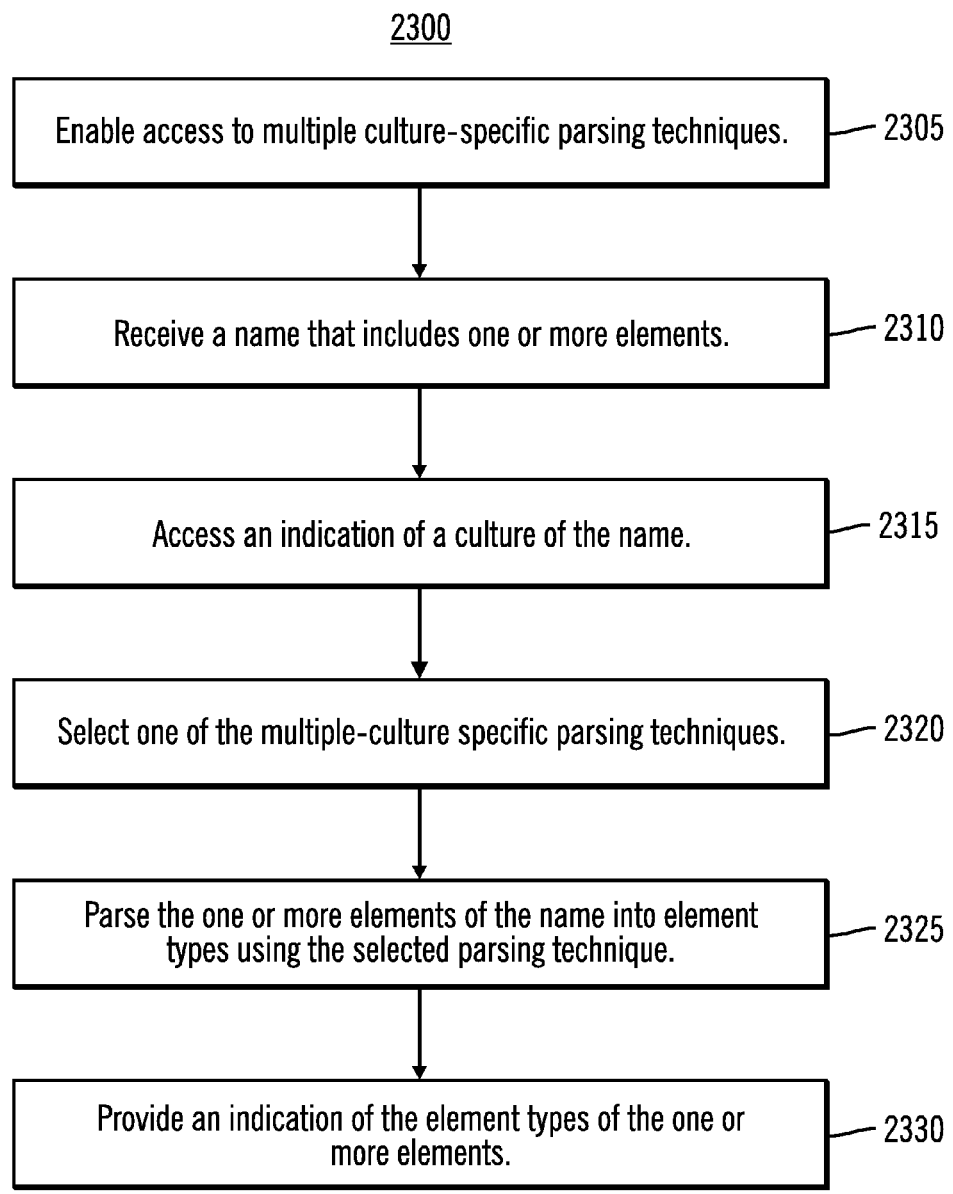
FIG. 23 is a flow chart of a second process for parsing culturally diverse names in accordance with certain embodiments.

Referring to FIG. 23, an alternative process 2300 also may be used to parse culturally diverse names. The process 2300 is similar to the process 1500. The process 2300 may be executed by a name processing application, such as the name processing application 902.

The name processing application enables access to multiple culture-specific parsing techniques (2305). Each of the culture-specific parsing techniques parses names of one or more corresponding cultures. For example, a German parsing technique may parse German names, while an Asian parsing technique may parse Chinese, Japanese, and Korean names.

The name processing application receives a name that includes one or more elements (2310). The name may be received, fox example, from a UI for the name processing application, or through invocation of a method of an API that is implemented by the name processing application.

The name processing application accesses an indication of a culture of the name (2315). The name processing application may identify the culture based on at least one characteristic of the name. The name processing application selects one of the multiple culture-specific parsing techniques (2320). More particularly, the name processing application selects the culture-specific parsing technique that corresponds to the indicated culture. For example, if the indicated culture is German, the technique for parsing German names may be selected. As another example, if the indicated culture is Korean, the technique for parsing Asian names may be selected.

The name processing application parses the one or more elements of the name into element types using the selected parsing technique (2325). More particularly, the name processing application classifies each of the elements of the names as one of the possible types. The classification of the elements may be based on characteristics of names of the indicated culture. The classification also may be based on statistics describing the elements of the name, such as the information that is accessible from the NDO 950 of FIGS. 1A and 1B.

The name processing application provides an indication of the element types of the one or more elements (2320). The name processing application may provide the indication of the element types through the UI or API from which the name was received.

Figure 24:
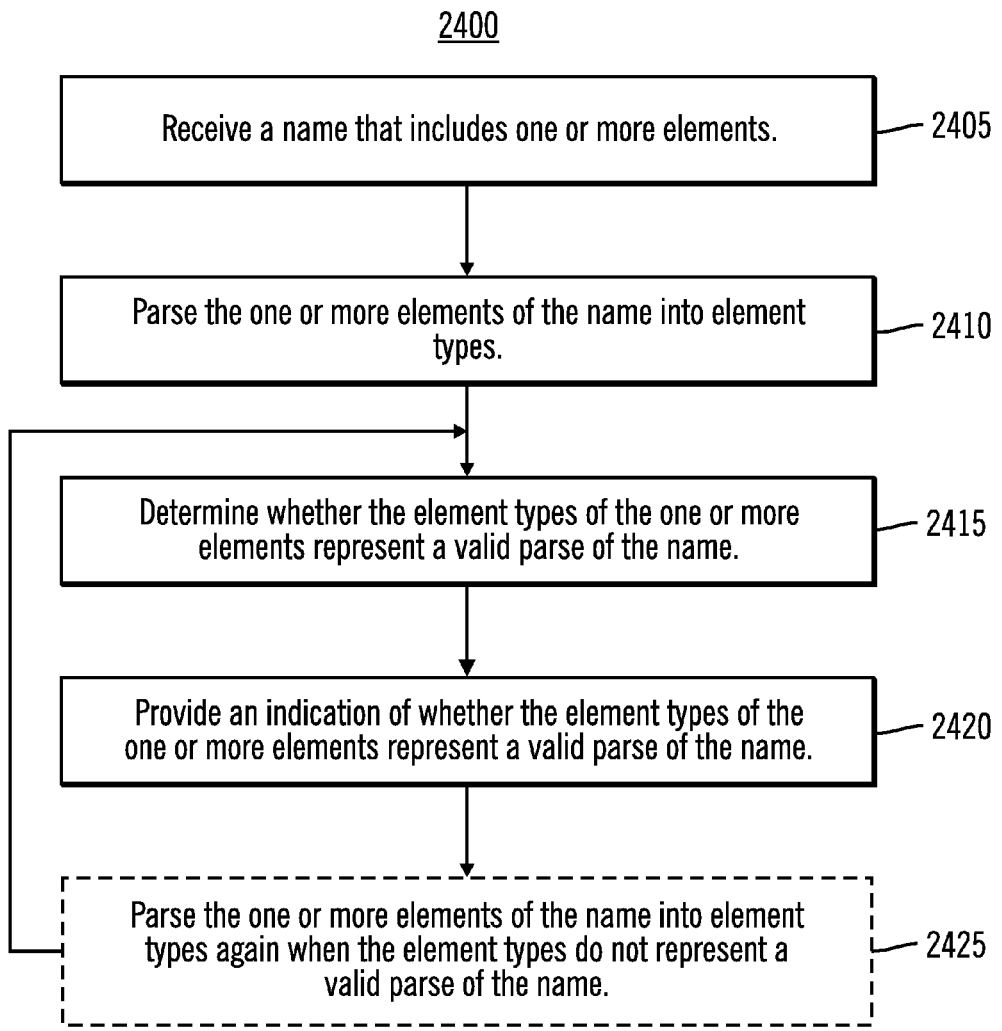
FIG. 24 is a flow chart of a process for identifying valid parses of names in accordance with certain embodiments.

Referring to FIG. 24, a process 2400 is used to identify valid parses of names. If a valid parse of a name is not identified initially, the name may be parsed again. The process 2300 may be executed by a name processing application, such as the name processing application 902.

The name processing application receives a name that includes one or more elements (2405). The name may be received, fox example, from a UI for the name processing application, or through invocation of a method of an API that is implemented by the name processing application.

The name processing application parses the one or more elements into element types (2410). More particularly, the name processing application may parse each of the elements of the names as one of the possible types. The classification may be based on statistics describing the elements of the name, such as the information that is accessible from the NDO 950 of FIGS. 1A and 1B. The name processing application may parse the one or more elements with or without reference to a culture of the name. If the elements are parsed with reference to the culture, the elements may be parsed using a technique that parses names of the culture based on characteristics of names of the indicated culture.

The name processing application determines whether the element types of the one or more elements represent a valid parse of the name (2415). The name processing application may make such a determination by identifying a validity score for the parsed version of the name. In one embodiment, the name processing application uses a validity checker, such as the validity checker 970 of FIGS. 1A and 1B, to identify the validity score. A validity score that exceeds a threshold (or a previous score) may indicate that the parsed version is valid, and a validity score that is less than or equal to the threshold (or a previous score) may indicate that the parsed version is not valid.

The name processing application provides an indication of whether the element types of the one or more elements represent a valid parse of the name (2420). The name processing application may provide the indication of the element types through the UI or API from which the name was received.

The name processing application also may parse the one or more elements of the name into element types again when the element types do not represent a valid parse of the name (2425). Before doing so, the name processing application may reorder the elements of the name, as described above. After the elements have been parsed again, the name processing application may determine whether the new parse of the name is valid (2415). In this manner, the name may be parsed repeatedly until, for example, a valid parse is identified, or until a new parse that is more valid that a previous parse is not identified.

The NDO 950 is described throughout as including, for each name phrase that appears in a set of names, numbers or counts of the names that include the name phrase as each of the possible types of name phrases. However, in another embodiment, the NDO may include percentages of the names in the set that include the name phrase in general. In addition, the NDO may maintain percentages of the names that include the name phrase in general that include the name phrase as each of the possible types. In another embodiment, the NDO may maintain other indications of the frequency with which the name phrase appears in general and as each of the possible types in the set of names.

The described techniques may be applied in batch mode processing of a set of names. In other words, multiple names may be parsed without receipt of a separate indication from the user that each of the names should be parsed. For example, an input file may include a list of names to be parsed. In response to a single action by the user, the described techniques may be used to individually parse each name in the input file. Parsed versions of each name may be listed in an output file that the user may access. In one embodiment, the user may be enabled to specify a format in which the names to be parsed are specified in the input file, or a format in which the parsed names are listed in the output file. The user also may indicate whether names are to be reparsed automatically when a previous parse is invalid. The user also may be enabled to specify custom name phrases to be added to the NDO that is used to parse the names included in the input file.

Certain embodiments for parsing names enable access to multiple parsing techniques for parsing name elements into one or more types of elements, the multiple parsing techniques including separate parsing techniques that respectively correspond to at least one of multiple known cultures; receive a name that includes one or more elements; receive from a user an indication that the name is to be reparsed automatically when a previous parse is invalid; access, for the name, an indication of at least one culture from among the multiple known cultures; select one of the multiple parsing techniques based on the indication of the culture of the name, wherein the multiple parsing techniques include culture-specific first parsing techniques and the culture-specific second parsing techniques; parse the one or more elements of the name into element types using the selected parsing technique; determine whether the element types represent a valid parse of the name by determining a validity score for the parsing of the one or more elements by performing multiple validity tests and combining results from the multiple validity tests, wherein the multiple validity tests include a test to measure conformity of the parsed one or more elements of the name to other names of a same culture as the parsed one or more elements of the name; and, in response to determining that the validity score indicates that the element types do not represent a valid parse of the name, reorder the one or more elements using statistical indications, wherein the one or more elements are reordered with an order of: titles, given names, surnames, and qualifiers, wherein each of the one or more elements are classified as one of a title, a given name, a surname, and a qualifier based on the statistical indications and reparse the reordered one or more elements into element types using the selected parsing technique, wherein determining the validity score, reordering, and reparsing the reordered one or more elements occurs until it is determined that the parsing resulted in a valid parse of the name or that reparsing is not to be done.

In certain embodiments, accessing the indication of the culture of the name includes detecting a characteristic of at least one of the elements of the name and determining the indication of the culture of the name based on the characteristics detected.

In certain embodiments, a database providing a statistical indication of a type of an element is accessed, and parsing is based on the statistical indication.

In certain embodiments, the validity score is compared to a threshold, and it is determined whether to reorder the one or more elements based on a result from the comparing.

In certain embodiments it is determined to reorder the one or more elements based on the validity score, a database providing the statistical indications of the types of the one or more elements is accessed, and the one or more elements are reordered using the statistical indications.

In certain embodiments an indication of the validity score is provided.

In certain embodiments, parsing the one or more elements of the name into element types includes classifying each of the one or more elements as a title, a given name, a surname, or a qualifier.

In certain embodiments providing statistics describes at least one of the one or more elements of the name.

In certain embodiments, receiving the name comprises receiving a personal name.

Certain embodiments for identifying a valid parse of a name receive a name that includes one or more elements. The one or more elements of the name are parsed into element types by: enabling access to multiple parsing techniques for parsing the one or more elements of the name into the element types, the multiple parsing techniques including separate parsing techniques that respectively correspond to at least one of multiple known cultures, wherein the multiple parsing techniques include culture-specific first parsing techniques and the culture-specific second parsing techniques; accessing, for the name, an indication of at least one culture from among the multiple known cultures; and selecting one of the multiple parsing techniques based on the indication of the culture of the at least one name, wherein parsing the one or more elements of the name comprises parsing the one or more elements using the selected parsing technique. It is determined whether the element types of the one or more elements represent a valid parse of the name by performing multiple validity tests to determine whether the parse of the name is valid and combining results from the multiple validity tests to generate a validity score for the element types, wherein at least one of the multiple validity tests identifies a dominance factor for one element of the one or more elements included in the parsed name, wherein the dominance factor indicates a ratio of names in a set of names that include the one element as a particular type to names in a set that include the one element as any of multiple possible types. In response to determining that the validity score indicates that the element types do not represent a valid parse of the name, the one or more elements are reordered using statistical indications in order of increasing dominance factors of the one or more elements and the reordered one or more elements are reparsed into element types using the selected parsing technique, wherein determining the validity score, reordering, and reparsing the reordered one or more elements occurs until it is determined that the parsing resulted in a valid parse of the name or that reparsing is not to be done.

Certain embodiments for processing a name receive an indication of a name that includes multiple tokens; access an indication of a culture of the name; identify one or more name phrases included in the name based on the culture of the name, at least one of the identified name phrases having more than one token, by grouping the tokens into name phrases based on a classification of the tokens and the culture of the name; designate the identified name phrases as an input to a subsequent name processing operation; and process the name using the identified name phrases as an input to the subsequent name processing operation, including classifying each of the identified name phrases as one of a title, a given name, a surname, and a qualifier and grouping multiple name phrases that have a same type within the name in an order in which the multiple name phrases appear in the name. Processing the name includes: determining whether the one or more name phrases represent a valid parse of the name by determining a validity score by performing multiple validity tests, wherein the multiple validity tests include a test to measure conformity of the parsed name to other names of a same culture as the parsed one or more name phrases, a test to identify a dominance factor that indicates a ratio of names in a set of names that include a name phrase as a particular type to names in a set that include the name phrase as any of multiple possible type for the one or more name phrases, and a test that determines whether an order in which the one or more name phrases appear in the parsed name is an order in which the one or more name phrases typically appear based on characteristics of names of the culture of the parsed name; and, in response to determining that the one or more name phrases do not represent a valid parse of the name, reordering the one or more name phrases, wherein the one or more elements are reordered with an order of: titles, given names, surnames, and qualifiers, wherein each of the one or more elements are classified as one of a title, a given name, a surname, and a qualifier based on statistical indications and reparsing the reordered one or more name phrases, wherein determining the validity score, reordering, and reparsing the reordered one or more name phrases occurs until it is determined that the parsing resulted in a valid parse of the name or that reparsing is not to be done.

In certain embodiments, identifying the one or more name phrases includes classifying each of the multiple tokens in the name as a prefix, suffix, or stem based on the culture of the name.

Certain embodiments for parsing a conjoined name receive a conjoined name construct that includes multiple elements that are joined by a conjunction and include one or more punctuation marks, wherein one of the multiple elements is a surname, wherein the punctuation marks are capable of including an ampersand, a comma, and a semicolon; identify multiple names indicated by the conjoined name construct, each of the multiple names including the surname and one or more of the multiple elements, wherein the conjunction and the one or more punctuation marks are used to separate the conjoined name construct into the multiple names, wherein the identified multiple names do not include the conjunction and the one or more punctuation marks; and parse the one or more elements of at least one name of the multiple names into element types. Parsing includes enabling access to multiple parsing techniques for parsing the one or more elements of the at least one name into the element types, the multiple parsing techniques including separate parsing techniques that respectively correspond to at least one of multiple known cultures; accessing, for the at least one name, an indication of at least one culture from among the multiple known cultures; and selecting one of the multiple parsing techniques based on the indication of the culture of the at least one name, wherein parsing the one or more elements of the at least one name comprises parsing the one or more elements using the selected parsing technique. It is determined whether the element types represent a valid parse of the name by determining a validity score using the selected one of the multiple parsing techniques; and, in response to determining that the element types do not represent a valid parse of the name, the one or more elements are reordered using statistical indications, wherein the one or more elements are reordered with an order of: titles, given names, surnames, and qualifiers, wherein each of the one or more elements are classified as one of a title, a given name, a surname, and a qualifier based on the statistical indications, and the reordered one or more elements are reparsed into element types, wherein determining the validity score, reordering, and reparsing the reordered one or more elements occurs until it is determined that the parsing resulted in a valid parse of the name or that reparsing is not to be done.

In certain embodiments, access to multiple parsing techniques for parsing name elements into one or more types of elements is enabled, where the multiple parsing techniques include separate parsing techniques that respectively correspond to at least one of multiple known cultures; for the at least one name, an indication of at least one culture from among the multiple known cultures is accessed; and one of the multiple parsing techniques is selected based on the indication of the culture of the at least one name, wherein parsing the one or more elements of the at least one name comprises parsing the one or more elements using the selected parsing technique.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package,
partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 25:
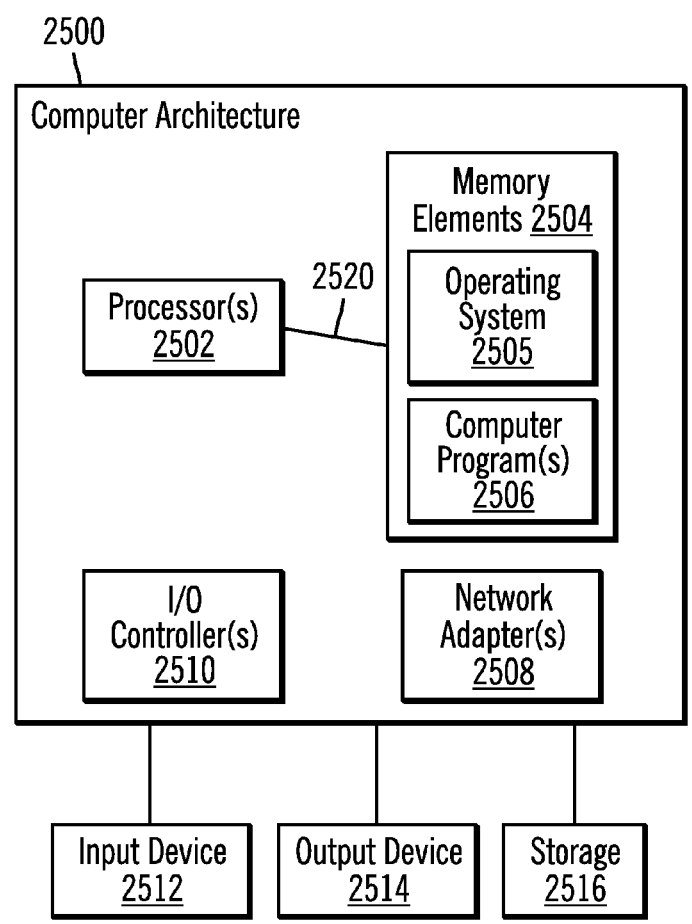
FIG. 25 illustrates a computer architecture that may be used in accordance with certain embodiments in accordance with certain embodiments.

FIG. 25 illustrates a computer architecture 2500 that may be used in accordance with certain embodiments. The multi-algorithmic name search system 100 and/or the name processing system 900 may implement computer architecture 2500. The computer architecture 2500 is suitable for storing and/or executing program code and includes at least one processor 2502 coupled directly or indirectly to memory elements 2504 through a system bus 2520. The memory elements 2504 may include local memory employed during actual execution of the program code, bulk storage, and cache memories which provide temporary storage of at least some program code in order to reduce the number of times code must be retrieved from bulk storage during execution. The memory elements 2504 include an operating system 2505 and one or more computer programs 2506.

Input/Output (I/O) devices 2512, 2514 (including but not limited to keyboards, displays, pointing devices, etc.) may be coupled to the system either directly or through intervening I/O controllers 2510.

Network adapters 2508 may also be coupled to the system to enable the data processing system to become coupled to other data processing systems or remote printers or storage devices through intervening private or public networks. Modems, cable modem and Ethernet cards are just a few of the currently available types of network adapters 2508.

The computer architecture 2500 may be coupled to storage 2516 (e.g., a non-volatile storage area, such as magnetic disk drives, optical disk drives, a tape drive, etc.). The storage 2516 may comprise an internal storage device or an attached or network accessible storage. Computer programs 2506 in storage 2516 may be loaded into the memory elements 2504 and executed by a processor 2502 in a manner known in the art.

The computer architecture 2500 may include fewer components than illustrated, additional components not illustrated herein, or some combination of the components illustrated and additional components. The computer architecture 2500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible embodiments of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for parsing a name, comprising:
   receiving, using a processor of a computer, a name to be parsed;
   identifying a culture of the name;
   identifying one or more name phrases from the name;
   associating the name phrases with fields, wherein each of the fields is one of a given name field and a surname field;
   identifying statistics for the one or more name phrases;

providing different parsing techniques that parse different types of name elements differently within at least one of the fields;

determining whether to select a first parsing technique among the different parsing techniques based on the culture;

in response to determining that the first parsing technique is to be selected, parsing the name using the statistics and the first parsing technique to parse at least one field of the name into the different types of name elements based on the culture;

providing the name phrases in the given name field and the surname field; and for the at least one field of the name, providing the name elements and their types; and in response to determining that the first parsing technique is not to be selected, parsing the name using the statistics and a second parsing technique.

2. The method of claim 1, wherein the name includes fields comprising a title, the given name, the surname, and a qualifier.

3. The method of claim 1, wherein the second parsing technique parses the name into one or more of: a title, the given name, the surname, and a qualifier.

4. The method of claim 1, further comprising:

determining whether the parsed name is valid; and in response to determining that the parsed name is not valid, reordering name phrases of the name to form a reordered name;

determining whether to perform the first parsing technique;

in response to determining that the first parsing technique is to be performed, parsing the reordered name using the statistics and the first parsing technique; and in response to determining that the first parsing technique is not to be performed, parsing the reordered name using the statistics and a second parsing technique.

5. The method of claim 4, wherein the determination of whether the parsed name is valid is based on the statistics and one of the first parsing technique and the second parsing technique.

6. A computer program product for parsing a name, the computer program product comprising:

a non-transitory computer readable storage medium having computer readable program code embodied therewith, wherein the computer readable program code, when executed by a processor of a computer, is configured to perform:

receiving a name to be parsed;

identifying a culture of the name;

identifying one or more name phrases from the name;

associating the name phrases with fields, wherein each of the fields is one of a given name field and a surname field;

identifying statistics for the one or more name phrases;

providing different parsing techniques that parse different types of name elements differently within at least one of the fields;

determining whether to select a first parsing technique among the different parsing techniques based on the culture;

in response to determining that the first parsing technique is to be performed selected, parsing the name using the statistics and the first parsing technique to parse at least one field of the name into the different types of name elements based on the culture;

providing the name phrases in the given name field and the surname field; and for the at least one field of the name, providing the name elements and their types; and in response to determining that the first parsing technique is not to be selected, parsing the name using the statistics and a second parsing technique.

7. The computer program product of claim 6, wherein the name includes fields comprising a title, the given name, the surname, and a qualifier.

8. The computer program product of claim 6, wherein the second parsing technique parses the name into one or more of: a title, the given name, the surname, and a qualifier.

9. The computer program product of claim 6, wherein the computer readable program code, when executed by the processor of the computer, is configured to perform:

determining whether the parsed name is valid; and in response to determining that the parsed name is not valid, reordering name phrases of the name to form a reordered name;

determining whether to perform the first parsing technique;

in response to determining that the first parsing technique is to be performed, parsing the reordered name using the statistics and the first parsing technique; and in response to determining that the first parsing technique is not to be performed, parsing the reordered name using the statistics and a second parsing technique.

10. The computer program product of claim 9, wherein the determination of whether the parsed name is valid is based on the statistics and one of the first parsing technique and the second parsing technique.

11. A computer system for parsing a name, comprising:

a processor; and a storage device connected to the processor, wherein the storage device has stored thereon a program, and wherein the processor is configured to execute instructions of the program to perform operations, wherein the operations comprise:

receiving a name to be parsed;

identifying a culture of the name;

identifying one or more name phrases from the name;

associating the name phrases with fields, wherein each of the fields is one of a given name field and a surname field;

associating the name phrases with fields, wherein each of the fields is one of a given name field and a surname field;

identifying statistics for the one or more name phrases;

providing different parsing techniques that parse different types of name elements differently within at least one of the fields;

determining whether to select a first parsing technique among the different parsing techniques based on the culture;

in response to determining that the first parsing technique is to be selected, parsing the name using the statistics and the first parsing technique to parse at least one field of the name into the different types of name elements based on the culture;

providing the name phrases in the given name field and the surname field; and for the at least one field of the name, providing the name elements and their types; and in response to determining that the first parsing technique is not to be selected, parsing the name using the statistics and a second parsing technique.

12. The computer system of claim 11, wherein the name includes fields comprising a title, the given name, the surname, and a qualifier.

13. The computer system of claim 11, wherein the second parsing technique parses the name into one or more of: a title, the given name, the surname, and a qualifier.

14. The computer system of claim 13, wherein the operations further comprise:

determining whether the parsed name is valid; and in response to determining that the parsed name is not valid, reordering name phrases of the name to form a reordered name;

determining whether to perform the first parsing technique;

in response to determining that the first parsing technique is to be performed, parsing the reordered name using the statistics and the first parsing technique; and in response to determining that the first parsing technique is not to be performed, parsing the reordered name using the statistics and a second parsing technique.

15. The computer system of claim 14, wherein the determination of whether the parsed name is valid is based on the statistics and one of the first parsing technique and the second parsing technique.

* * * * *